(12) United States Patent
Williams, Jr.

(10) Patent No.: US 11,496,679 B2
(45) Date of Patent: *Nov. 8, 2022

(54) REAL-TIME SATELLITE IMAGING SYSTEM

(71) Applicant: Live Earth Imaging Enterprises, L.L.C., Salt Lake City, UT (US)

(72) Inventor: Franklin H. Williams, Jr., Salt Lake City, UT (US)

(73) Assignee: Live Earth Imaging Enterprises, L.L.C., Salt Lake City, UT (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/300,019

(22) Filed: Feb. 8, 2021

(65) Prior Publication Data

US 2021/0385377 A1    Dec. 9, 2021

Related U.S. Application Data

(63) Continuation-in-part of application No. 16/602,697, filed on Nov. 19, 2019, which is a continuation-in-part of application No. 15/530,557, filed on Jan. 27, 2017, now Pat. No. 10,531,052.

(60) Provisional application No. 62/298,347, filed on Feb. 22, 2016.

(51) Int. Cl.
  *H04N 5/232* (2006.01)
  *H04N 5/265* (2006.01)
  *H04N 7/18* (2006.01)

(52) U.S. Cl.
  CPC ......... *H04N 5/23232* (2013.01); *H04N 5/265* (2013.01); *H04N 7/181* (2013.01)

(58) Field of Classification Search
  CPC .... B64G 1/1021; B64G 1/1085; B64G 1/242; B64G 1/66; B64G 2001/1028; H04N 5/2251; H04N 5/232; H04N 5/23232; H04N 5/2353; H04N 5/247; H04N 5/265; H04N 7/181; G02B 23/04
  See application file for complete search history.

(56) References Cited

U.S. PATENT DOCUMENTS

| 5,430,294 A | 7/1995 | Mears |
| 6,185,037 B1 | 2/2001 | Lutz |
| 2005/0104089 A1* | 5/2005 | Engelmann ....... H01L 27/14609 257/E31.046 |
| 2007/0292046 A1* | 12/2007 | Johnson .................. G02B 13/18 382/275 |
| 2013/0314567 A1* | 11/2013 | McComas ............. G01J 3/2823 348/239 |

FOREIGN PATENT DOCUMENTS

| JP | H 112 894 85 A | 1/1998 |
| JP | 2002 523 802 A | 8/1998 |

(Continued)

*Primary Examiner* — Joon Kwon
(74) *Attorney, Agent, or Firm* — Thomas Nello Giaccherini

(57) ABSTRACT

Methods and apparatus for Real-time Satellite Imaging System (10) are disclosed. More particularly, one embodiment of the present invention an imaging sensor (14) on a geostationary satellite having one or more co-collimated telescopes (18). The telescopes (18) illuminate local planes (22) which are sparsely populated with focal plane arrays (24). The focal plane arrays (24) record the entire observable Earth hemisphere at one time, at least once every ten seconds.

22 Claims, 41 Drawing Sheets

(56) References Cited

FOREIGN PATENT DOCUMENTS

| JP | 2003 507 262 | 6/1999 |
|---|---|---|
| WO | WO 2007 014 293 | 2/2007 |
| WO | WO 2017 144 866 | 8/2017 |

* cited by examiner

34

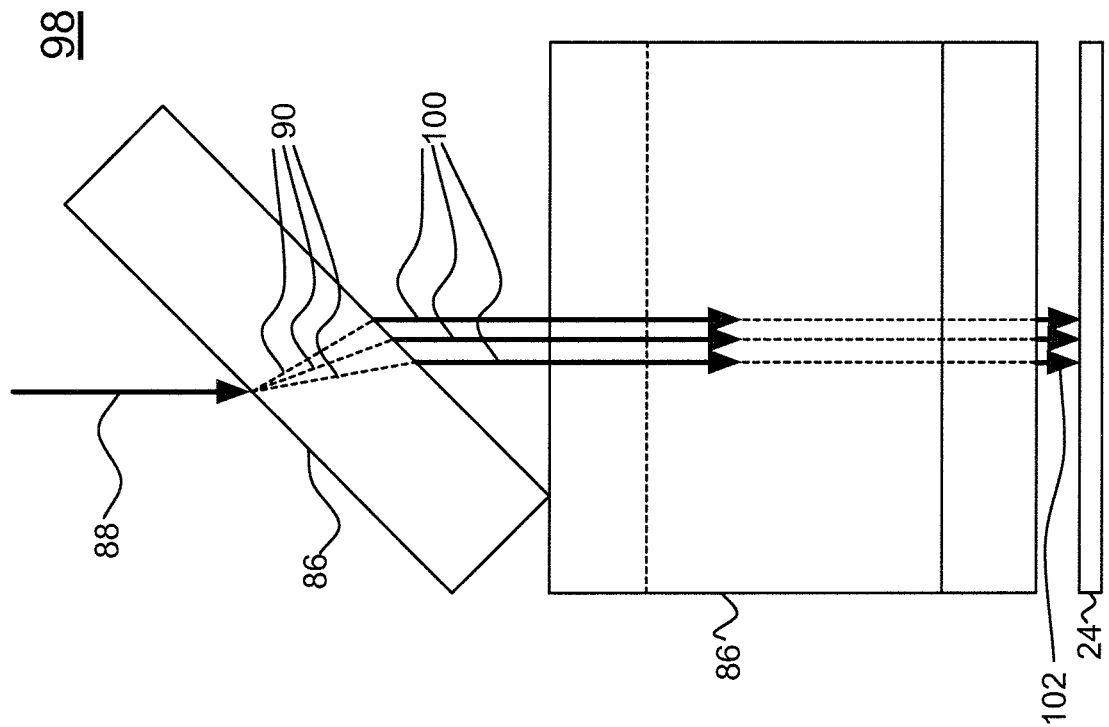
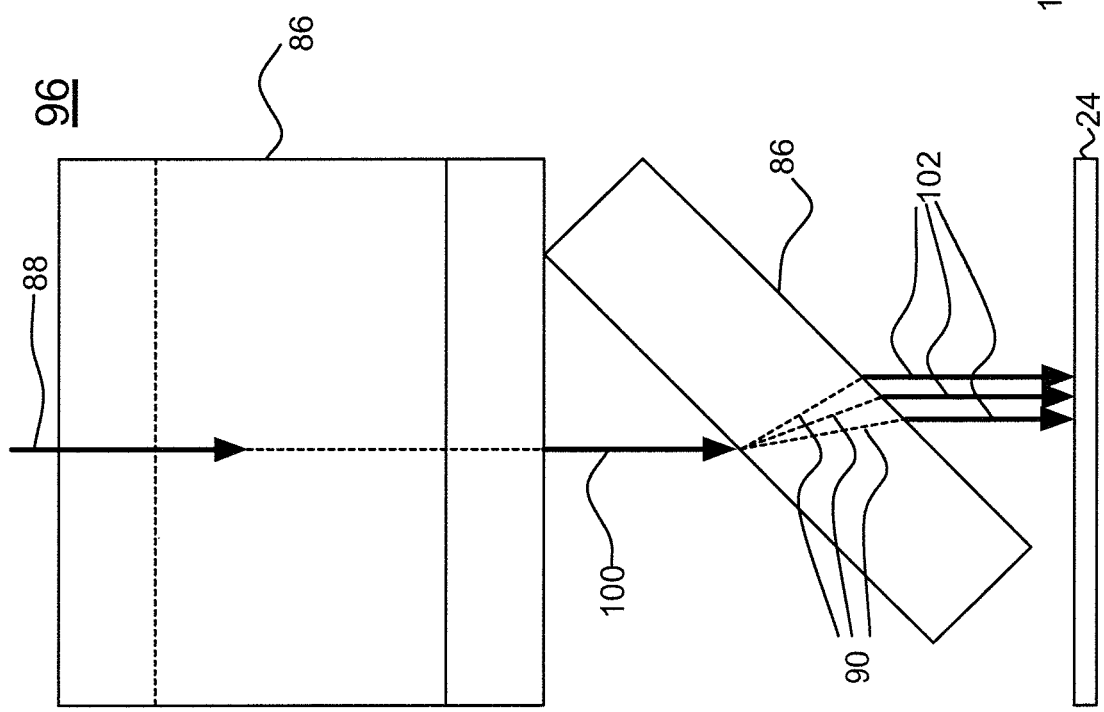

REAL-TIME SATELLITE IMAGING SYSTEM

CROSS-REFERENCE TO A RELATED PENDING PATENT APPLICATIONS & CLAIMS FOR PRIORITY

The Present Continuation-In-Part Patent Application is related to:

Pending Continuation-in-Part patent application Ser. No. 16/602,697; filed on 19 Nov. 2019;

U.S. Non-Provisional patent application Ser. No. 15/530,557; filed on 27 Jan. 2017; and issued on 7 Jan. 2020 as U.S. Pat. No. 10,531,052; and U.S. Provisional Patent Application No. 62/298,347, filed on 22 Feb. 2016.

The Applicant hereby claims the benefit of priority under Title 35, Sections 119 and/or 120, for any subject matter which is common to both the Present Continuation-in-Part Application and to U.S. patent application Ser. Nos. 16/602,697, 15/530,557 and U.S. Ser. No. 62/298,347.

FIELD OF THE INVENTION

One embodiment of the present invention relates to an apparatus for producing high quality, real-time images of the Earth and areas close to the Earth from a satellite in Earth orbit. More particularly, one embodiment of the invention pertains to satellite imaging sensors for generating recording, distributing, and displaying high-resolution images of a full Earth in real-time.

INTRODUCTION

The title of this Continuation-on-Part Patent Application is Real-time Satellite Imaging System. The Applicant is:
Franklin H. Williams, Jr
The Applicant is a Citizen of the United States of America.

FEDERALLY SPONSORED RESEARCH OR DEVELOPMENT

None.

BACKGROUND OF THE INVENTION

Currently available satellite based imaging sensors provide images of an entire hemisphere of the Earth, but these images are delayed by minutes, or even tens of minutes. Current satellites produce images of an entire hemisphere at moderate to low resolution, specifically, of fire hundred meters to four kilometers per pixel. In some cases, conventional satellites provide images of small regions at high resolution delayed by tens of minutes, or even days. Over the last forty-five years, since the first weather monitoring satellite was placed in geostationary orbit (GSO), various satellite systems have been used to monitor features on the Earth and in the Earth's atmosphere.

Current commercial satellites are unable to produce Real-time images of a full hemisphere of the Earth due to the limitations imposed by their conventional design.

FIG. 1 offers a schematic view of the prior art, which includes a scanning mirror SM on a satellite in orbit. The scanning mirror SM collects light L from the Earth's surface ES, and directs it to imaging optics IO. The output from the imaging optics IO illuminates a conventional focal plane array FPA on a focal plane FP, which produces an electronic signal that is used to form an image.

FIG. 2 reveals another schematic view of the prior art. Conventional satellites may scan the observable Earth disk ED. Many scans SC1, SC2, SC3 through SCN, are generated in a sequential South to North fashion to produce an image of a full hemisphere. Non spinning satellites scans must include a scan retrace SR.

Conventional satellite imaging systems use scanning sensors, and produce images according to the method shown in FIG. 2.

Conventional satellite imaging systems using scanning sensors produce distorted images items that are time varying or moving as the scanning element of the sensor observes and records afferent parts of the images at different times.

FIG. 3 shows a schematic view of a moving object SO being scanned. The object is moving in direction of object motion OM and is being scanned by successive scans SC A, SC B, SC C, and SC D over time. In the time each scan is done and the scanning sensor retraces as shown in FIG. 2 retrace SR, the object SO has moved causing the distortions shown with the successive scans displaced horizontally in the final image. If an object of interest is moving in two or three dimensions rather than in one dimension as being shown in FIG. 3, the resulting distortions will be even more severe and complex.

Because almost all natural phenomena change over time or move and many man-made items change over time or move, scanning sensors inherently produce a distorted image of tire area being imaged.

The fastest satellite imaging system is the U.S. GOES-R weather Satellite started operations started operations in 2017. The GOES-R uses a scanning sensor, and requires a minimum of five minutes to generate the scans that are then utilized to produce a full hemisphere image scanning sensors.

The GOES-R full hemisphere image is downlinked and transferred into a data processing center at NASA's Goddard Space Center, where it is processed for several minutes. The processed image is then sent back up to the GOES-R satellite, which then relays the image to users within the observable hemisphere (predominantly North and South America). This entire process takes about ten or more minutes.

A satellite which would be able to produce an image of MB hemisphere of the Earth in truly real-time would provide "persistent" imaging. These images would be extremely useful, especially in the fields of weather monitoring and forecasting.

A satellite using a staring sensor rather than a scanning sensor would produce imagery without the inherent distortions of a scanning sensor.

No conventional commercial satellite currently provides persistent imaging, defined as once every thirty seconds or more often, of an entire observable hemisphere. No current satellite provides high resolution of one hundred meters per pixel resolution in real-time of hemispherical imagery.

The development of a system that enables remote access using mobile devices over trusted and secure links to these networks would be a major technological advance, and would satisfy long-felt needs in the satellite and telecommunications industries.

SUMMARY OF THE INVENTION

One embodiment of the present invention includes an imaging sensor on a geostationary satellite having co-collimated telescopes, which are generally pointed toward the Earth and its surrounding region of space. This region of space is defined as approximately the region of a sphere centered on the Earth and of a radius the radius of the geostationary orbit plus 200 km.

In one embodiment, each of the telescopes directly illuminates focal planes that are associated with each of the telescopes. The telescopes do not use intermediary focal planes or cameras of any sort imaging intermediary focal planes. Each of the directly illuminated focal planes is sparsely populated with multiple focal plane arrays. The combination of the focal plane arrays within the focal planes of the telescopes is capable of recording the entire observable Earth hemisphere at one time, at least once every ten seconds or more often.

When used in concert the combined telescopes, directly illuminated focal planes and the sparsely populated focal plane arrays within each focal plane produce a fractionated sensor that images the entire observable hemisphere of the Earth, the volume of the Earths atmosphere above the observable hemisphere of the Earth, and the region of space above the atmosphere above the observable hemisphere.

In aggregate the co-collimated telescopes, each telescope's directly illuminated focal plane, the multiple sparse focal plane arrays within the focal planes, and the electronic elements that control the focal plane arrays constitute a staring sensor. The sensor is staring as an aggregate unit. The focal plane arrays are one element within the overall sensor and are not equivalent to the total staring sensor.

The advantage of a staring sensor over prior, scanning sensors is that because a staring sensor takes an image of generally the entire observed area the imagery it creates is not subject to the distortions created by scanning sensors observing and recording different parts of the observed area at different times. Thus areas or objects that are changing over time are observed and recorded at once, and objects that are moving are recorded at one point in their motion.

In one embodiment, the sensor does not employ an array of multiple cameras that each have their own field of views within a large field of view. The sensor does not employ an array of telescopes each of which illuminates a single focal plane array. The current invention employs multiple sparsely of focal plane arrays within each related telescope. The combination of the telescopes all with the same field of view, i.e., co-collimated, with their related focal plane arrays combines to form a single image.

This arrangement allows for a limited number of large optics with a very large number of focal plane arrays allowing the sensor to be of a much smaller overall size than if each focal plane array had its own associated telescope. Additionally, allowing a small number of large optics with large apertures allows the telescopes to gather enough light in low light conditions to allow the focal plane arrays to create useful images.

The light integration duration of each of the focal plane arrays is variable and is controlled by electronic circuits on board the satellite. The controlling electronic circuits record the maximum and minimum light of each pixel within the focal plane arrays and sub arrays within each focal plane array.

From this information, the sensor image control elements within the on satellite electronics determines the light integration time of the next frame. The sub-arrays within the focal plane arrays are areas of combinations of pixels within the focal plane array that are able to be controlled independently from other areas of combinations of pixels within the focal plane array.

The software controlled electronic processing elements control the integration time of each focal plane array and local plane array sub element. Controlling the integration time of each image frame optimizes the imagery by minimizing the number of super saturated pixels and minimizing the number of pixels that have light levels below noise. Thus light integration time is dynamically set to optimize the images taken by the focal plane arrays where optimization may alternatively be defined as maximizing the signal to noise ratio of the output of the focal plane arrays across the images captured by the focal plane arrays.

The light brightness across observable hemisphere of the surface of the Earth is not uniform at any time. Some areas of the surface of the Earth are always brighter than other areas. Typically some areas of the observable hemisphere is under daylight conditions while the remainder of the observable hemisphere is under night conditions. This can result in radically different brightness observed by the sensor. The controlling electronic circuits controlling the light integration times of each focal plane array or each sub array of pixels within each focal plane array allows for the focal plane arrays or each sub array of pixels with each focal plane array to be optimized for the specific light brightness of each area within the observable hemisphere of the Earth. This fine control of each focal plane array or each sub array of pixels with each focal plane array by the controlling electronics results in an optimized image of the entire observable hemisphere.

Over time focal plane arrays age. In space, on orbit, conditions like a sensor being, placed into geostationary orbit, the focal plane arrays are subject to radiation damage. The degradation over time typically is not disabling, but it is measurable and affects the range of output and capability of the focal plane array. Utilizing field programmable gate arrays (FPGA) in the controlling electronics allows the electronics to be updated over the life of the sensor. This allows the FPGAs within the controlling electronics to maintain optimized imagery over the life of the sensor.

The images are read out of the focal plane arrays by electronic circuits on board the satellite. The imagery and related data when read out are parsed so as to allow the control electronics to actively and adaptively control the integration time of the next frame for each focal plane array and each focal plane array sub element. The imagery and related data is then compressed and formatted by software controlled electronic processing elements on the satellite for transmission to the Earth. Images are then transmitted to a ground station on Earth.

A user will obtain the imagery and related data from the ground station either directly at the ground station or remotely from another ground site. The user will be able to observe the imagery and related data at a remote location on the Earth not more than thirty seconds after the event is observed and recorded by the sensor on the satellite. This combination of telescopes, focal planes, focal plane arrays, control electronics, optimization of focal plane light integration times, read out circuitry, transmission to the Earth, and retrieval of imagery and data from the ground station provides 24/7/365 continuous, persistent imaging of the Earth.

One embodiment of the present invention produces user obtainable images within ten seconds from the time the event happens on the Earth. One embodiment of the invention is capable of making global observations of the Earth at one hundred meter scale or better spatial resolutions at nadir in real-time.

One particular implementation of the invention includes an imaging sensor on a geostationaly satellite which is equipped with co-collimated telescopes. The telescopes illuminate focal planes which are sparsely populated with focal plane arrays. The focal plane arrays are capable of recording the entire observable Earth hemisphere, the atmosphere above it, and the region of space above that atmosphere at one time, at least once every ten seconds or more often.

The images and data are transferred to the readout and controlling electronics. Images and related data are then transmitted to a ground station on Earth, and finally to a user who may observe the images in less than ten seconds after the recorded event happens on the surface of the Earth, in the atmosphere above it, or in the region of space above that atmosphere. This combination of elements provides persistent imaging of an entire visible hemisphere of the Earth. The user will be able to observe the imagery and related data at a remote location on the Earth not more than thirty seconds after the event is observed and recorded by the sensor on the satellite. This combination of telescopes, focal planes, focal plane arrays, control electronics, optimization of focal plane light integration times, read out circuitry, transmission to the Earth, and retrieval of imagery and data from the ground station provides 24/7/365 continuous, persistent imaging of the Earth.

Another embodiment of the present invention produces user obtainable images within ten seconds from the time the event happens on the Earth. This embodiment of the invention is capable of making polar observations of the Earth at one hundred meter scale or better spatial resolutions at nadir in real-time where real-time is categorized as imagery of an event being available in 30 seconds of the time of the event. This embodiment of the present invention is with the satellites in a Molyina type orbit. Such an orbit is fixed with regard to the rotation of the Earth but is in a highly inclined orbit, typically inclined at approximately 63.4°, with respect to the Earth's equator and is highly elliptical with a typical ellipticity of approximately 0.74. Thus the orbital plane of a Molniya type orbit is explicitly out of the plane of the Earth's equator and out of the plane of geostationary orbit satellites.

The Molniya type orbit has an orbit period of approximately twelve hours such that it passes over surface regions near the polar regions of the Earth at the apogee of the orbit. This allows the satellite to be over the polar regions for extended portions of the twelve hour orbit. One particular implementation of this embodiment of the present invention includes a staring imaging sensor on the satellite which is equipped with co-collimated telescopes. The telescopes directly illuminate focal planes which are sparsely populated with focal plane arrays. The focal plane arrays are capable of recording the entire area of the Earth observable at one time while the satellite at or near the apogee of the orbit, recording at least once every ten seconds or more often. The motion of the satellite may rotate the satellite itself to compensate for the satellite's motion relative to the surface of the Earth. The rotation of the satellite to keep the sensor generally pointed toward the Earth may be accomplished by the use of reaction wheels. Alternatively, the rotation of the satellite to keep the sensor generally pointed toward the Earth may be accomplished by the use of reaction thrusters. The sensor may include within its optics mirrors that allow the optics itself to compensate for the satellite's motion relative to the surface of the Earth. The sensor may include a tilt plane platform that allow the co-collimated telescopes to be generally pointed toward the Earth to compensate for the satellite's motion relative to the surface of the Earth. The images and related data are transferred to readout and controlling electronics that may compensate the the satellite's motion relative to the surface of the Earth.

Recorded images are then transmitted to a ground station on Earth, and finally to a user who may observe the images in less than ten seconds after the recorded event happens on the surface of the Earth. This combination of elements provides persistent imaging of an entire visible area of the Earth including the atmosphere above it and the space above the atmosphere. The user will be able to observe the imagery and related data at a remote location on the Earth not more than thirty seconds after the event is observed and recorded by the sensor on the satellite. This combination of telescopes, focal planes, focal plane arrays, control electronics, optimization of focal plane light integration times, read out circuitry, transmission to the Earth, and retrieval of imagery and data from the ground station provides 24/7/365 continuous, persistent imaging of the Earth.

A constellation of satellites of the Molniya type orbit may be constructed with multiple satellites in the same orbital plane. When multiple satellites are placed into the same orbital plane this alternate embodiment can provide persistent imaging of a polar region. Multiple Molniya type orbit planes with inclinations that are negative and positive in the standard convention and with multiple satellites in each orbit plane will result in persistent imaging of both polar regions.

An alternate embodiment of the present invention is with the fractionated sensor consisting of multiple co-collimated telescopes each with sparsely populated focal plane arrays in directly illuminated focal planes on a satellite in a highly elliptical orbit (HEO) that is other than a Molniya type orbit. Such HEO orbits are generally instantiated with the plane of the HEO orbit out of the plane of the Earth's equator and thus out of the plane of geostationary satellites' orbits. The focal plane arrays are capable of recording the entire area of the Earth observable at one time recording at least once every ten seconds or more often. Other HEO, non Molniya type orbits allow for twenty-four hour orbit periods that allow the satellite to observe polar regions for longer continuous periods of time than a Molniya orbit.

In this alternate motion, the satellite may rotate the satellite itself to compensate for the satellite's motion relative to the surface of the Earth. The rotation of the satellite to keep the sensor generally pointed toward the Earth may be accomplished by the use of reaction wheels. Alternatively, the rotation of the satellite to keep the sensor generally pointed toward the Earth may be accomplished by the use of reaction thrusters. The sensor may include within its optics mirrors that allow the optics itself to compensate for the satellite's motion relative to the surface of the Earth. The images and related data are transferred to readout and controlling electronics that may compensate for the satellite's motion relative to the surface of the Earth. Images are then transmitted to a ground station on Earth, and finally to a user who may observe the images in less than 30 ten seconds after the recorded event happens on the surface of the Earth. This combination of elements provides persistent imaging of an entire visible area of the Earth including.

The user will be able to observe the imagery and related data at a remote location on the Earth not more than 30 seconds after the event is observed and recorded by the sensor on the satellite. This combination of telescopes, focal planes, focal plane arrays, control electronics, optimization of focal plane light integration times, read out circuitry transmission to the Earth, and retrieval of imagery and data from the ground station provides 24/7/365 continuous, persistent imaging of the Earth.

An alternate embodiment of the present invention is with the fractionated sensor consisting of multiple co-collimated telescopes each with sparsely populated focal plane arrays in directly illuminated focal planes on a satellite place at or near the two stable Earth-Moon Lagrange points, L4 and L5. The L4 and L5 points allow for nearly full hemispherical observation and recording by the sensor on each satellite including the polar regions and the atmosphere and space above the polar regions.

As the orbital plane of the Moon is generally out of the plane of the Earth's equator, satellites in the two stable Earth-Moon Lagrange points, L4 and L5 are generally not in the plane of the Earth's equator and thus are generally out of the plane of the orbit of geostationary satellites.

The images and related data are transferred to readout and controlling electronics that may compensate for the satellite's motion relative to the surface of the Earth. Images are then transmitted to a ground station on Earth, and finally to a user who may observe the images in less than ten seconds after the recorded event happens on the surface of the Earth. This combination of elements provides persistent imaging of an entire visible area of the Earth including.

A further embodiment can include a combination of a constellation of GSO satellites and Molniya orbit satellites to provide coverage of one hundred percent of the Earth at all times. Similarly an embodiment with a combination of GSO satellites and HEO satellites can provide coverage of one hundred percent of the Earth at all times with greater persistence per satellite over the polar regions. Additionally, an embodiment of a combination of GS satellites and Lagrange satellites can provide long duration persistence of virtually one hundred percent of the Earth.

Another embodiment includes specific image and data processing to extract useful information from the imagery and data streams from the sensors and format that extracted, useful information to be transmitted to a ground station on the Earth. Specific extracted information may be based upon any individual image within a single focal plane array (FPA) or an image that is across multiple FPAs. Specific extracted information may be based upon a series of images over time wherein the information extracted is based upon changes in the images of one FPA or changes in the images that is across multiple FPAs. Specific extracted information may be based upon the lack of, or absence of, changes in the images of one FPA or the lack of, or absence of, changes in the images that is across multiple FPAs.

Specific information extracted and transmitted to a ground station on the Earth may be location based information that is color based, i.e., specific wavelengths of light are observed from a location on the ground indicating a situation of interest. The specific, location based information extracted from the imagery and related data can be time static in time indicating a continuous location based information of interest. The specific, location based information extracted from the imagery and related data can be time varying indicating a one or more events that are location based in of interest.

Specific information may be motion based information represented by the change as that change moves from pixel to pixel with a single FPA across multiple images over time. Specific information may be motion based information represented by the change as that change moves from pixel to pixel across multiple FPAs across multiple images over time.

Specific information extracted can be based upon absolute changes over a series of images. The specific information may be based upon changes that can form patterns that are different from a known pattern of changes, i.e., a series of objects routinely traverse the image in a known pattern and the information extracted is that the objects being observed have changed that pattern. The specific information may be based upon changes that are inconsistent with specific activities, i.e., activities within a marine port follow a complex pattern a specific piece of information extracted may be a deviation from that complex pattern indicating a change in a behavior.

A combination of specific, extracted information, e.g., change detection, pattern change detection and signatures among others, may be combined to create a more detailed information extraction on board the satellite to be transmitted to a ground station on the Earth.

An appreciation of the other aims and objectives of the present invention, and a more complete and comprehensive understanding of this invention, may be obtained by studying the following description of a preferred embodiment, and by referring to the accompanying drawings.

A BRIEF DESCRIPUON OF THE DRAWINGS

FIG. 1 exhibits the prior art, which employs a scanning mirror to direct light collected from the Earth's surface into imaging optics, and then onto a focal plane.

Figure 4:
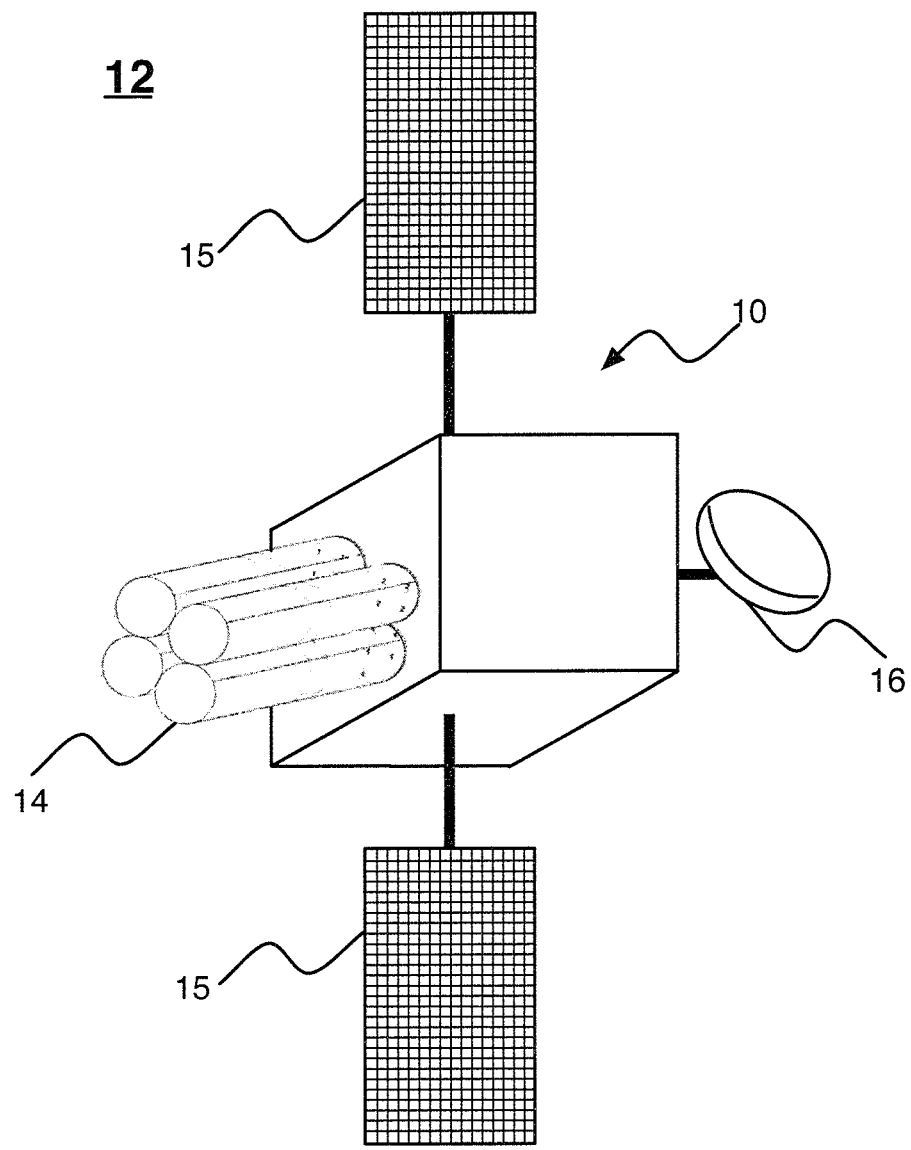

FIG. 4 provides a schematic overview of one embodiment of the invention, which includes a satellite equipped with an array of image sensors and a transmitter.

Figure 5:
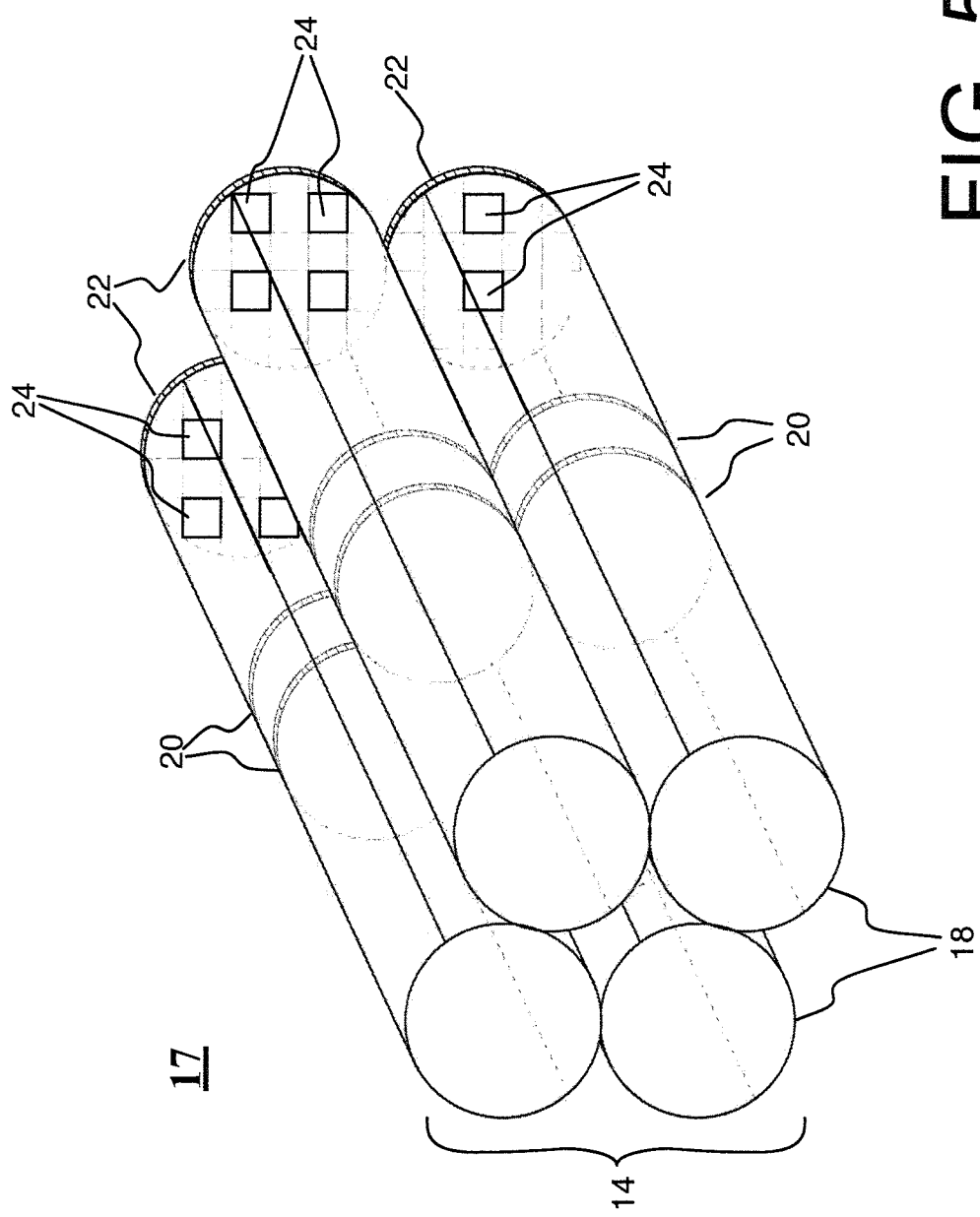

FIG. 5 supplies a schematic overview of one embodiment the present invention, which includes an imaging sensor.

Figure 6:
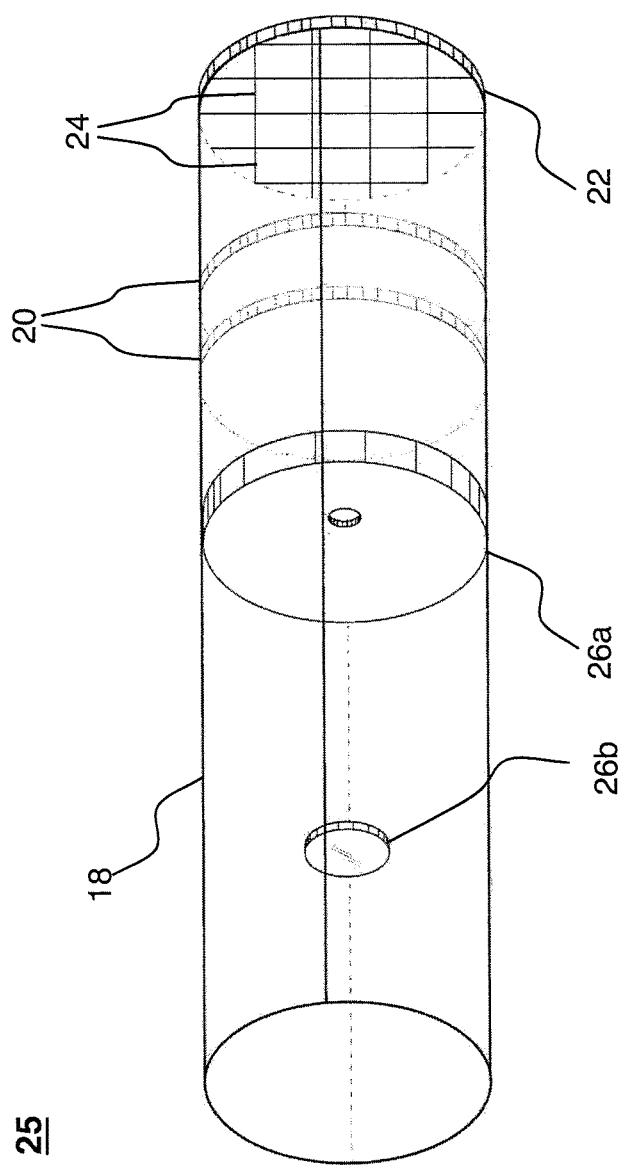

FIG. 6 furnishes a schematic overview of one portion of one embodiment or the present invention, which includes a single co-collimated telescope.

Figure 7:
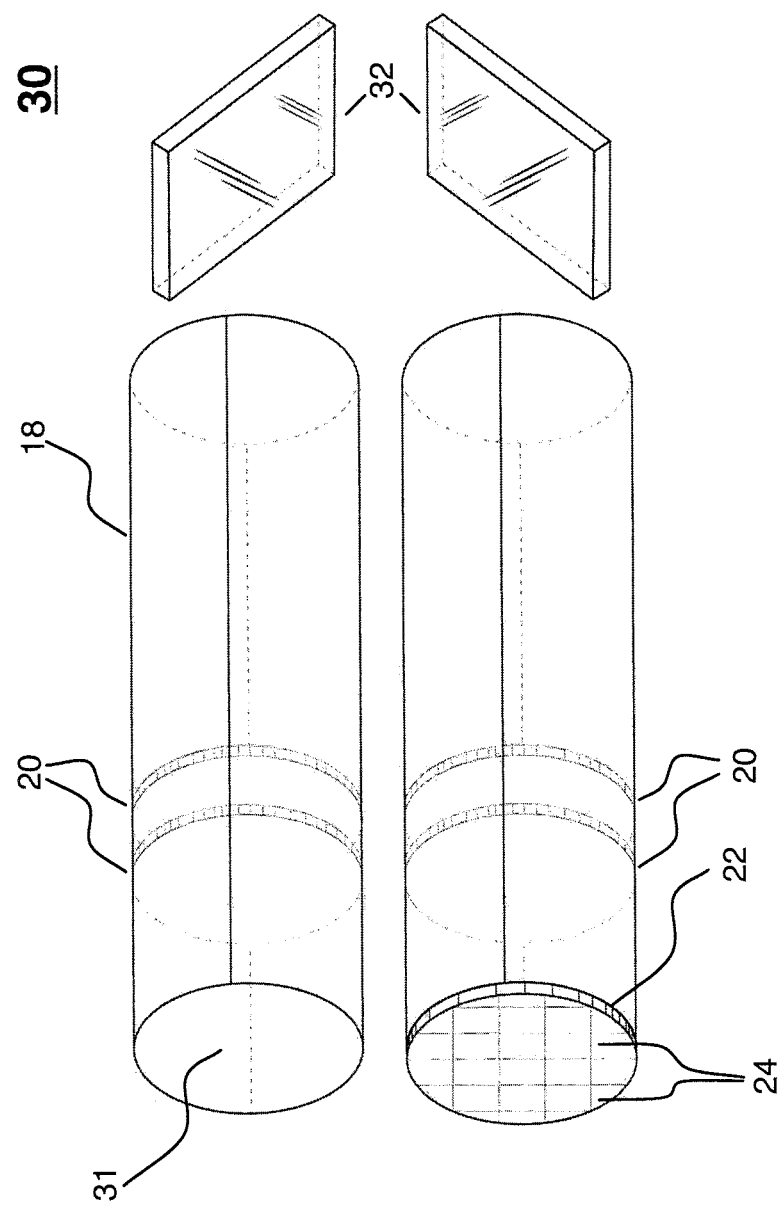

FIG. 7 offers a schematic overview of an alternative embodiment of a single co-collimated telescope.

Figure 8:
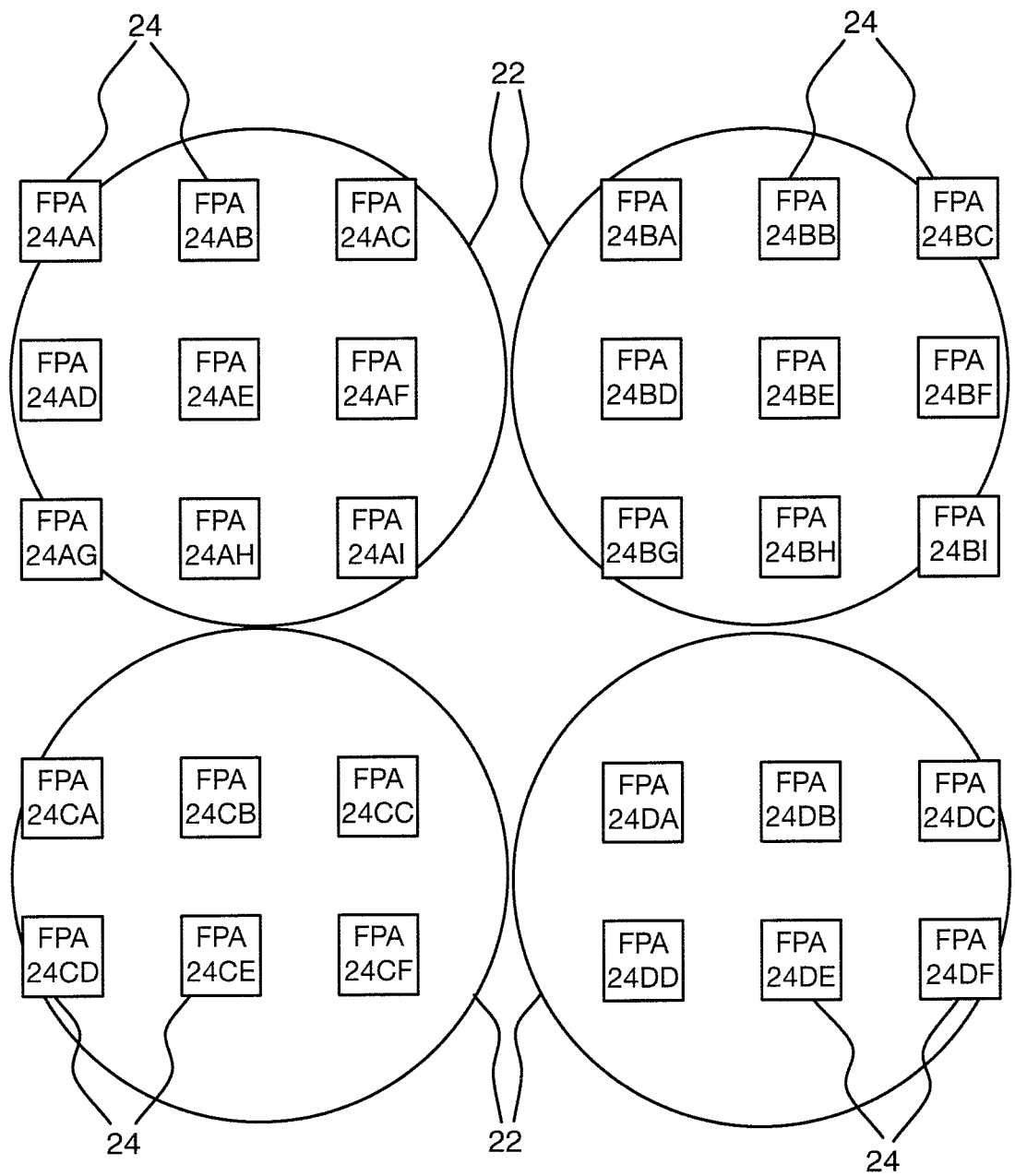

FIG. 8 is a schematic overview of four focal planes.

Figure 9:
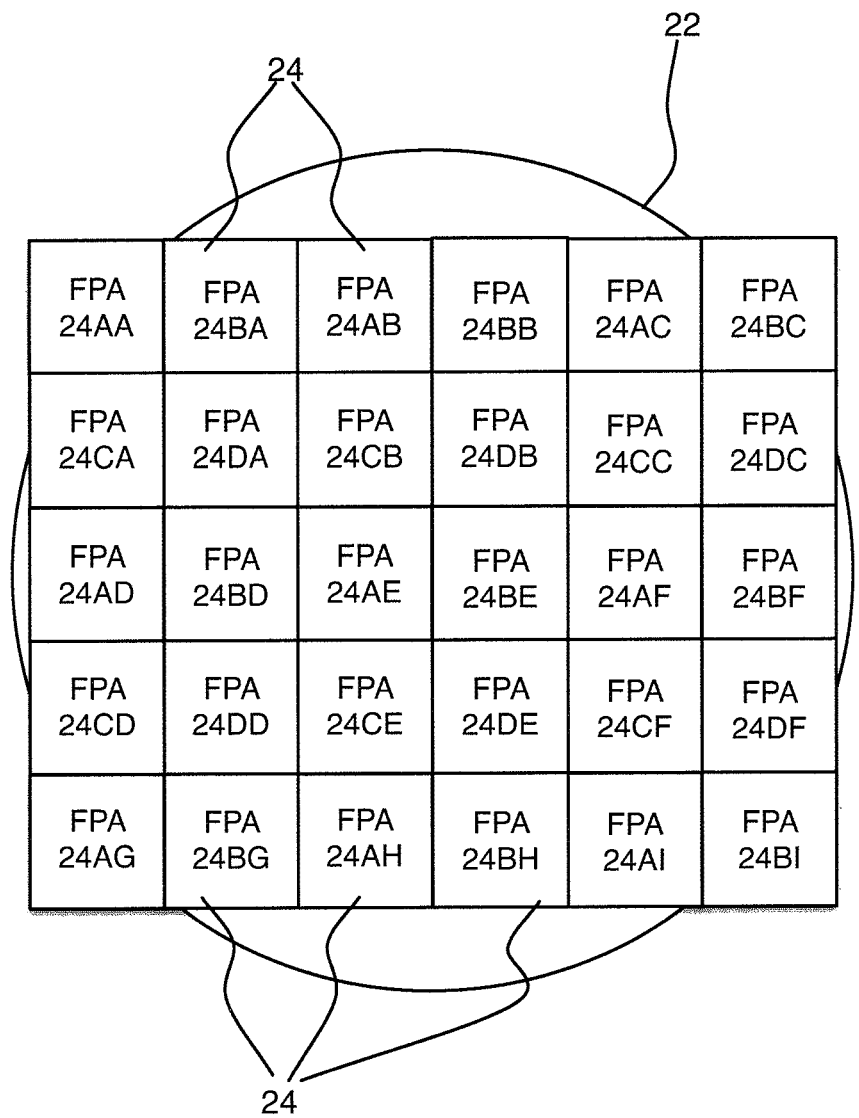

FIG. 9 is a schematic layout of a virtual focal plane showing the interleaved focal plane arrays (FPAs) from four separate physical focal planes.

Figure 10:
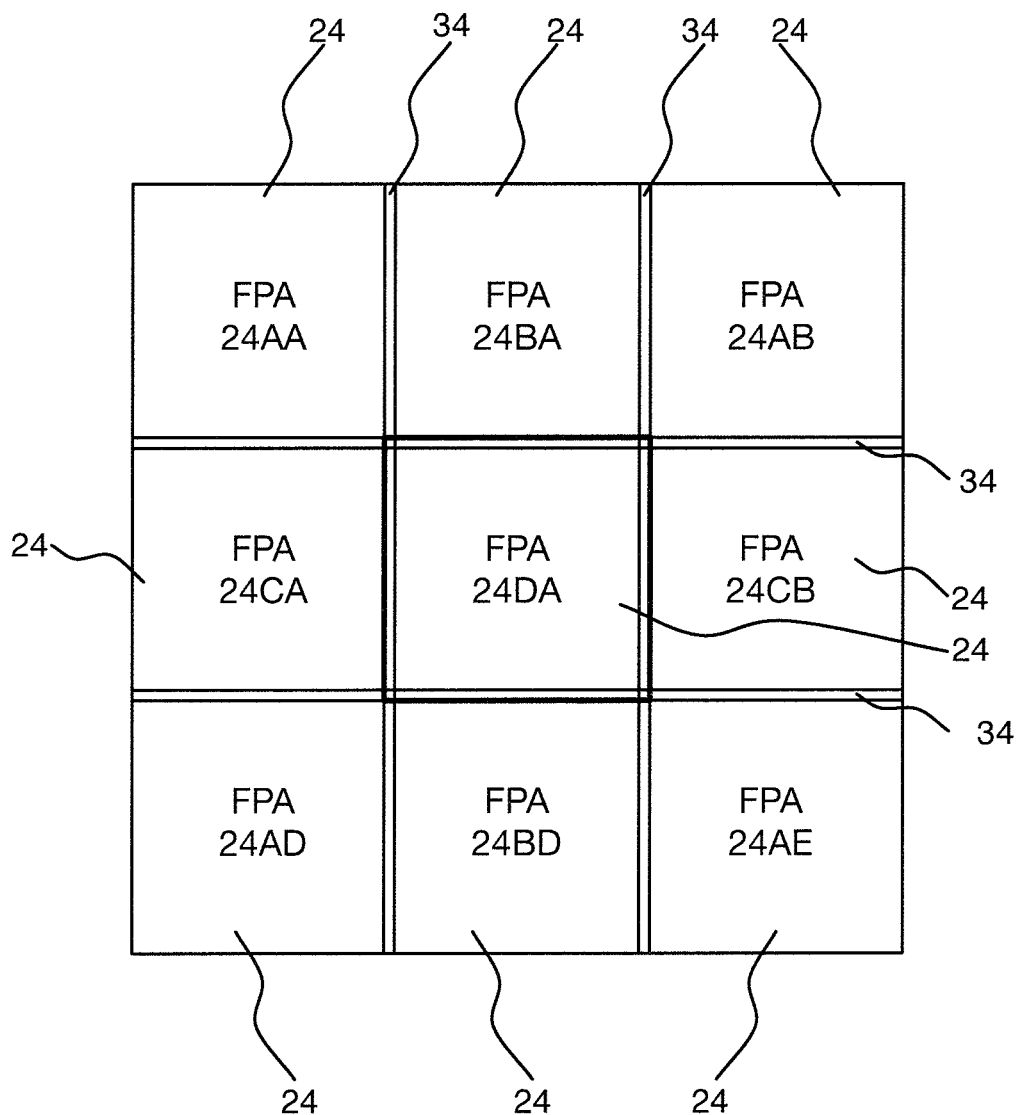

FIG. 10 is a schematic layout showing the overlap of adjacent focal plane arrays when combined on a virtual focal plane.

Figure 11:
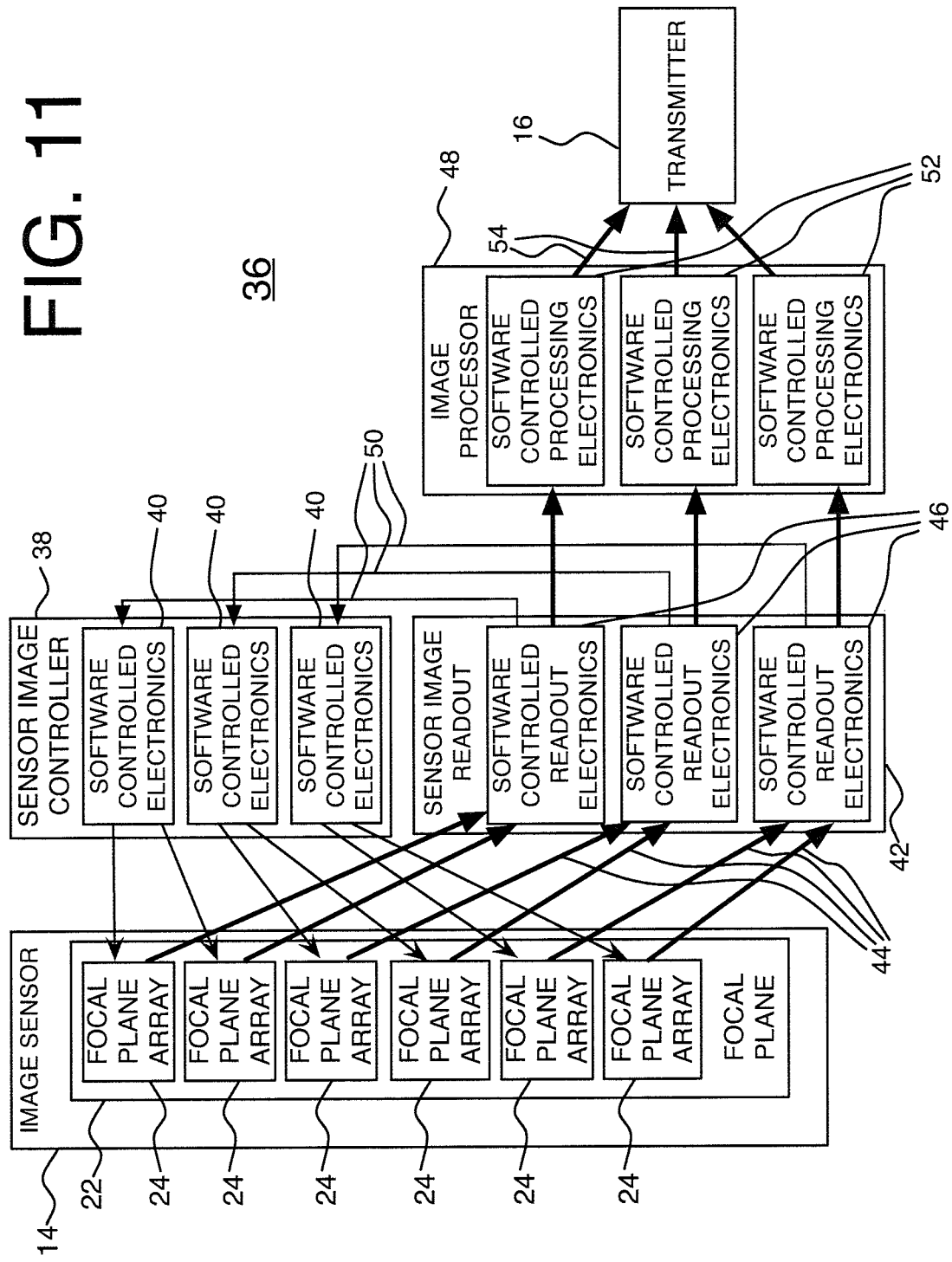

FIG. 11 is a functional block diagram of the data and control flow between the image sensors and its corresponding focal plane.

Figure 12:
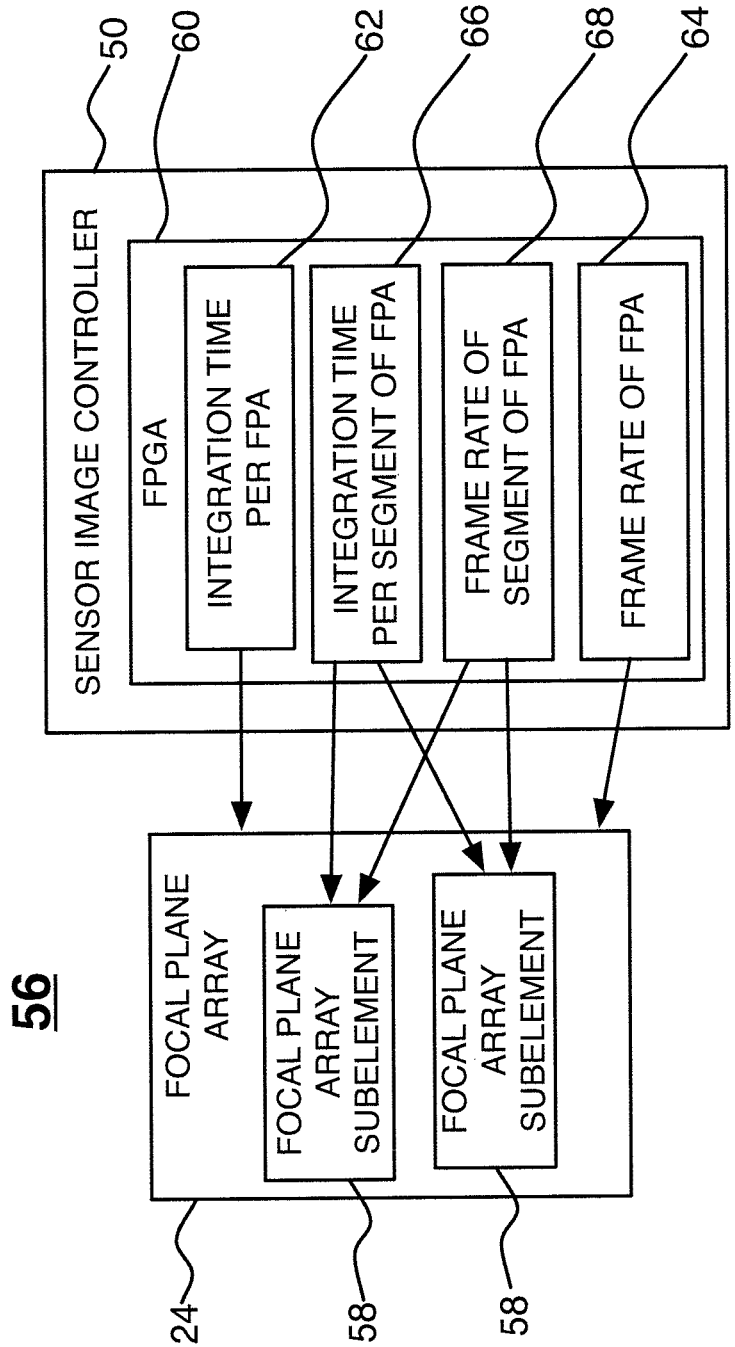

FIG. 12 is a functional block diagram of control devices for each focal plane array.

Figure 13:
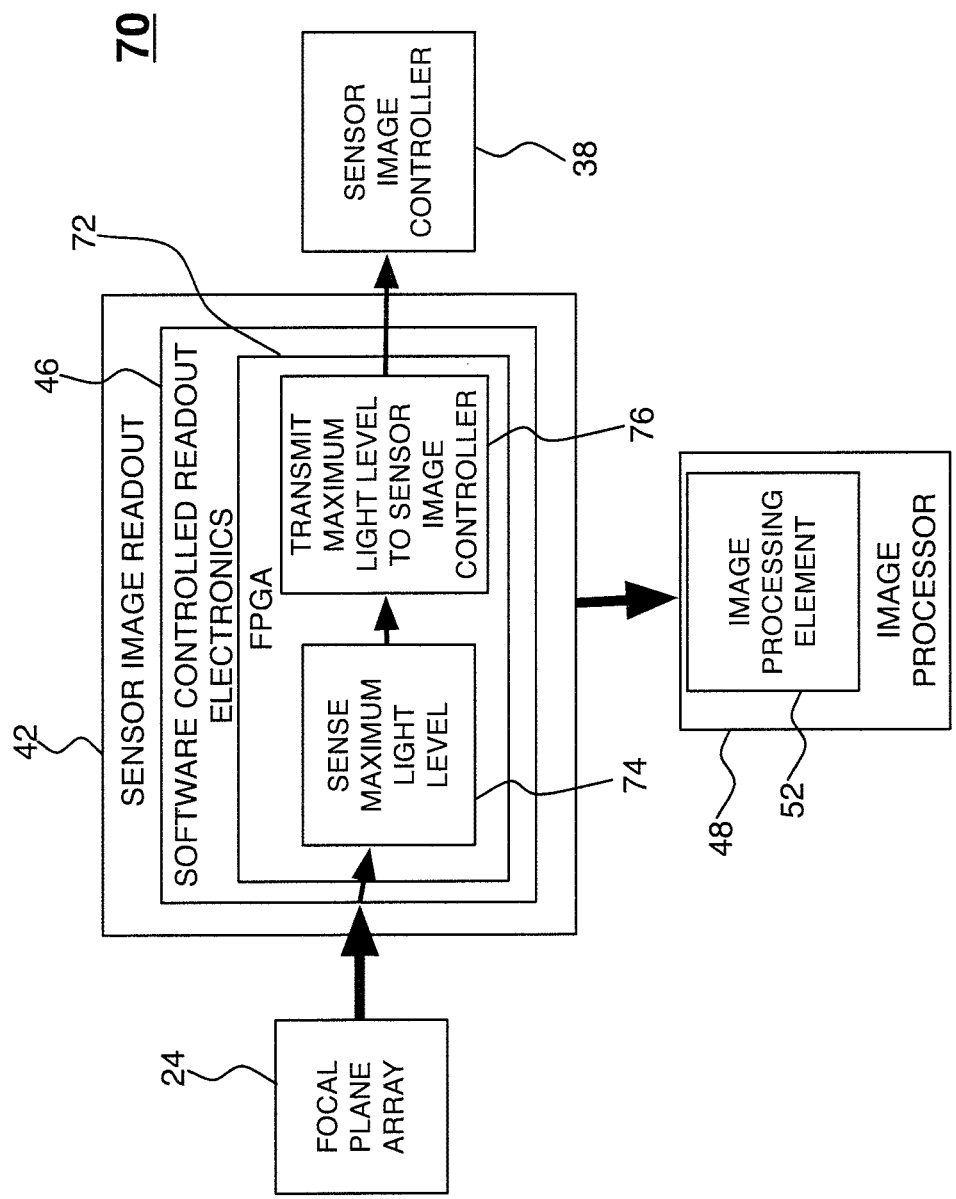

FIG. 13 offers a functional block diagram of the readout of each focal plane array.

Figure 14:
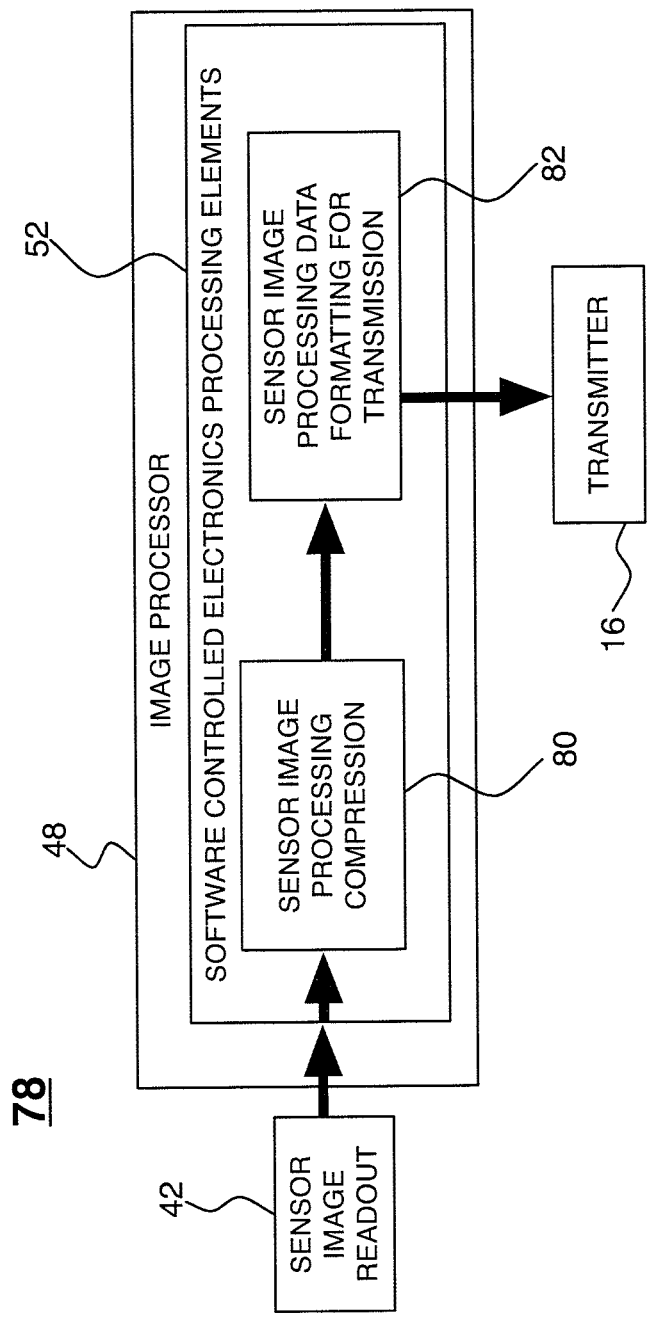

FIG. 14 furnishes a functional block diagram of a method of processing images and data from the sensor image readout by the image processing element.

Figure 15:
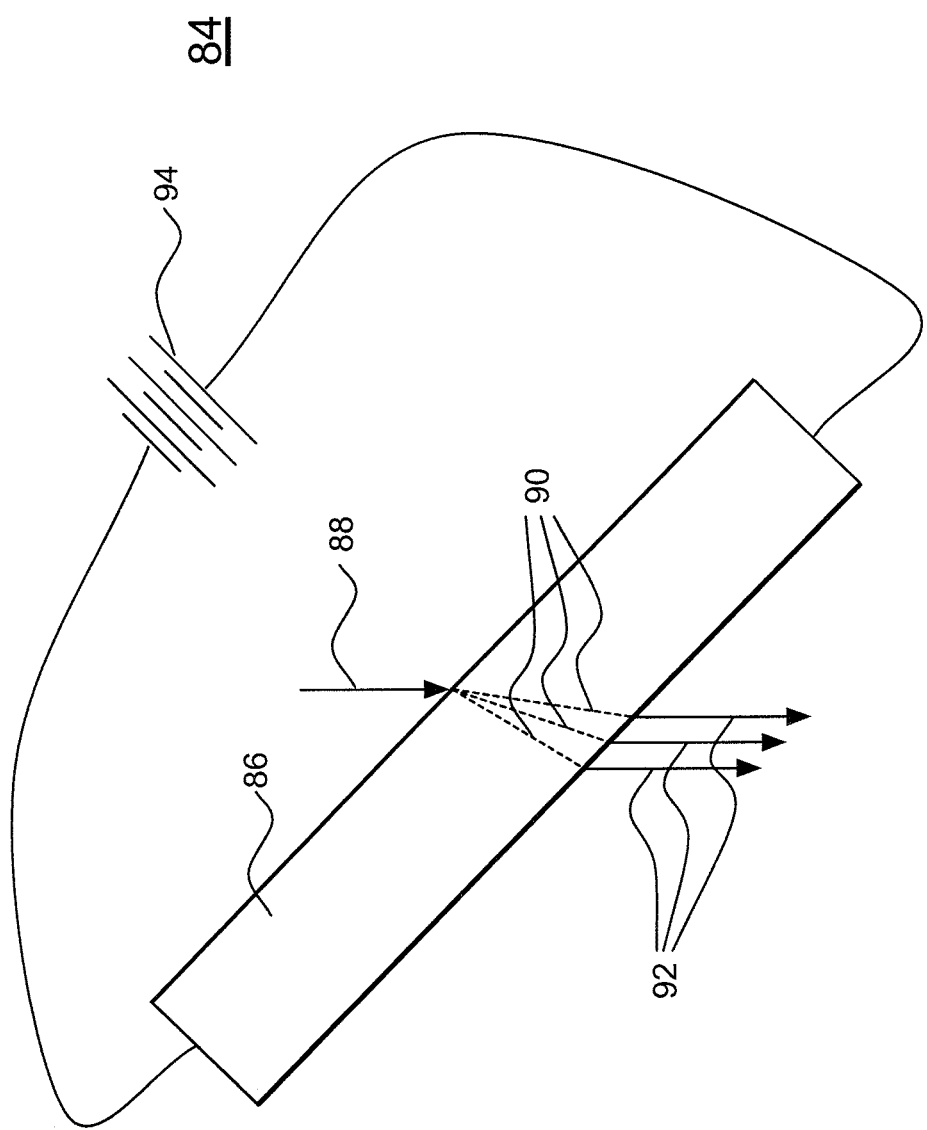

FIG. 15 shows a plate, which is made from a material having an electrically reactive high index of refraction.

FIGS. 16A and 16B provide schematic diagrams of one embodiment of a pair of electrically reactive high index of refraction material plates.

Figure 17:
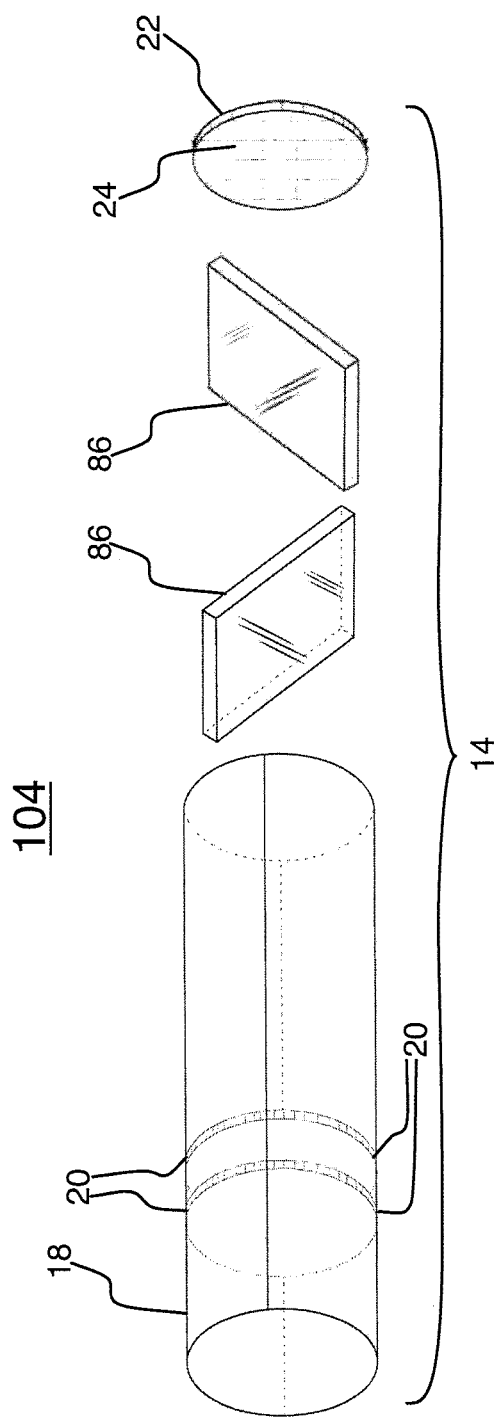

FIG. 17 is a schematic diagram of one embodiment of an imaging sensor showing a telescope and optical elements.

Figure 18:
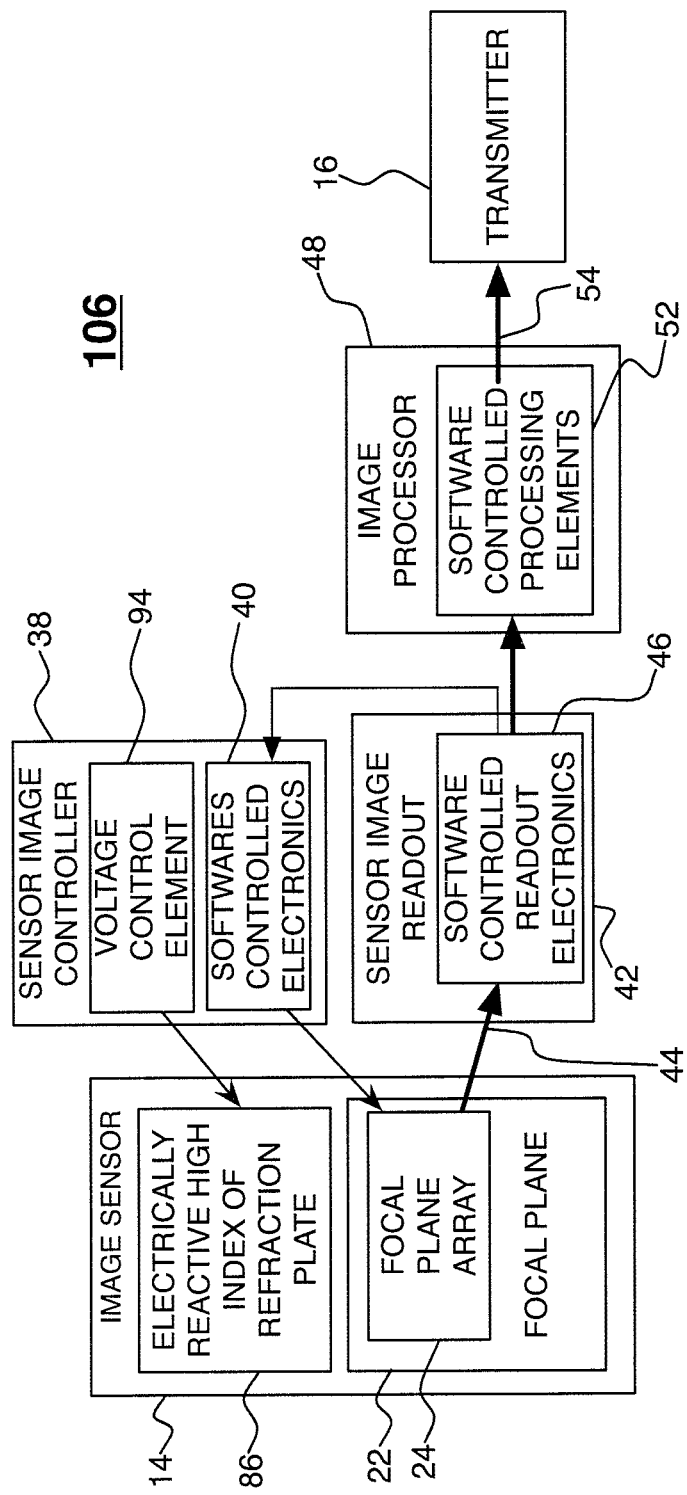

FIG. 18 is a functional block diagram of the data and control flow between the image sensor and a software controlled focal plane array.

Figure 19:
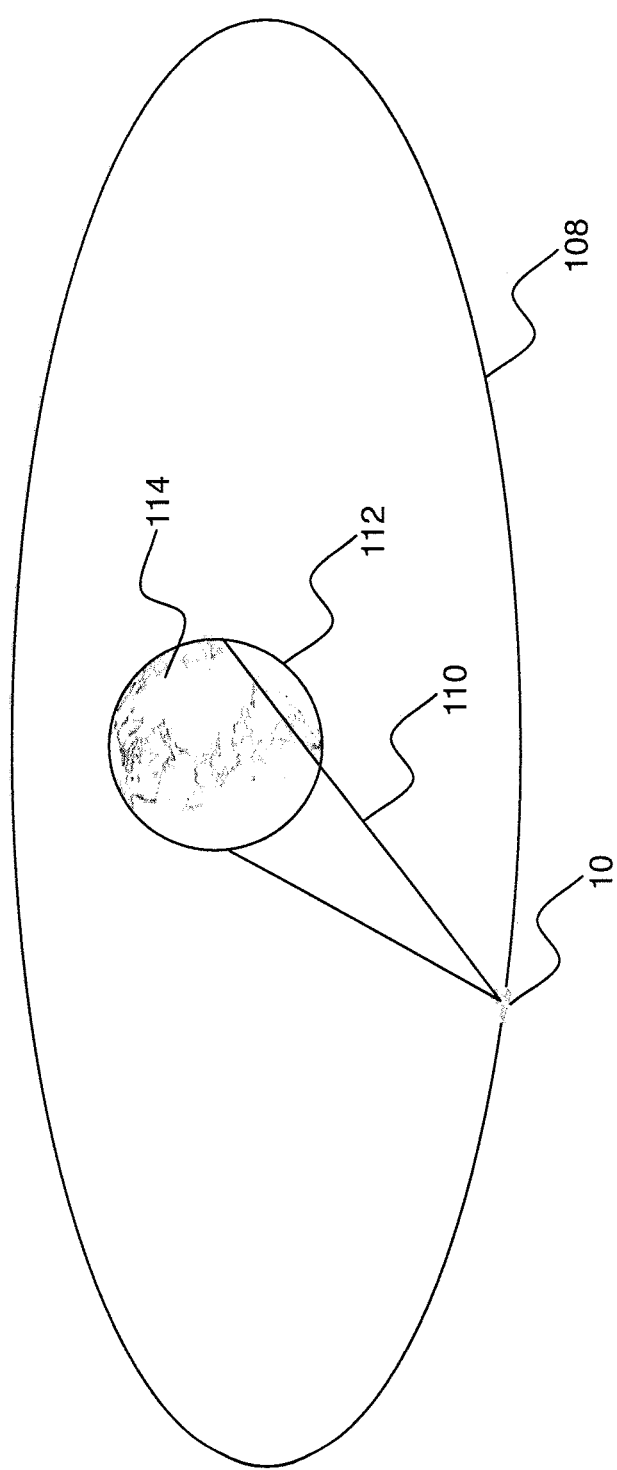

FIG. 19 shows a 3D diagram of a satellite in geostationary orbit (GSO).

Figure 20:
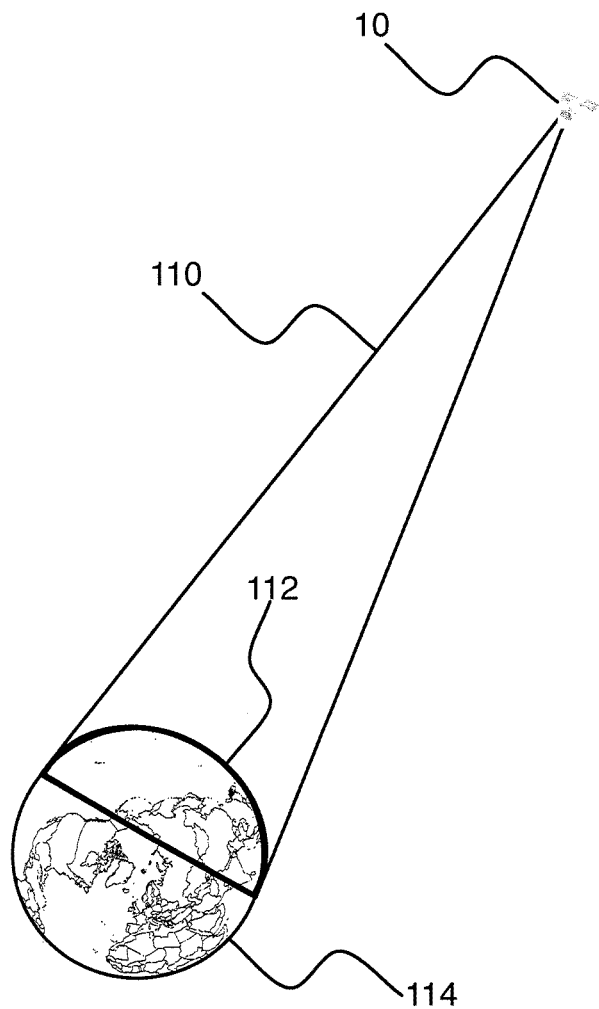

FIG. 20 furnishes a schematic diagram of one embodiment of a satellite in geostationary orbit (GSO) showing, the observable region of the Earth.

Figure 21:
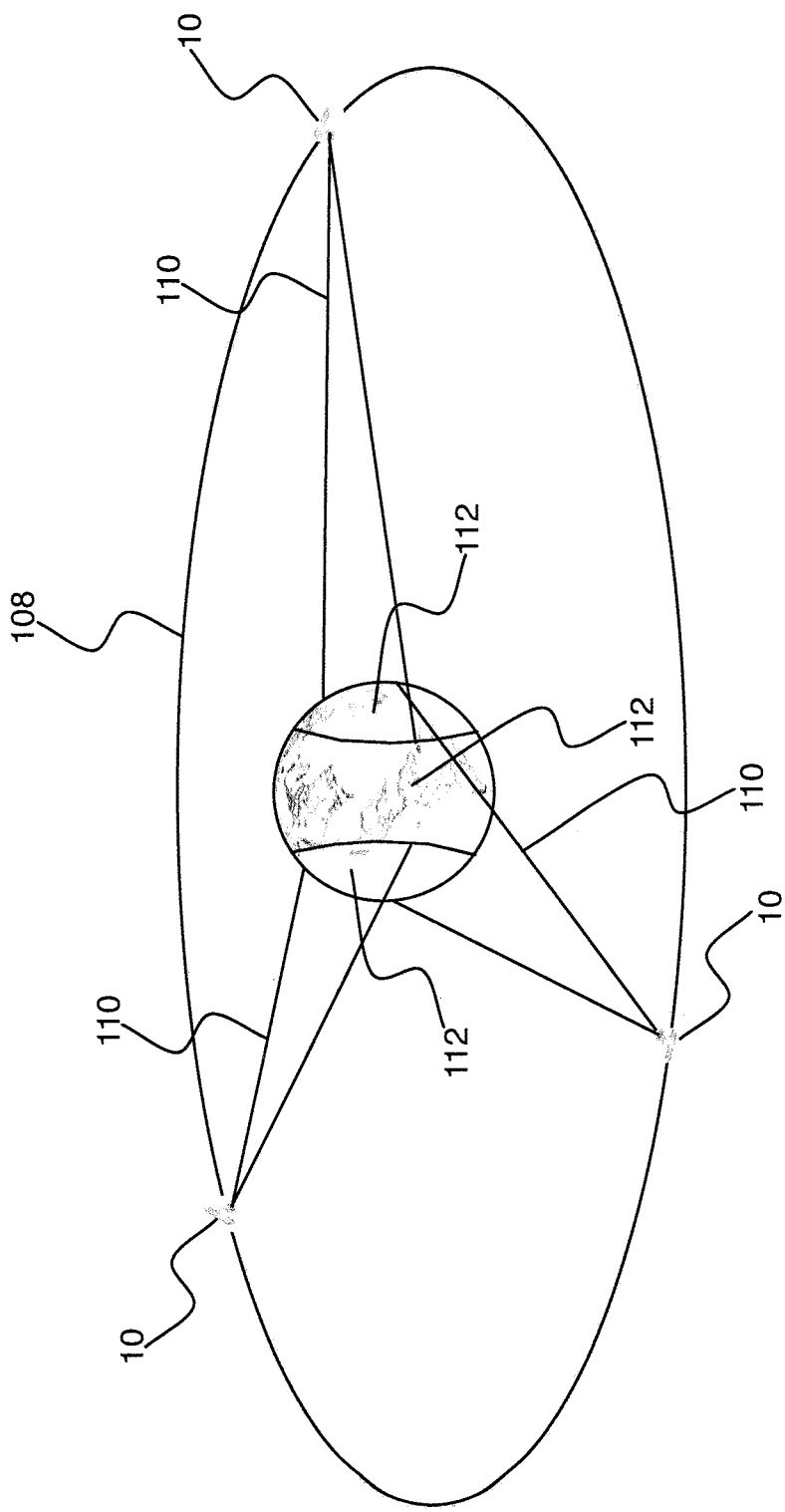

FIG. 21 shows a 3D diagram of throe equally spaced satellites in geostationary orbit (GSO).

Figure 22:
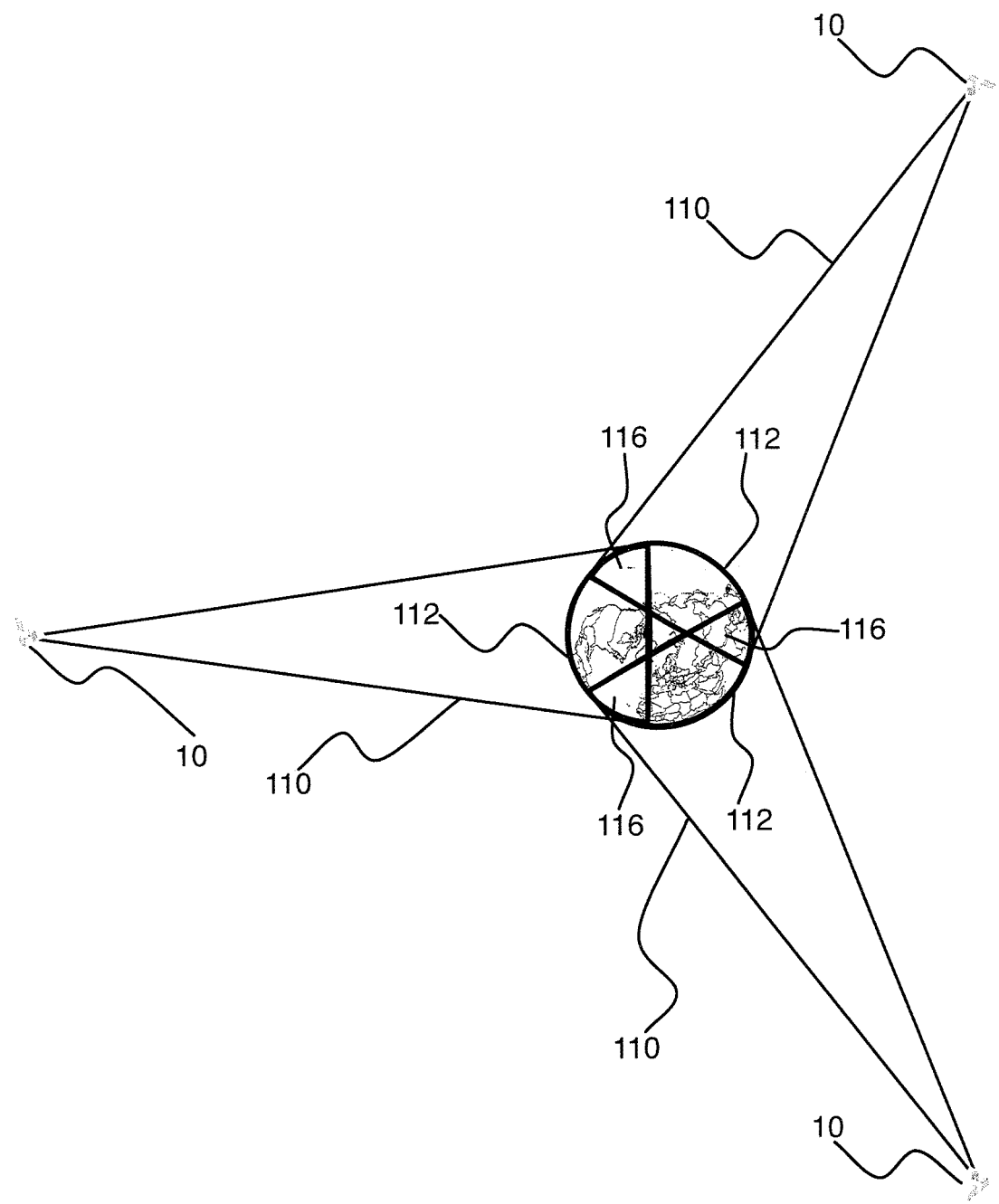

FIG. 22 shows the geostationary observable hemisphere of each of three equally spaced GSO satellites.

Figure 23:
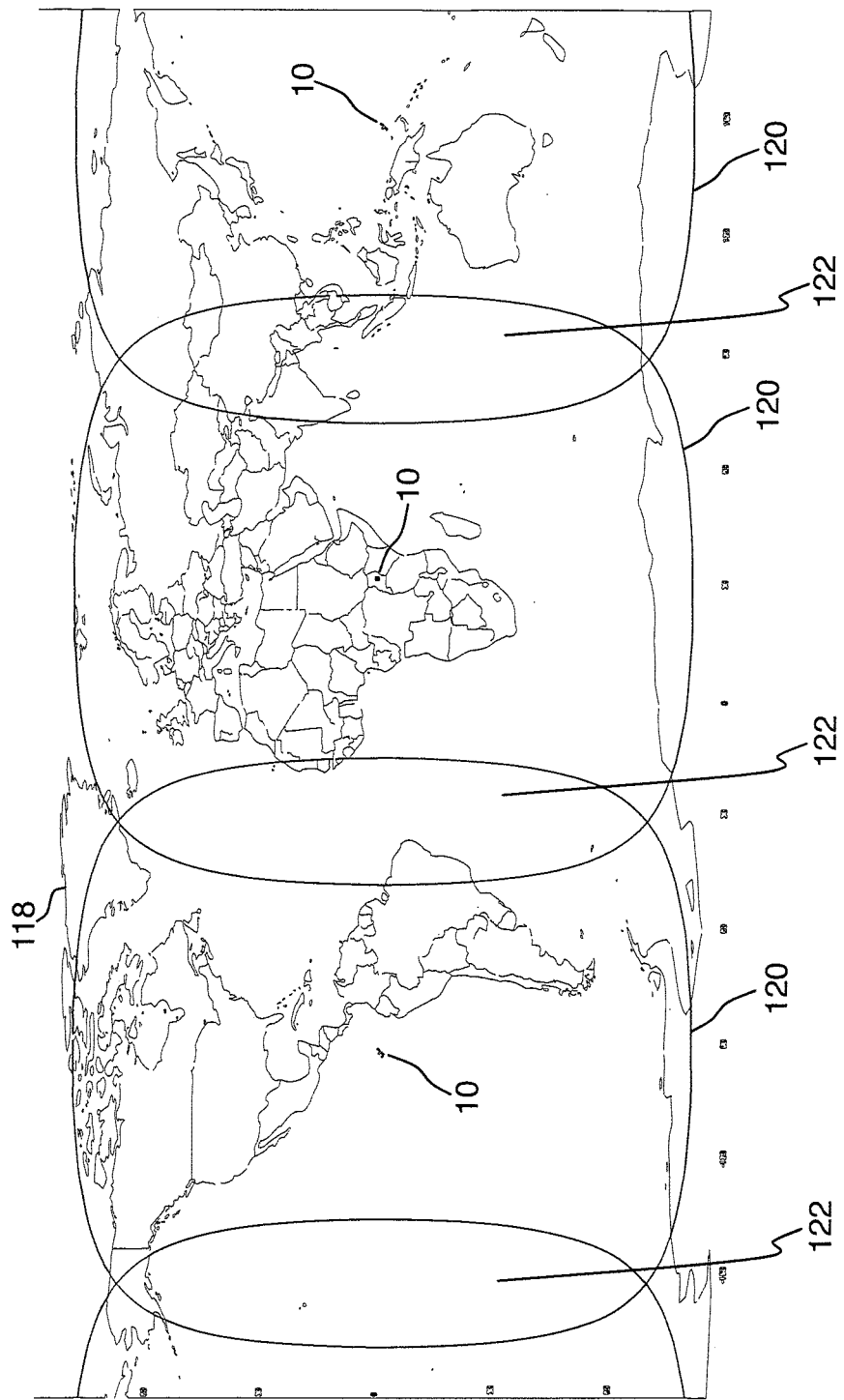

FIG. 23 finishes a schematic diagram of the observable regions of the Earth of three satellites in GSO as shown in a Cylindrical Projection map.

Figure 24:
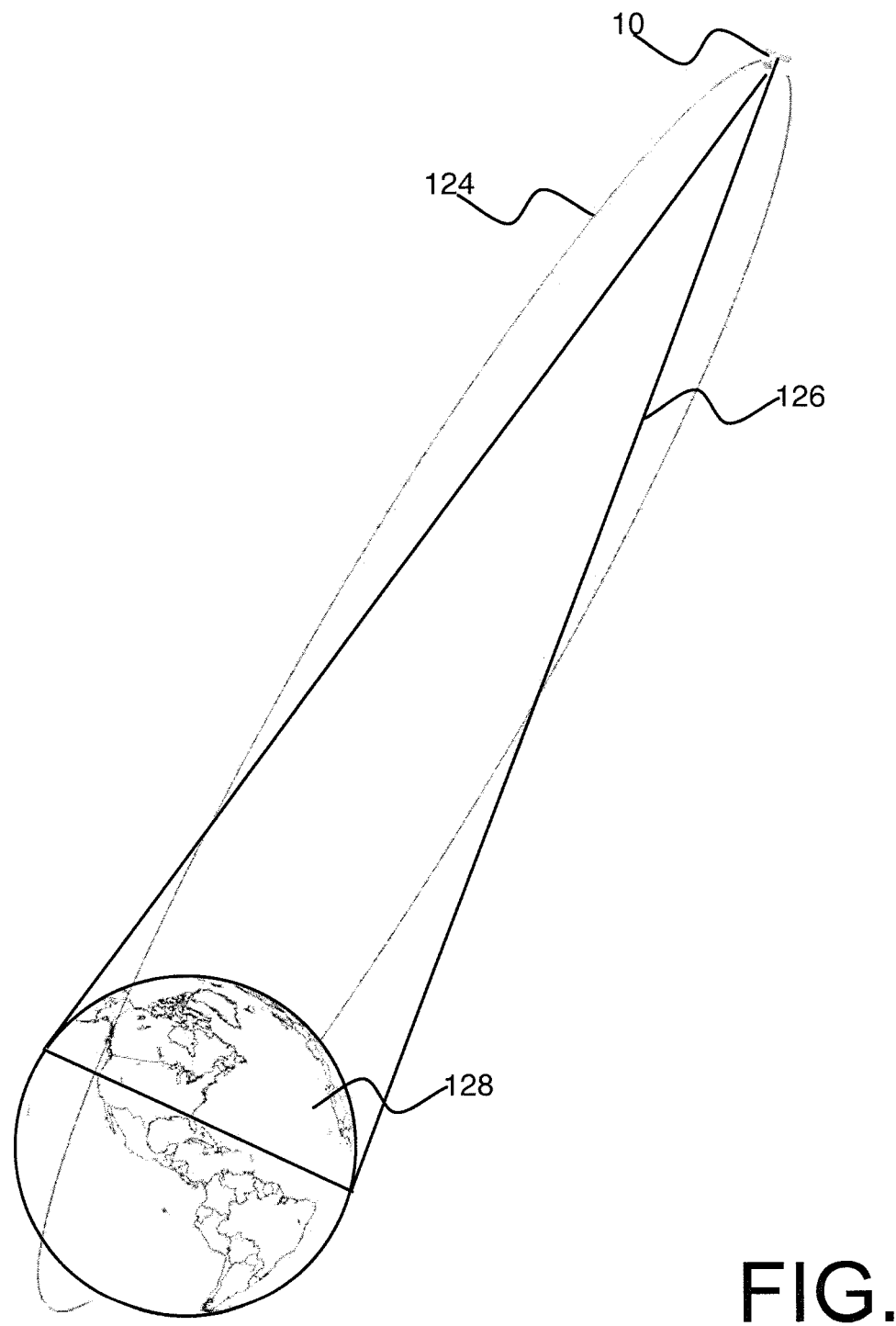

FIG. 24 shows a 3D diagram of a single satellite in a Molniya Orbit.

Figure 25:
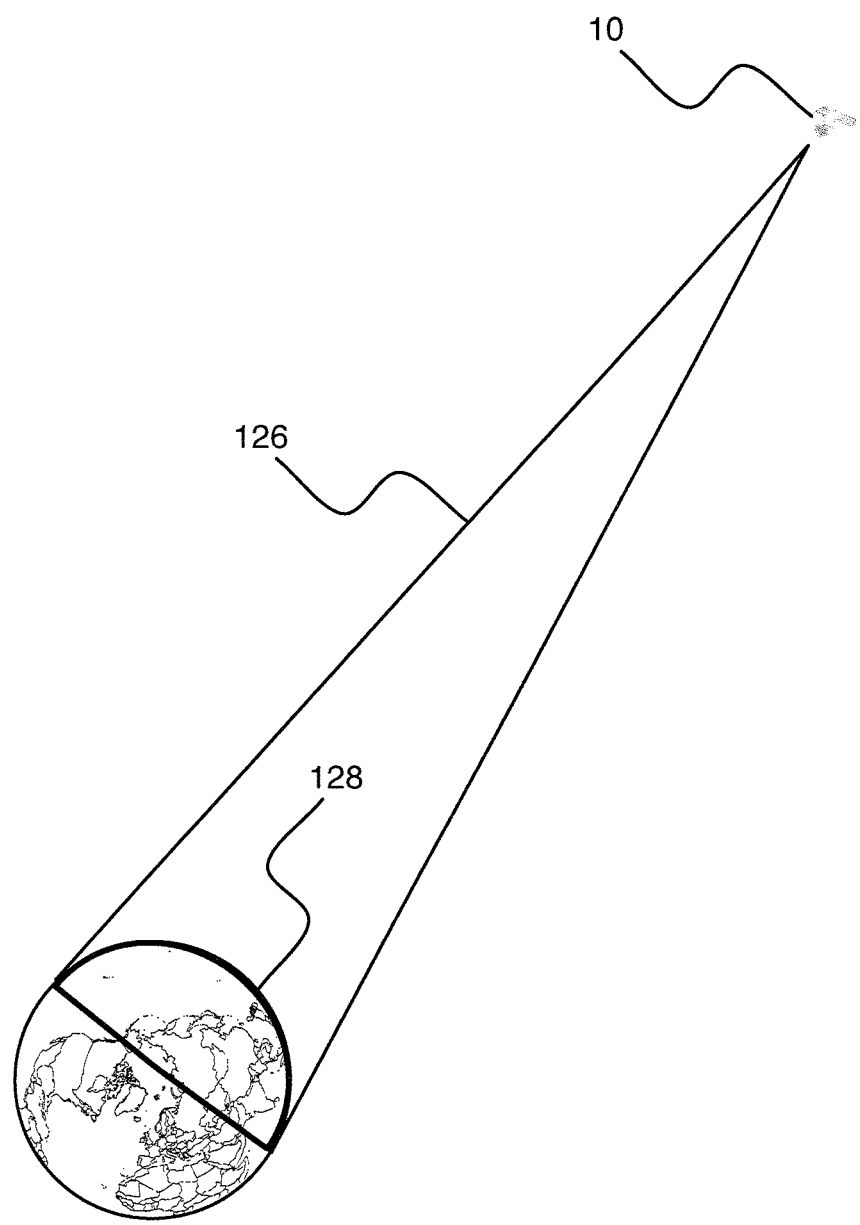

FIG. 25 illustrates a single satellite in a Molniya orbit showing the associated observable area when the satellite is at apogee.

Figure 26:
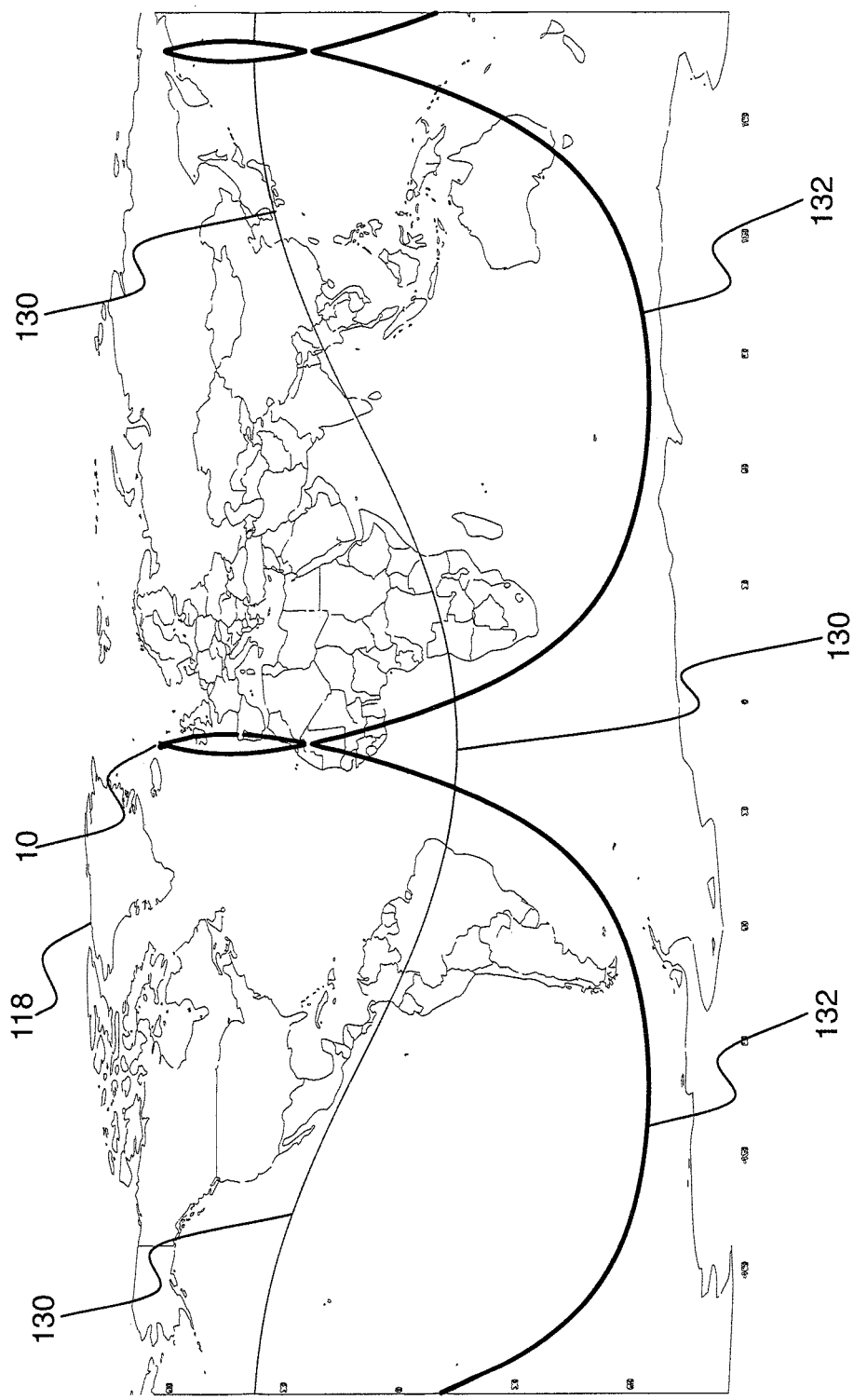

FIG. 26 shows a 2D Cylindrical Projection of Molniya Orbit Ground Track and Observable Area at apogee.

Figure 27:
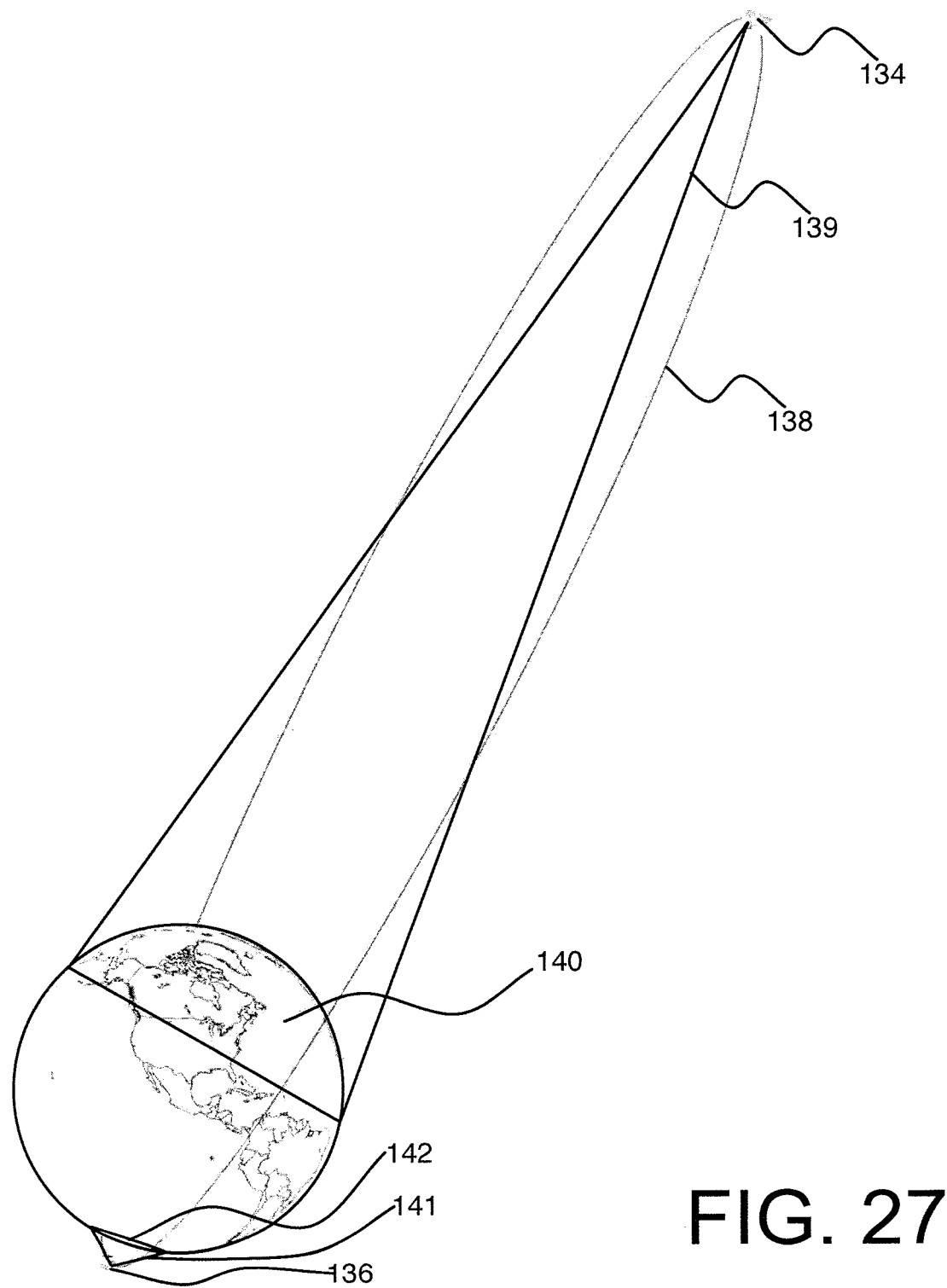

FIG. 27 is a 3D diagram of two satellites in Molniya Orbits.

Figure 28:
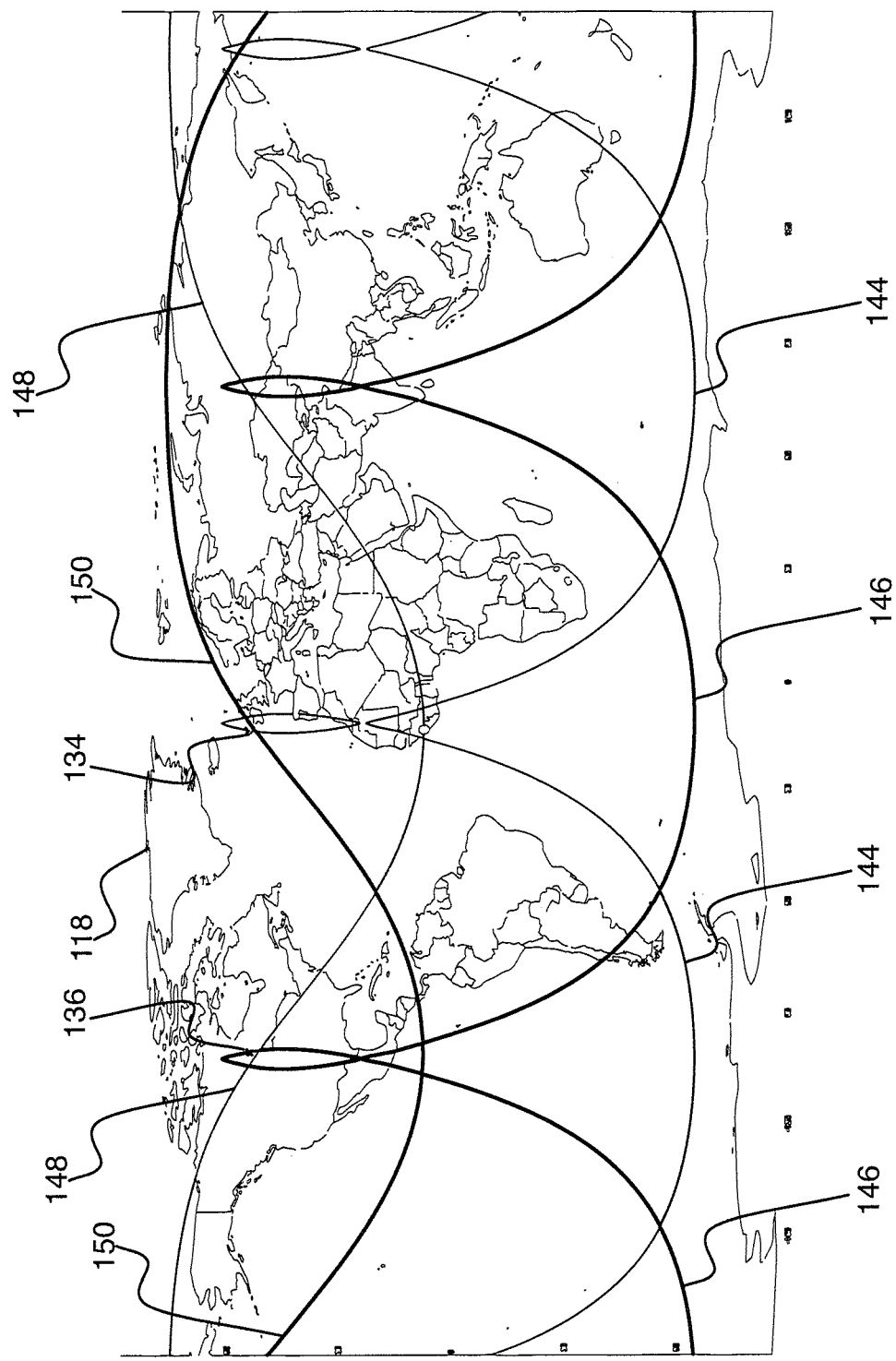

FIG. 28 is a 2D Cylindrical Projection showing two Molniya Orbit satellites, the respective ground tracks, and the respective observable areas.

Figure 29:
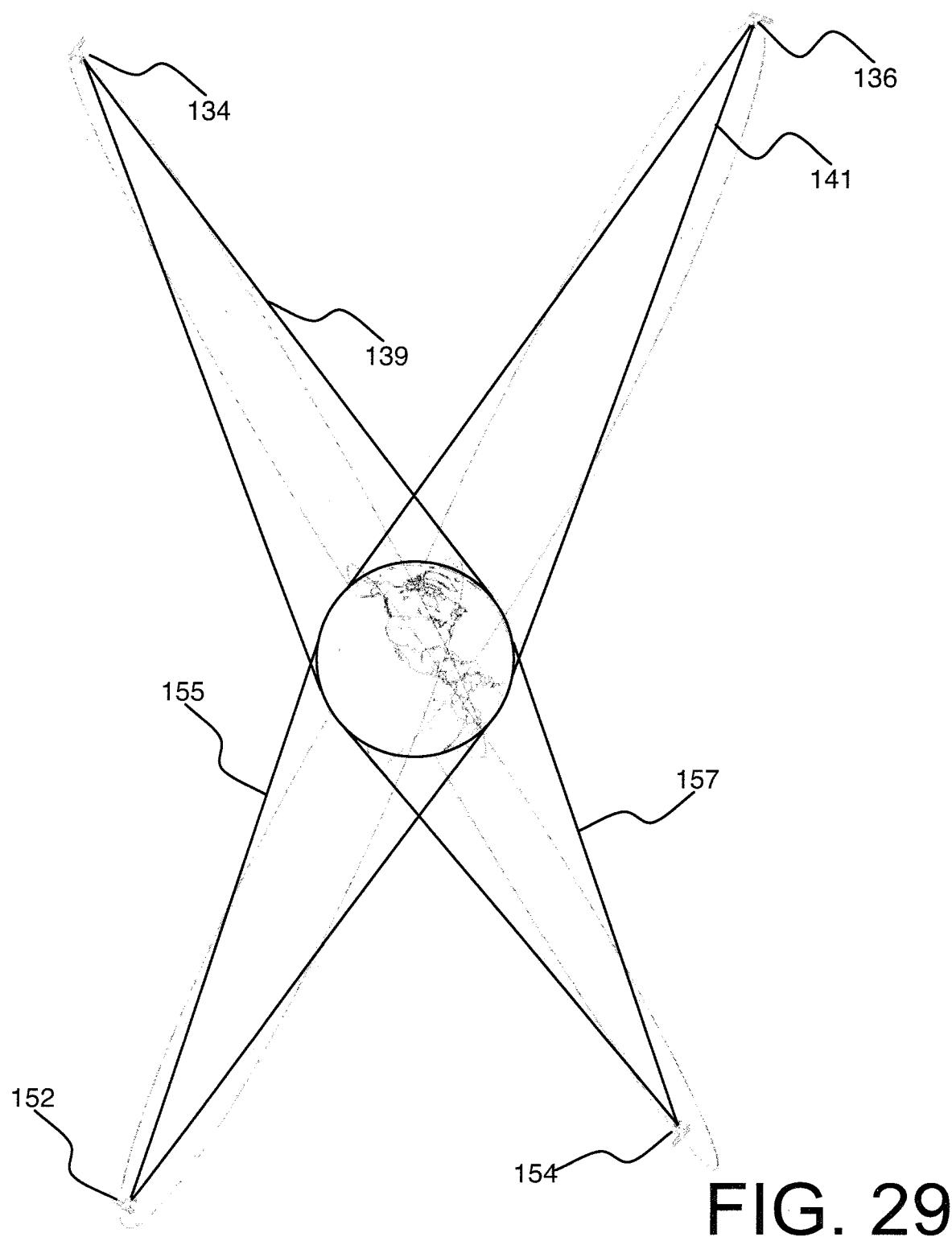

FIG. 29 is a 3D diagram of four satellites in Molniya Orbits with two satellites with apogees North of the equator and two satellites with apogees South of the Equator.

Figure 30:
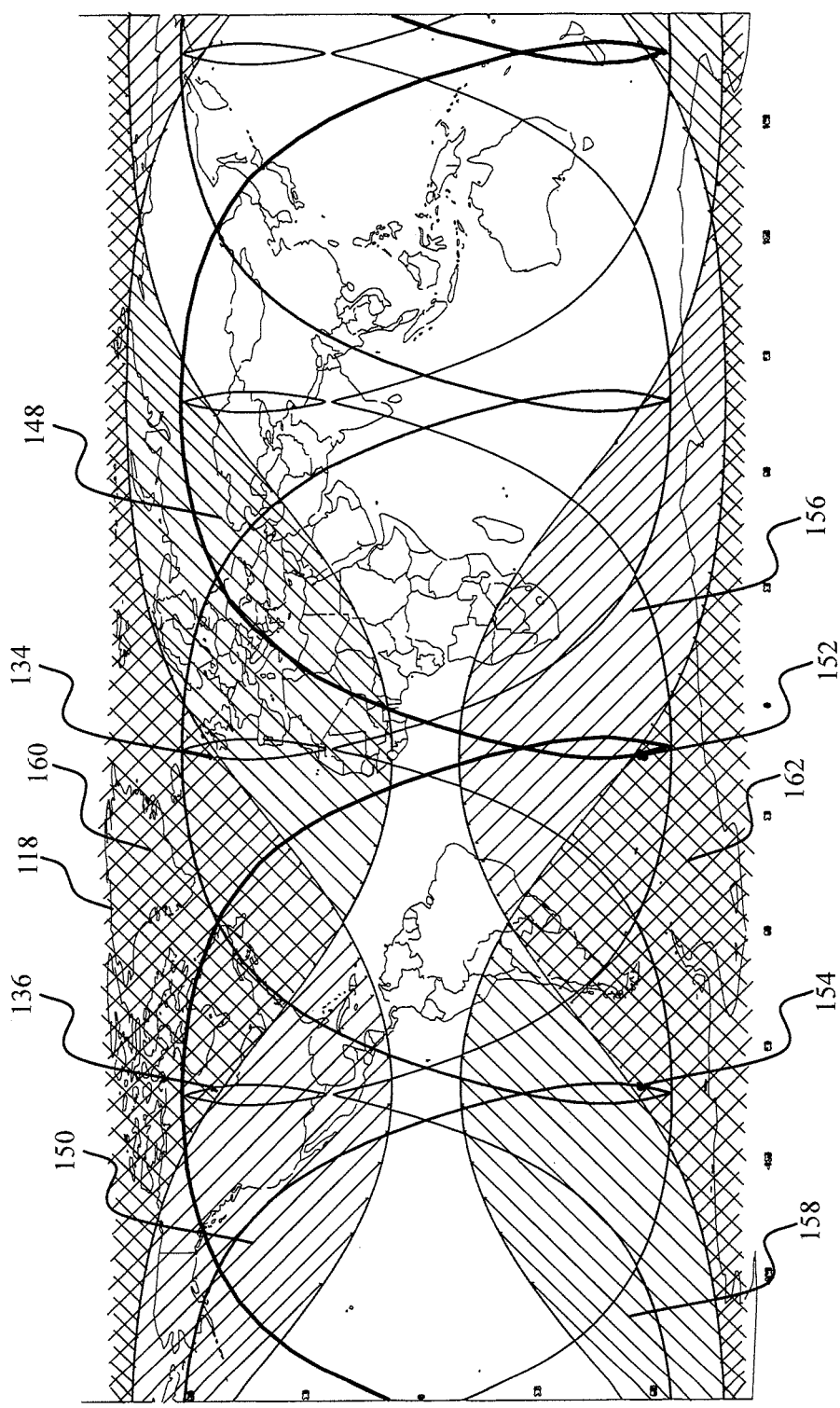

FIG. 30 is a 2D Cylindrical Projection showing 4 Molniya orbits and observable areas and overlap areas.

Figure 31:
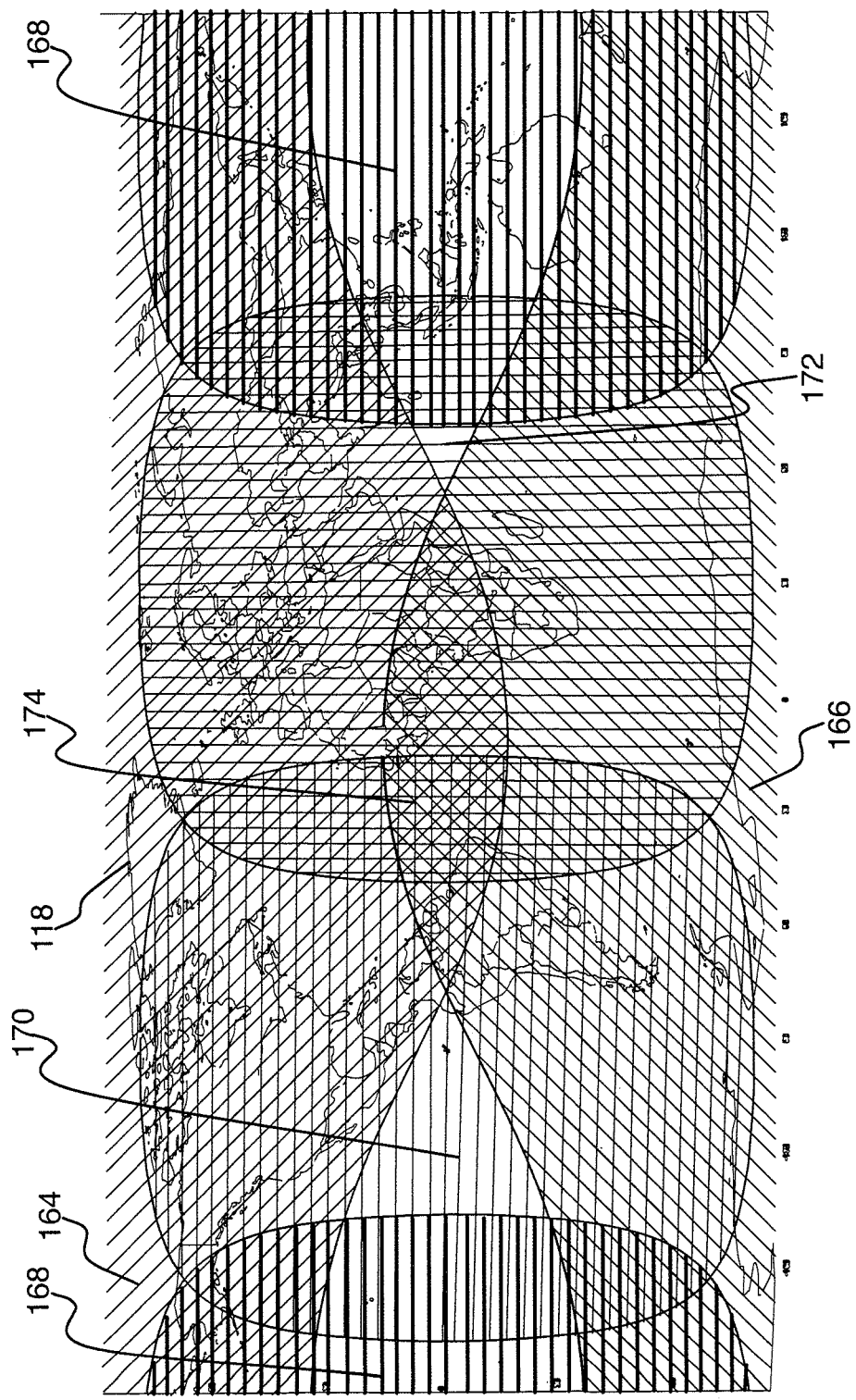

FIG. 31 shows observation areas and observation areas overlap of two Molniya Satellites at apogee and three equally spaced geostationary satellites.

Figure 32:
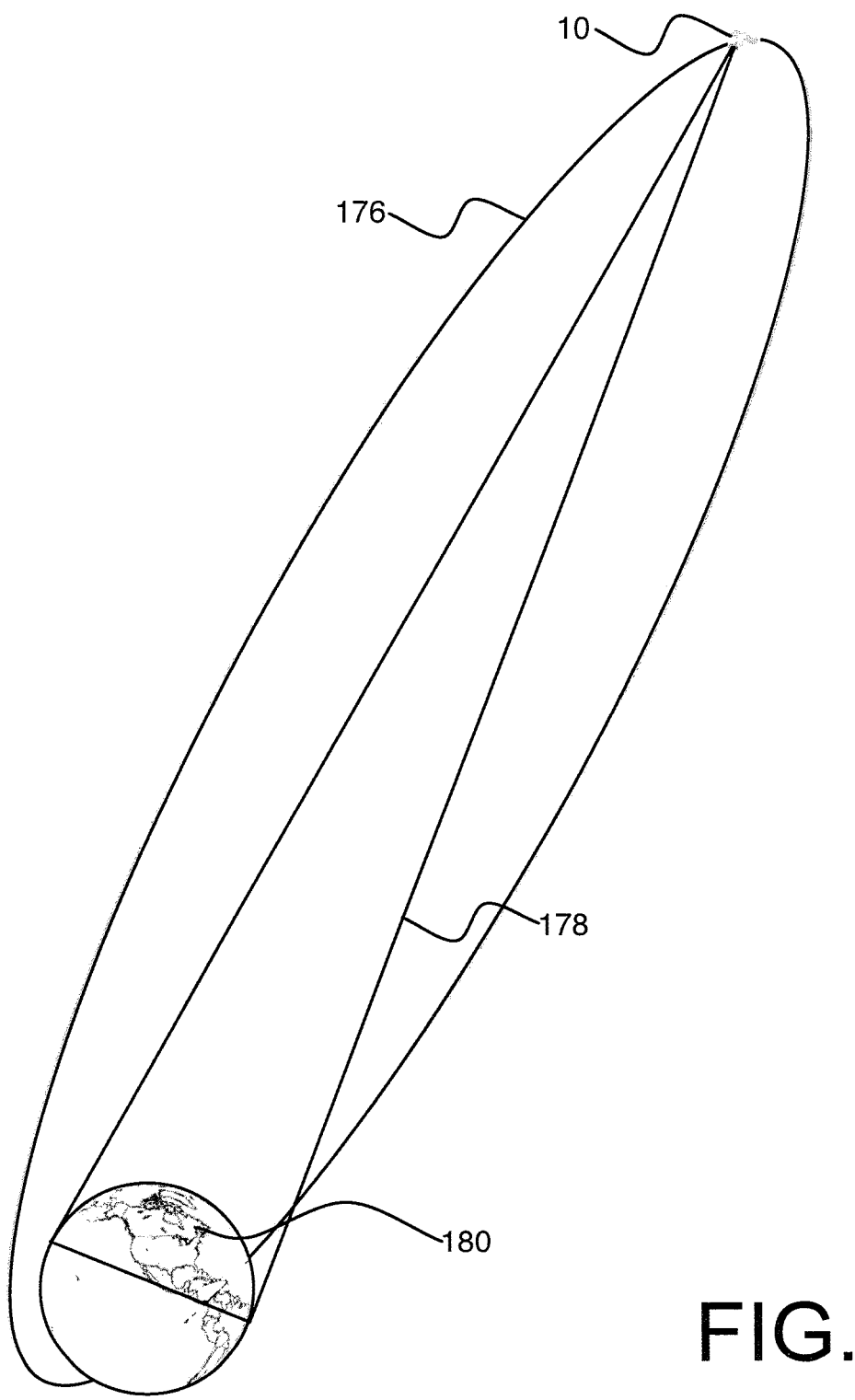

FIG. 32 is a 3D diagram of a satellite in a Highly Elliptical Orbit (HEO).

Figure 33:
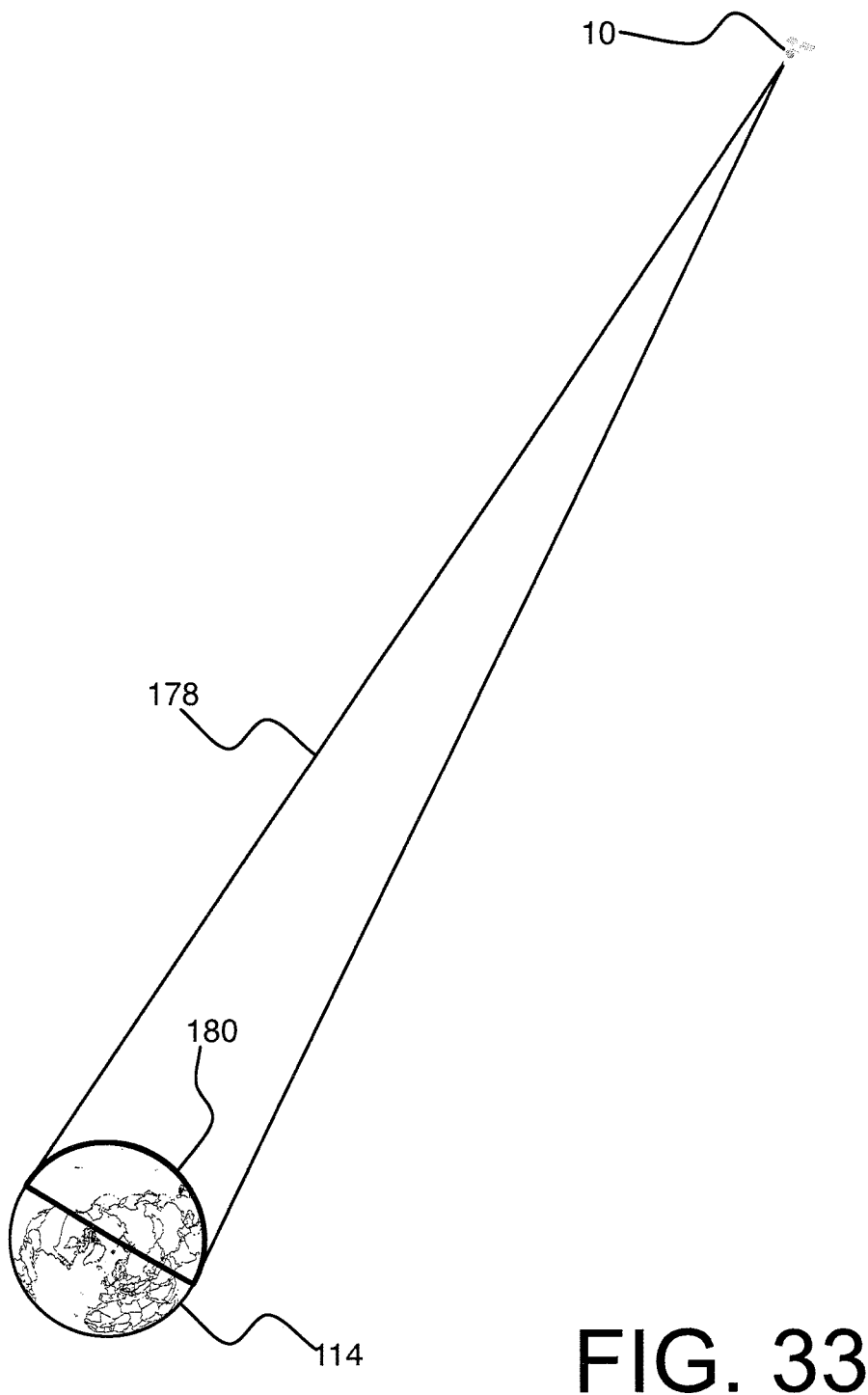

FIG. 33 is schematic of the field of view and observation area of a satellite in a highly elliptical orbit.

Figure 34:
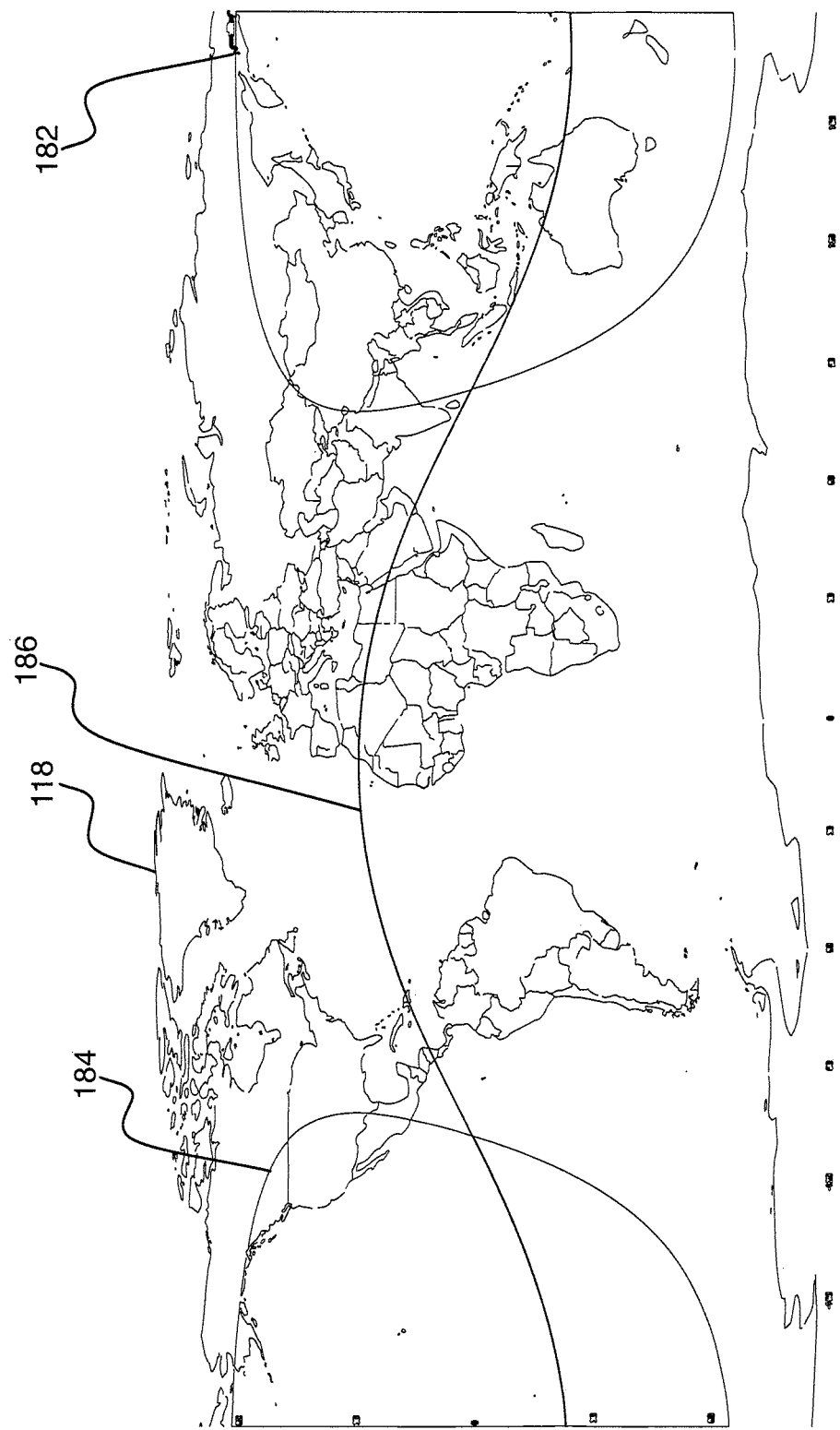

FIG. 34 shows 2D Cylindrical Projection showing the footprint of a 24 hour orbit Highly Elliptical Orbit satellite at apogee.

Figure 35:
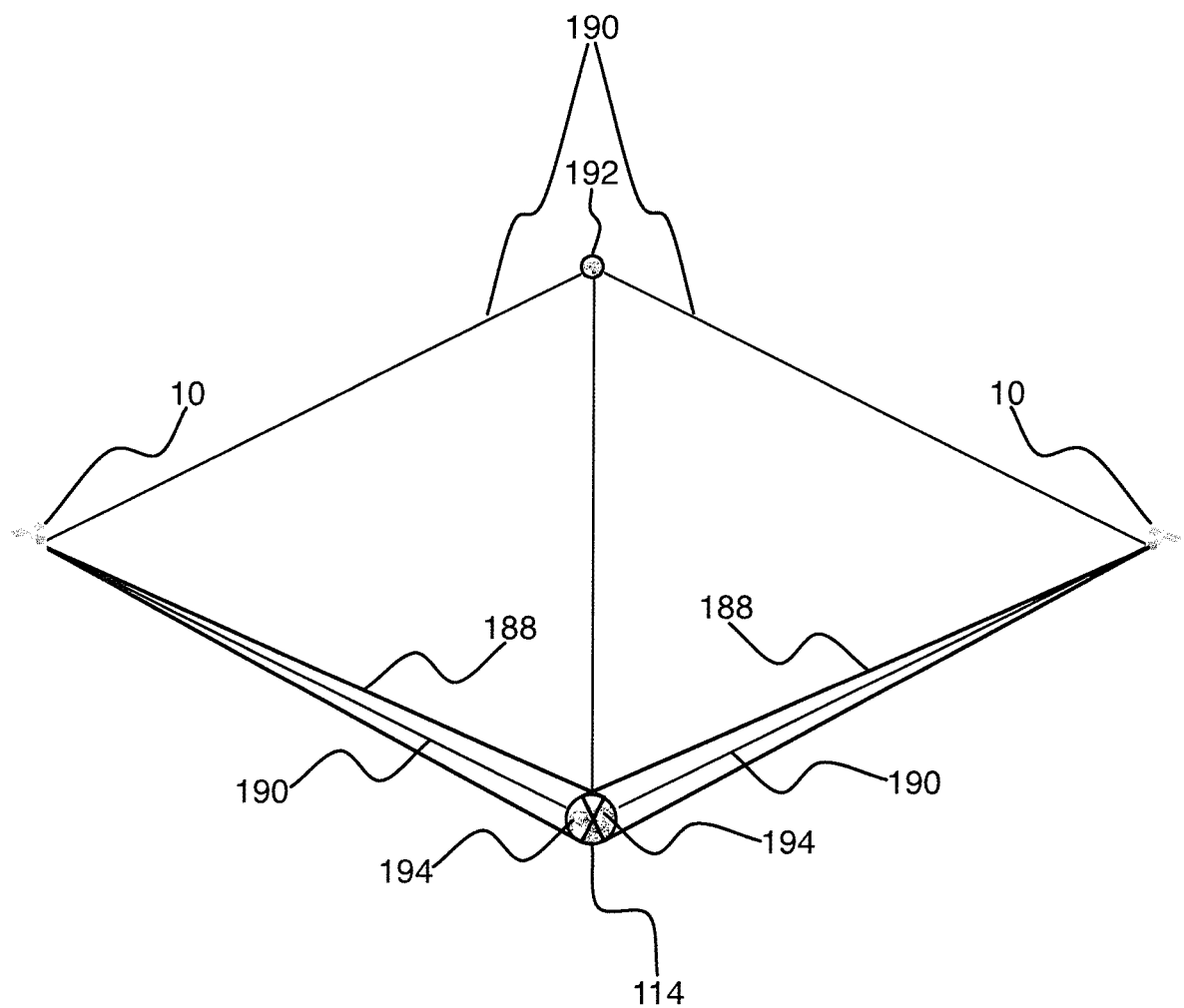

FIG. 35 exhibits Lagrange Point satellites and their Field of View of the Earth.

Figure 36:
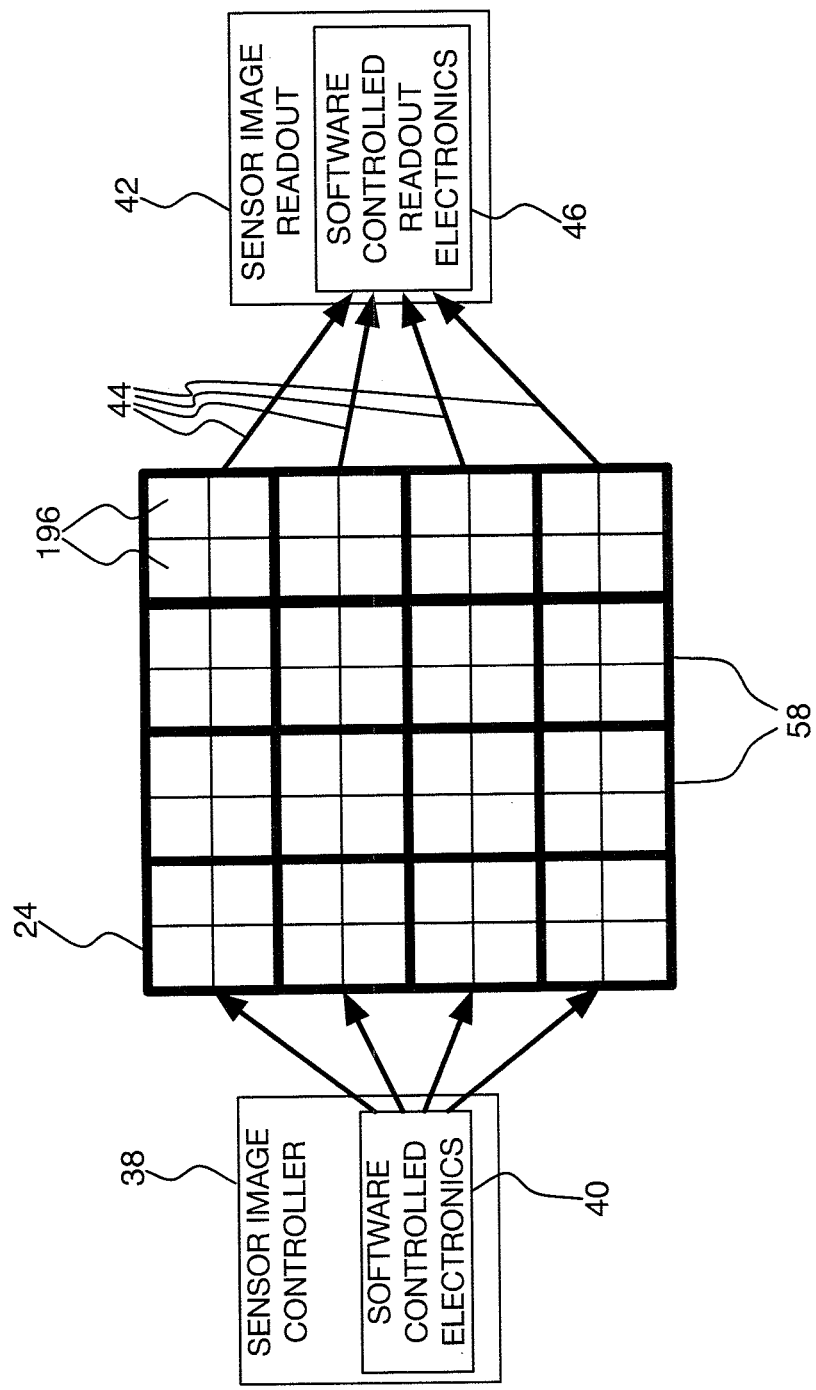

FIG. 36 shows a FPA showing pixels and sub elements of multiple pixels.

Figure 37:
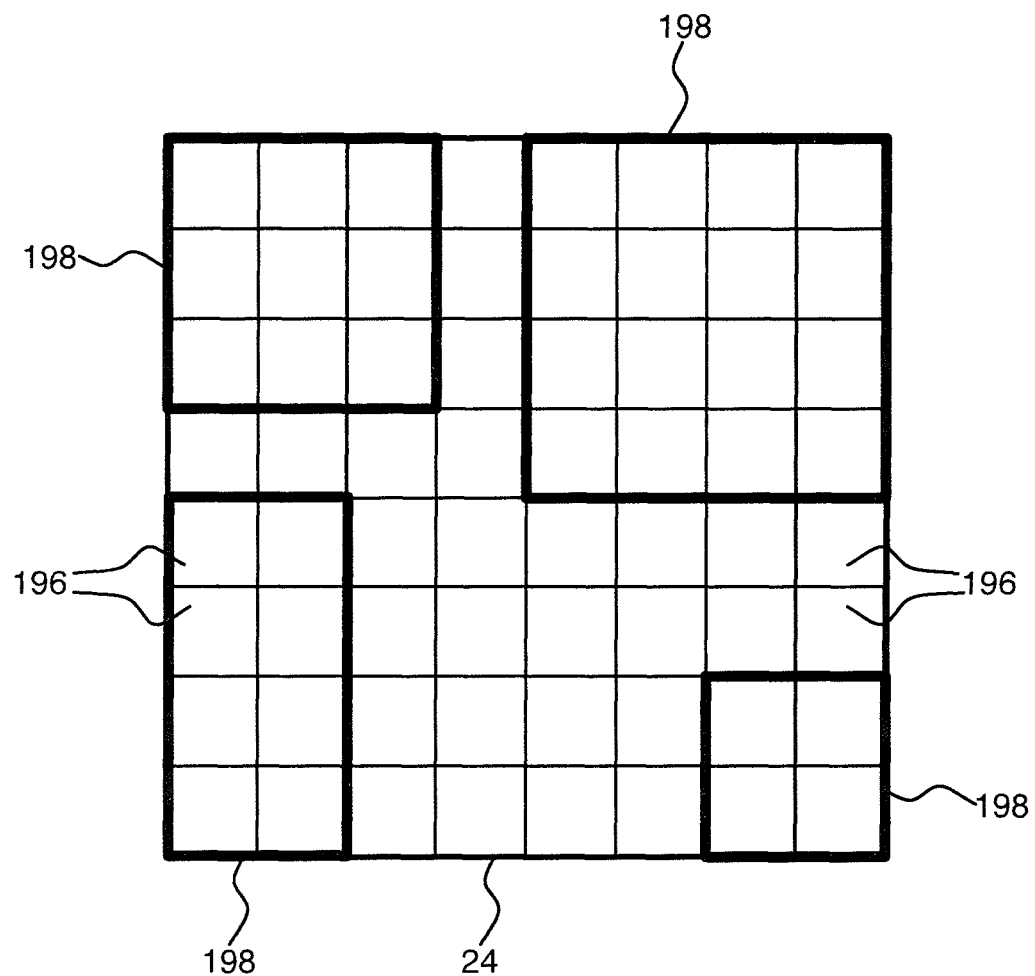

FIG. 37 illustrates a FPA showing pixels and sub elements of varying sizes made up of varying numbers of pixels within a single FPA.

Figure 38:
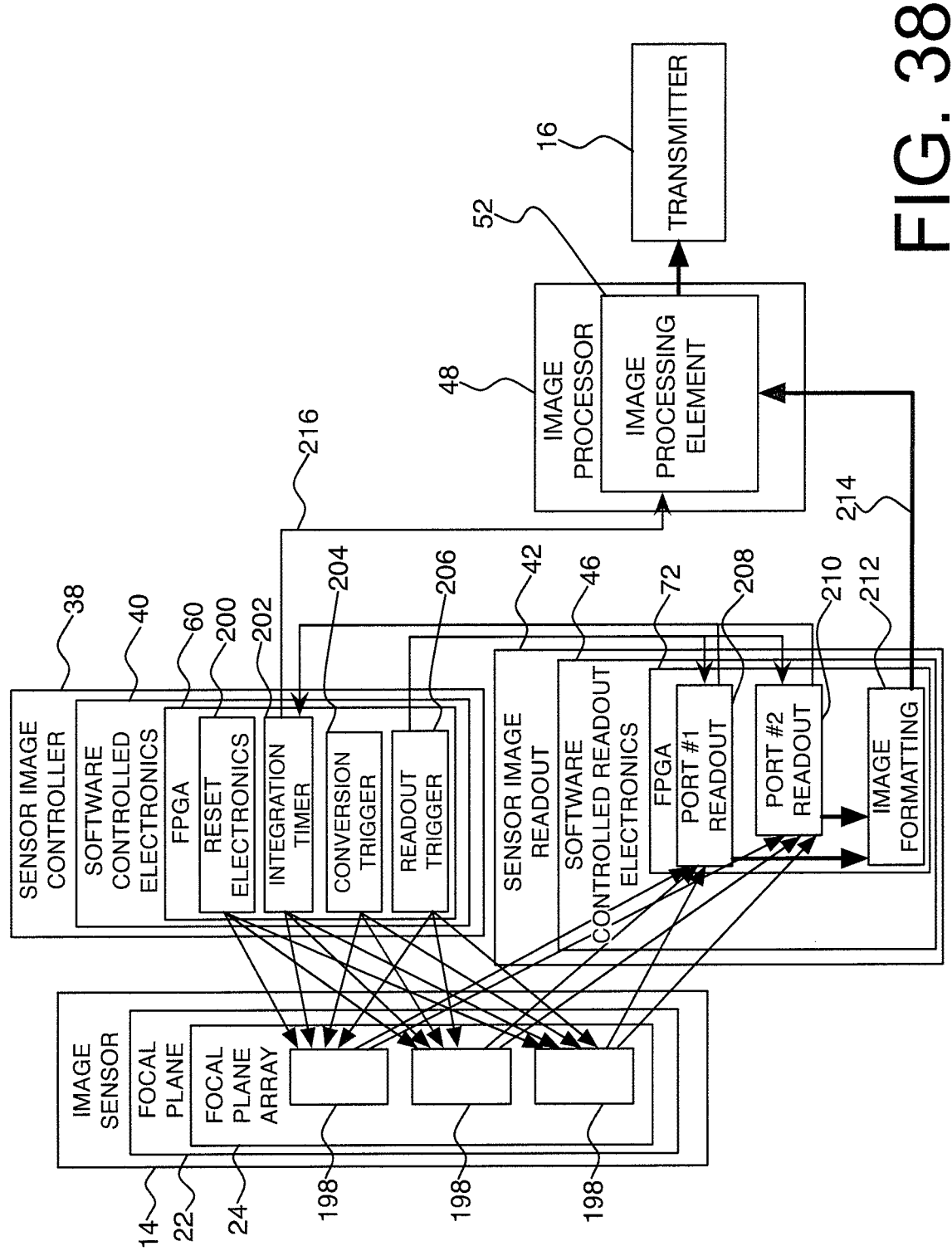

FIG. 38 shows an implementation of Image Capture and Readout Electronics Details.

Figure 39:
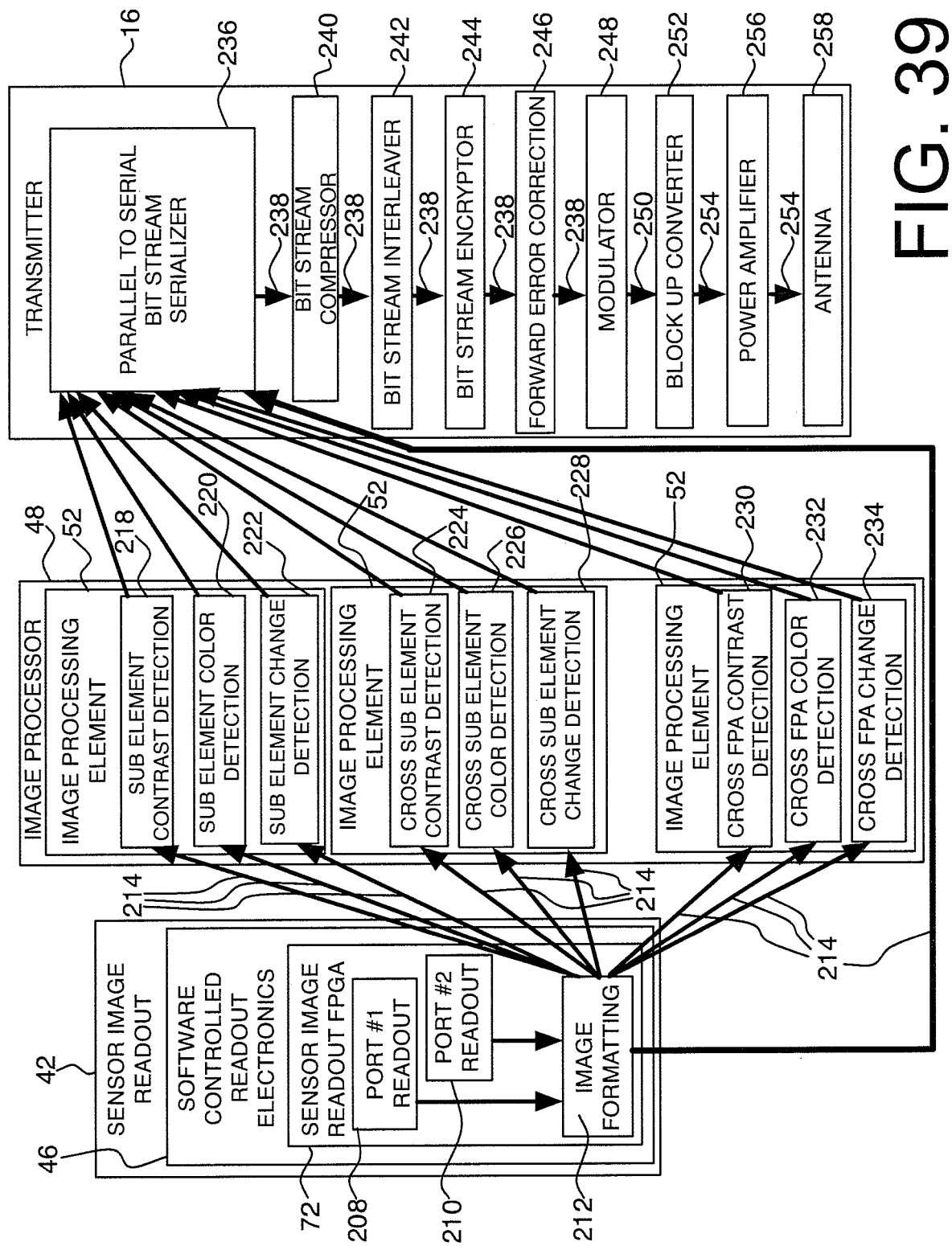

FIG. 39 furnishes a view of an implementation of Sensor Image Readout through the transmitter.

Figure 40:
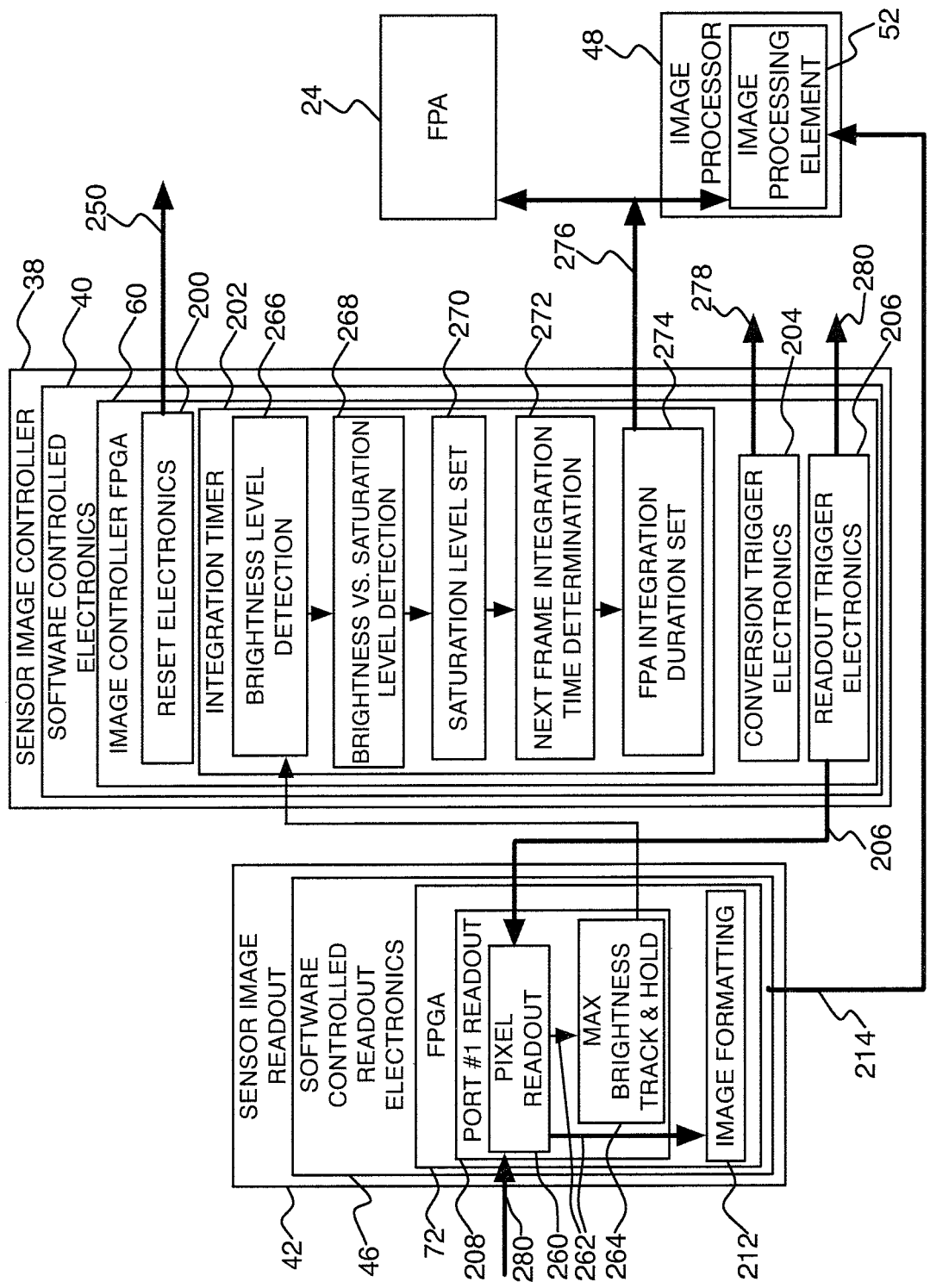

FIG. 40 shows an implementation detail of the FPA Integration and Timing Detail to set the integration Time of each FPA frame.

Figure 41:
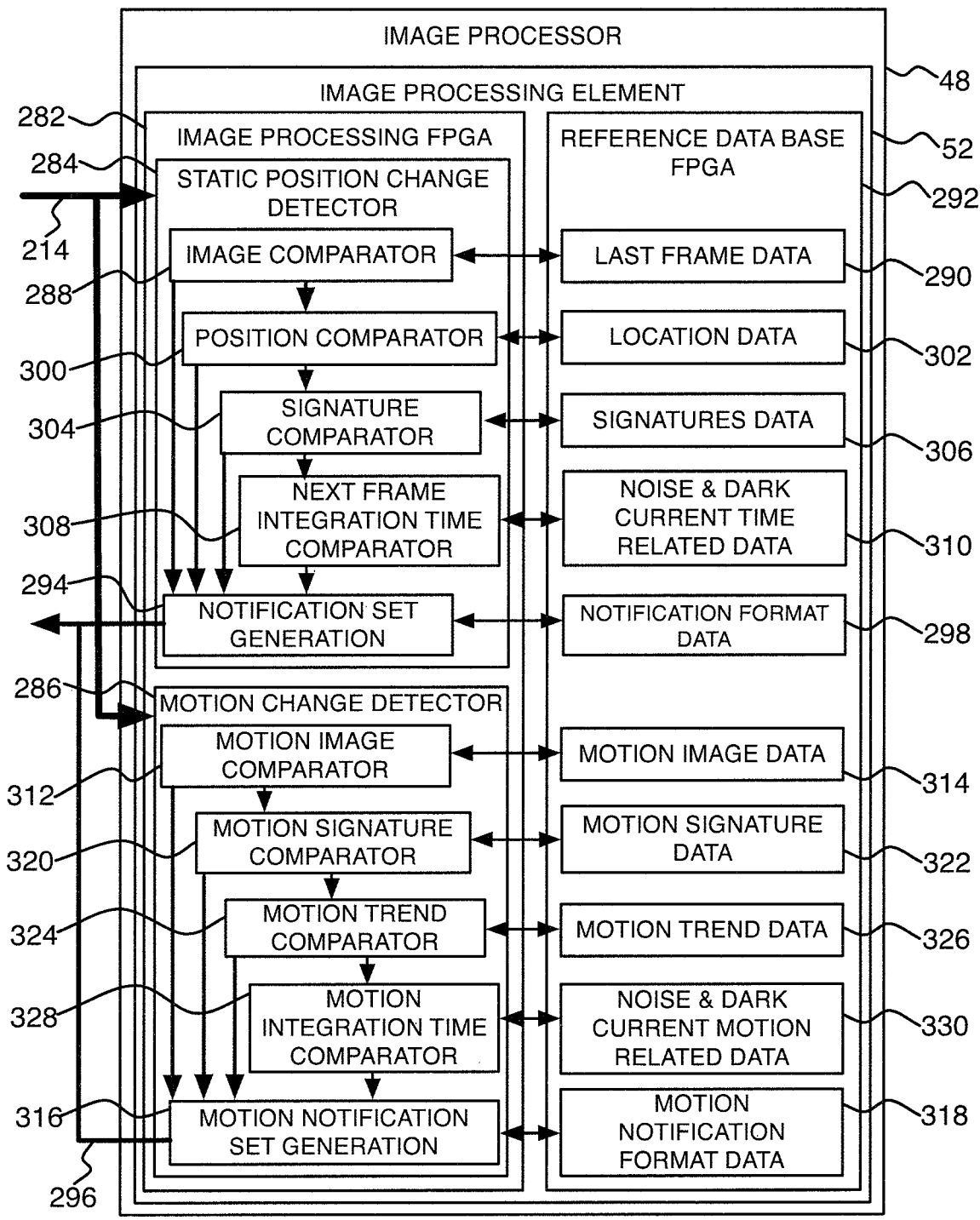

FIG. 41 shows an implementation detail of the image processing on board a satellite.

A DETAILED DESCRIPTION OF PREFERRED & ALTERNATIVE EMBODIMENTS

I. Overview of the Invention

Figure 1:
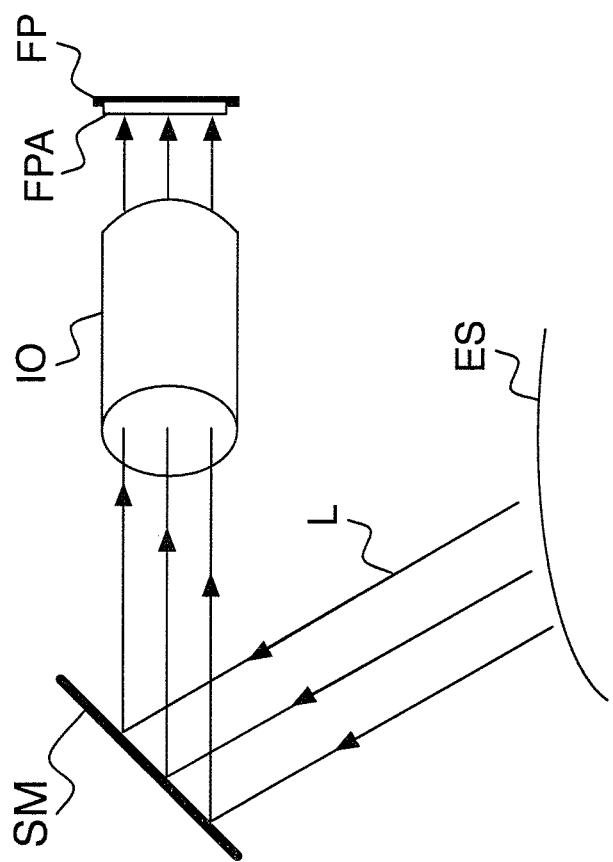
Figure 2:
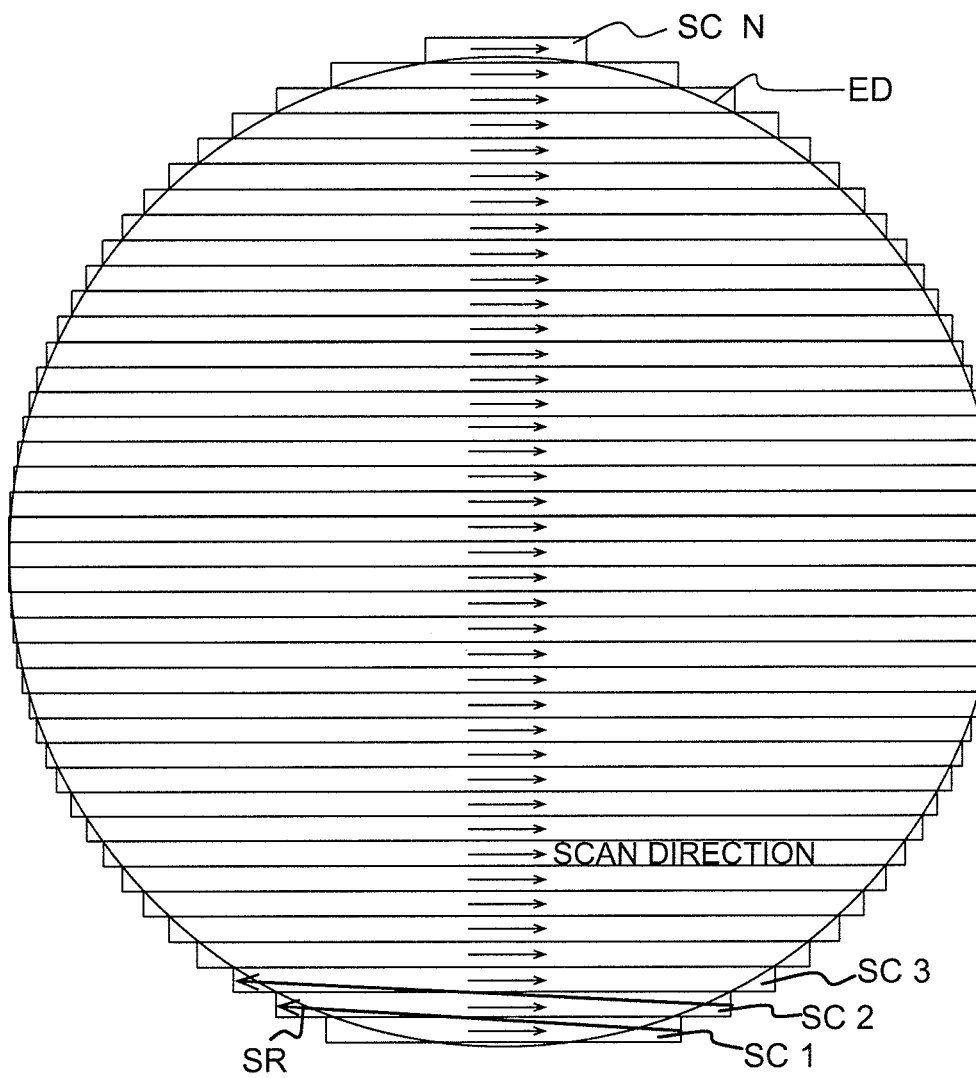
FIG. 2 depicts the prior art, and shows the observable Earth disc.
Figure 3:
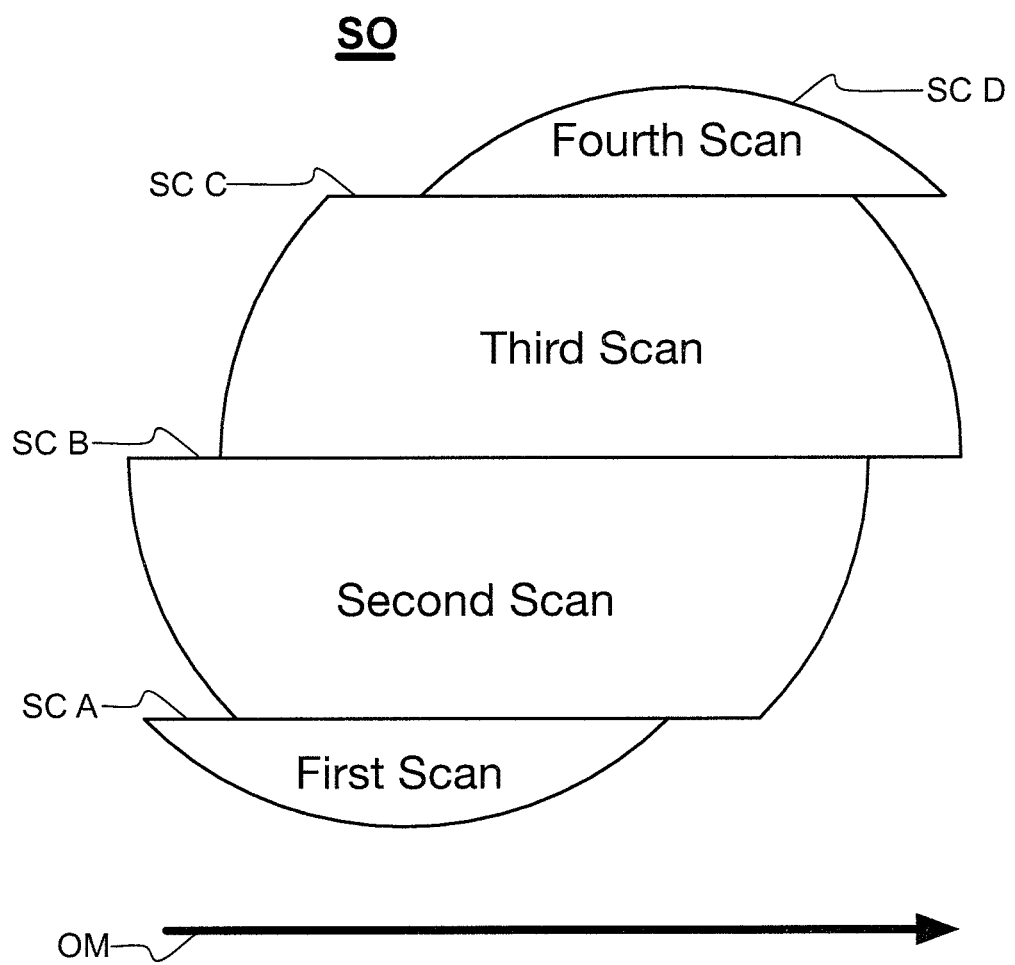
FIG. 3 depicts the prior art, and shows the resulting raw image distortion of a moving object resulting from a scanning sensor.

FIG. 4 offers a schematic view of one embodiment of the Real-time Satellite Imaging System 12, which includes a satellite 10 equipped with an image sensor 14, a pair of solar arrays 15, and a transmitter 16. One embodiment of the present invention utilizes a geostationary satellite. In one embodiment, the image sensor 14 is a generally continuously staring sensor, unlike the scanning sensors shown in FIG. 1 and FIG. 2 and FIG. 3.

A geostationary satellite appears to remain motionless in orbit relative to the Earth, because its orbit keeps it over the same region of the Earth's surface. In this way, the relative motions of the Earth and the satellite are nulled. The geostationary orbit is generally contained in the Earth's Equatorial plane, and the revolution rate of the satellite in its orbit is the same as the rotational rate of the Earth.

The geostationary orbit (GSO) is a distinct and specific subset of geosynchronous Earth orbit (GEO). A GEO orbit only has to be over the exact same spot on the Earth's surface once per day that the satellite's orbit is synchronous with the Earth's rotation, while GSO orbits are such that the satellite appears to be continuously stationary in the sky above a specific spot on the Earth's Equator. Accordingly, consistent images may be taken of a portion of the Earth's surface and atmosphere that fall within the hemisphere of the Earth viewable by the GSO satellite, i.e., the observable hemisphere, which is typically referred to as the "footprint of the satellite." The observable hemisphere is not a full geographic hemisphere, i.e., not fifty percent of the Earth, as the GSO is too close to the Earth to see the extreme polar regions of the Earth, i.e., generally above +81.3 degrees latitude or below −81.3 degrees latitude.

The advantage of placing a satellite with a sensor imaging the observable hemisphere in a geostationary orbit is that it allows the use of a staring sensor. This allows full images of the observable hemisphere to be taken at the same time. This avoids the image distortions of In other embodiments of the invention, the satellite or satellites may be in other orbits, such as Molniya orbits or other inclined elliptical orbits. These alternative orbits allow true polar coverage with four or more satellites (two with apogees north of the Equator and two with apogees south of the Equator), giving true 24/7 coverage of the polar regions not observable by the GSO satellites. Additionally, highly inclined, highly elliptical orbit (HEO) satellites with orbit periods longer than the twelve hour orbit of a Molniya orbit can also be used to give longer persistence per satellite over the polar regions. These longer persistence HEO satellites allow significantly longer periods of persistence per satellite sensor than Molniya orbit satellites can as well as allowing more slowly changing nadir point of the satellite allowing the sensor to have much less push or smear of the imagery than a Molniya orbit will. Further, satellites can be placed at the two stable Earth-Moon Lagrange Points, typically referred as L4 and L5, to give even longer persistence and a near full hemispherical observation area. With the L4 and L5 points at the same distance from the Earth as the Moon is from the Earth, sensors on satellites placed at these locations can give a perspective that changes slowly as the Earth-Moon orientation changes, something that is not possible from GSO, Molniya, or HEO orbits.

II. A Detailed Description of One Preferred Embodiment of the Invention

FIG. 5 furnishes a schematic diagram 17 of one embodiment of the image sensor 14. This embodiment includes four co-collimated telescopes 18, which each include refractive elements 20 focusing directly onto four focal planes 22, one for each co-collimated telescope 18. FIG. 5 shows sparsely populated focal plane arrays 24 on each focal plane 22. Alternative embodiments of the invention may include any number of telescopes 18, focal planes 22 and focal plane arrays 24 that include two or more of each. All the co-collimated telescopes view essentially the same field of view. They do not view separate, contiguous fields of view nor overlapping, but different fields of view.

FIG. 6 supplies a schematic diagram 25 of one embodiment of a single co-collimated telescope 18, which includes both reflective elements of primary mirror 26a and secondary mirror 26b and refractive elements 20 focusing directly onto a focal plane 22, which includes focal plane arrays 24.

FIG. 7 is a schematic diagram 30 of one alternate embodiment of a single co-collimated telescope 18, which includes refractive elements 20 and focusing directly onto a focal plane 22, which includes focal plane arrays 24. Two folding mirrors 32 are shown at the end of the telescopes, opposite the ends containing the telescope aperture 31 and the focal plane arrays 24.

FIG. 8 depicts a schematic diagram 34 of four focal planes 22 showing the sparse layout of focal plane arrays (FPAs) 24 across the focal planes 22 resulting from the four co-collimated telescopes 18 shown in FIG. 5. In one of the focal planes, as an example of one implementation, the sparsely populated FPAs are arranged as FPA24AA, FPA 24AB, FPA 24AC, FPA 24AD, FPA 24AE, FPA 24AF, FPA 24AG, FPA 24AH, and FPA 24AI. In another focal plane the sparsely populated FPAs are interleaved between the FPAs of the first focal plane as shown as FPA 24BA FPA 24BB, FPA 24BC, FPA 24BD, FPA 24BE, FPA 24BF, FPA 24BG, FPA 24BH, and FPA 24BI. The third focal plane is sparsely populated with FPAs vertically interspersed from those sparsely populating the first focal plane as shown with FPA 24CA, FPA 24CB, FPA 24C, FPA 24CD, FPA 24CE, and FPA 24CF. The fourth focal plane is sparsely populated with FPAs vertically interspersed from those sparsely populating the second focal plane as shown with FPA 24DA, FPA 24B, FPA 24DC, FPA 24DD, FPA 24DE, and FPA 24DF.

FIG. 9 shows the elements of FIG. 8 with the focal plane arrays (FPAs) 24 with a single focal plane 22 in the background interleaved in the designated pattern to create a single, contiguous image element. In this case the focal plane 22 is a computed focal plane 22 as the combining of the focal plane arrays 24, shown as FPA 24AA through 24AI, 24BA through 24BI. FPA 24CA through 24CF, and FPA 24DA through 24DF, is only accomplished in post processing and combining of the imagery from the focal plane arrays 24.

FIG. 10 depicts a schematic diagram of how the imagery of the four sets of focal plane arrays 24 are combined, commonly referred to as "stitched together" to form a single cohesive image in one embodiment of the invention. FIG. 10 also depicts just one very small subset of focal plane arrays out of the entire set within the sensor, and within the context of what is shown in FIGS. 8 and 9, FIG. 10 shows the relative, overlapping position of the upper left nine focal plane arrays (FPAs). As shown. FPA 24AA, FPA 24AB, FPA 24AD, and FPA 24AE are from the focal plane arrays 24 within the focal plane of the first of four co-collimated telescopes shown in FIG. 5 and FIG. 8. FPA 24BA and FPA 24BD are from the focal plane arrays 24 within focal plane of the second of the four co-collimated telescopes shown in FIG. 5 and FIG. 8. FPA 24CA and FPA 24CB are from the focal plane arrays 24 within the focal plane of the third of the four co-collimated telescopes shown in FIG. 5 and FIG. 8. Finally FPA 24DA is from the focal plane arrays 24 within the focal plate of the fourth of the four co-collimated telescopes shown in FIG. 5 and FIG. 8.

The focal plane arrays in each of the four focal planes is sparsely populated but with a overlaps 34 when the image of each of the focal planes 24 is combined to form a single image across all the local plane arrays 24. For the central focal plane array 24 of a set of nine in this example, in this diagram shown as FPA 24DA, the focal plane array 24 has overlap on all for sides from the neighboring local plane arrays are physically located in the focal planes of the other co-collimated telescopes. Also the overlap is triple at the corners as, taking the top-right corner of FPA 24DA as the example, the overlap from the focal plane 24 above FPA 24BA, to the right FPA 24CB, and to the upper-right FPA 24AB all overlap with the upper-right corner of FPA 24DA giving a redundant set of pixels from four different FPAs from four different co-collimated telescopes and four different focal planes to align the final imagery from the focal plane arrays 24 that are physically located across multiple co-collimated telescopes.

FIG. 11 portrays a functional block diagram of the imagery and data flow 36 and control flow among the image sensors 14 and various electronic components including flow of the imagery and data 44. The image sensors 14 each include a number of focal planes 22. Each focal plane 22 contains a number focal plane arrays 24. The local plane arrays 24 are all connected to and controlled by a sensor image controller 38. The sensor image controller 38 uses software controlled electronics 40 to control the operations of each of the focal plane arrays 24.

The focal plane arrays 24 are read out by the sensor image readout 42, which includes the software controlled readout electronic elements 46. The images and data 44 from the focal plane arrays 24 are transferred from the sensor image readout 42 software controlled readout electronics 40 to an image processor 48, which includes software controlled processing electronic elements 52. The software controlled readout electronics elements 46 additionally transfer data such as maximum light levels 50 to the software controlled electronics 40 of the sensor image controller 38 to optimize control functions. The software controlled processing electronic elements 52 of the image processor 48 transfer processed images 54 to transmitter 16.

FIG. 12 is a functional block diagram 56, which illustrates the method of the control of each focal plane array 24. Each focal plane array 24 includes focal plane array sub-elements 58. Each focal plane array 24 is controlled by elements of a field programmable gate array (FPGA) 60 within the sensor image controller 50 with sub-elements of the FPA 58 controlled by sub-elements of the FPGA 60, with FPGA sub-elements 62 and 64 controlling a FPA 24 and sub-elements 66 and 68 controlling a focal plane array sub element 58, which as a set perform the following functions:
control integration time per FPA 62;
control integration time segment of FPA 66;
control frame rate of a segment of a FPA 68; and
control frame rate of FPA 64.

The use of field programmable gate arrays (FPGAs) as described here offers multiple advantages over discrete electronic circuits and application specific integrated circuits (ASICs). FPGAs can be updated with new firmware while the sensor and satellite are on orbit while discrete electronics and ASICs cannot be. The ability to update FPGAs allows the operator of the satellite and sensor to update the satellite and sensor to new algorithms and circuit implementations developed after the satellite is launched FPGAs allow the sensor and satellite to realize a better size, weight, and power requirement than discrete electronic circuits.

FIG. 13 is a functional block diagram 70 that shows the readout of each focal plane array 24 by the sensor image readout 42. Data is readout by the software controlled readout electronics 46, which includes a number of field programmable gate arrays (FPGAs) 72. Each field-programmable gate array 72 includes a sensor image readout that senses a maximum light level 74 and a sensor readout that transmits a maximum light level 74 to the sensor image control 38 to optimize image capture. Sensor image readout 42 also transfers images and data from the focal plane array 24 to the software controlled image processing element 52 within the image processor 48.

FIG. 14 supplies a functional block diagram 78 of a series of electronic elements, which is used to process images and data from the sensor image readout 42 by the image processor 48. The image processor 48 includes software controlled electronics processing elements 52. The software controlled electronics processing elements 52 contain several modules for imagery and data processing including sensor image processing compression 80 and sensor image processing data formatting for transmission 82. The output of the sensor image processing data formatting 82 is conveyed to the transmitter 16.

FIG. 15 is a schematic view 84 of a high refractive index plate 86. In this embodiment, the plate 86 is formed from an electrically reactive high index of refraction material. Incident light beams 88 illuminate the plate 86. The incident light 88 travels through the plate 86, and propagates along any of multiple paths 90 to produce exiting rays 92, depending on the level of voltage placed across the plate 86 by voltage control element 94. Only one path of paths 90 is taken by incident light 88 to exit the plate 86 at one of the exit paths 92. The specific path of those shown 90 is controlled by the voltage control element 94.

FIGS. 16A and 16B reveal schematic diagrams 96 and 98 of one embodiment of a pair of electrically reactive high index of refraction material plates 86. The plates 86 are shown oriented in two different directions, which allow the incident light rays 88 to change the shift of the exiting rays 102 in two dimensions through two shifts through electrically reactive high index of refraction material plates 86 each shown transiting the plates 90 with the first shift shown by the singly shifted exiting light 100 and doubly shifted exiting light 102. Each dimension corresponds to one the electrically reactive high index of refraction material plates 86, and allows a resulting image formed on each focal plane array 24 to be actively shifted in two dimensions.

FIG. 17 offers a schematic diagram 104 of one embodiment of an imaging sensor 14 showing a telescope 18, which includes refractive dements 20, and a pair of electrically reactive high index of refraction material plates 86 that produce an image directly on focal plane array 24 within the focal plane 22.

FIG. 18 exhibits a functional block diagram 106 of the data and control flow among an image sensor 14, a sensor image controller 38, a sensor image readout 42, an image processor 48 and a transmitter 16. The image sensor 14 includes a focal plane 22, which further includes a focal plane array 24. The image sensor 14 also includes an electrically reactive high index of refraction material plate 86. The image sensor 14 is connected to and controlled by the sensor image controller 38. The sensor image controller 38 includes a voltage control element 94 and software controlled electronics 40. The sensor image controller 38 is also connected to a sensor image readout 42, which includes software controlled readout electronics 46, which reads out imagery and data 44. The output of the sensor image readout 42 is transferred to the image processor 48 containing software controlled processing elements 52 which in turn transfers processed imagery and data 54 to the transmitter 16.

The satellite and sensor embodiments described in FIGS. 4 through 18 may be placed into geostationary orbit to provide continuous coverage and imaging of the majority of the Earth. A single satellite to view and record a single hemisphere may be implemented as a stand alone system. A series of three or more satellites in geostationary orbit may be implemented to give full coverage with overlaps while viewing and recording all but the polar regions of the Earth.

FIG. 19 shows a 3D view a satellite 10 in a geostationary orbit (GSO) 108 showing the field of view (FOV) 110 of that satellite and showing the observable area 112 of the Earth 114 within that FOV 110. The FOV 110 observes the Earth 114, which from geostationary orbit (GSO) is less than 50% of the Earth's surface, i.e., less than a full hemisphere of the Earth 114. The observable area and volume, i.e., the viewable Earth's surface, atmosphere above that surface, and the near space above that atmosphere, 112 is often referred to by a different name: the Observable Hemisphere.

FIG. 20 shows a simple 2D view a satellite 10 at the range of a geostationary orbit (GSO) 108 of FIG. 19 showing the field of view (FOV) 110 of that satellite truncated at the Earth's surface for clarity and showing the observable area, Earth surface and atmosphere above that surface 112 of the Earth 114 within that FOV 110. As shown, the FOV 110 observes the Earth 114, which from geostationary orbit (GSO) is less than 50% of the Earth, i.e., less than a full hemisphere of the Earth 114.

FIG. 21 shows a 3D view of three equally spaced satellites 10 in geostationary orbit (GSO) 108 fields of view (FOVs) 110 and the observable areas 112.

FIG. 22 shows a 2D view of three equally spaced satellites 10 in geostationary orbit (GSO) and their fields of view (FOVs) 110 and the observable areas 112 showing the overlap of those areas 116 as viewed from a north pole perspective.

FIG. 23 furnishes a schematic diagram of a 2D Cylindrical Projection 118 Observable Area Footprints 120 of three equally spaced geostationary orbit (GSO) satellites 10 including the three areas of observation overlap 122 of each satellite 10 with than of its neighboring satellite 10. The diagram shows the combined fields of view if the three satellites providing a full 360 degree coverage of the Earth at mid to lower latitudes.

The satellite and sensor embodiments described in FIGS. 4 through 18 may be placed into Molniya Orbit to provide coverage of the polar regions of the Earth not observable from geostationary orbit.

FIG. 24 shows a 3D diagram of a single satellite 10 at the apogee of a Molniya Orbit 124 showing the field of view (FOV) 126 of that satellite 10 at apogee and the observable area 128 of that satellite. The observable area 128 is centered north of the GSO observable area and includes the polar region of the Earth. Note that the satellite 10 at the apogee of the Molniya Orbit 124 is out of the plane of the role geostationary orbit, and the plane of the orbit of the satellite 10 is out of the plane of both the Earth's equator and the geostationary orbit plane.

FIG. 25 shows a simplified 2D schematic diagram of a single satellite 10 at the apogee of a Molniya Orbit showing the field of view (FOV) 126 of that satellite 10 at apogee and the observational area of the satellite 128.

FIG. 26 furnishes a schematic diagram of a 2D Cylindrical Projection 118 showing the Observable Area of the satellite 10 at the apogee of a Molniya orbit shown by the entire area north of the line 130. The ground track 132 of the satellite 10 is shown by the broad line so indicated. The ground track 132 is the point on the surface of the Earth that is directly beneath the satellite 10 at any given point in time as the satellite 10 orbits the Earth.

FIG. 27 furnishes a 3D diagram of two satellites 134 and 136 within an Molniya orbit 138 with their orbits equally spaced in time as they pass over a given point on the surface of the Earth. Note that for the two satellites 134 and 136 to be equally spaced in time in the Molniya orbit 138 that one is at apogee while the other is at perigee. The diagram shows the field of view 139 of the apogee satellite 134, and the field of view 141 of the perigee satellite 136 is also shown.

FIG. 28 furnishes a schematic diagram of a 2D Cylindrical Projection 118 showing two satellites 134 and 136 in Molniya Orbits equally spaced in time. The schematic shows the ground tracks 144 and 146 of the satellites 134 and 136 as non-bold solid lines and bold solid lines, respectively. The diagram shows the observable areas as the areas north of the non-bold solid line and hold solid lines 148 and 150, respectively.

FIG. 29 furnishes a 3D schematic diagram showing four satellites in Molniya Orbits with satellites 134 and 136 with their apogees north of the equator and satellites 152 and 154 with their apogees south of the equator. The figure shows the field of view 139 of satellite 134 and field of view 141 of satellite 136. The figure shows the field of view 155 of satellite 152 and field of view 157 of satellite 154.

FIG. 30 furnishes a schematic diagram of a 2D Cylindrical Projection 118 showing four satellites in Molniya orbits with satellites 134 and 136 with their apogees north of the equator and satellites 152 and 154 with their apogees south of the equator. The figure shows the observable areas of satellite 134 as area 148 and satellite 136 as area 150 with overlapping areas of observation shown as area 160. The figure shows the observable areas of satellite 152 as area 156 and satellite 154 as area 158 with overlapping areas of observation shown as area 162.

The satellite and sensor embodiments described in FIGS. 4 through 18 may be placed into geostationary orbit and Molniya orbit to provide coverage of the of the entire Earth.

FIG. 31 furnishes a schematic diagram of a 2D Cylindrical Projection 118 showing overlap of satellite observable areas. The observable area 164, indicated by lines running from upper left to lower right, is the observable area 164 of a satellite in a north Molniya orbit at apogee. The Observable area 166, indicated by lines running from lower left to upper right, is the observable area 166 or a satellite in a south Molniya orbit at apogee. The longitude of the apogees of the two Molniya satellites is the same. The observable area 168, indicated by horizontal long bold lines, is the observable area 168 of a geostationary orbit satellite positioned over the western Pacific Ocean. The observable area 170, indicated by non bold horizontal lines, is the observable area 170 of a geostationary orbit satellite positioned over the western hemisphere. The observable area 172, indicated by unbroken vertical lines, is the observable area 172 of a geostationary orbit satellite positioned over the European/African hemisphere. The three geostationary orbit satellites are equally spaced in the geostationary orbit. The area of maximum overlap 174 in observations in the equatorial Atlantic Ocean is shown as observed by four satellites.

The satellite and sensor embodiments described in FIGS. 4 through 18 may be placed into a highly elliptical orbit to provide a broader area of coverage than a Molniya orbit. A satellite in highly elliptical orbit is generally out of the plane of the geostationary orbit. The inclination of the highly elliptical orbit is out of the plane of the Earth's equator and out of the plane of the geostationary orbit and allows imaging of the polar regions not observable from the geostationary orbit.

FIG. 32 shows a 3D representation of a satellite 10 at the apogee of a Highly Elliptical Orbit (HEO) 176 with a Field of View (FOV) 178 and an observable area 180.

FIG. 33 illustrates a simplified 2D representation of a satellite 10 at the apogee or a Highly Elliptical Orbit (HEO) with the field of view 178 and an observable area 180 on the Earth 114.

FIG. 34 furnishes a schematic diagram of a 2D Cylindrical Projection 118 showing a Highly Elliptical Orbit Satellite 182 at apogee or a 24 hour orbit with a ground track 184 and an observable footprint of the entire area north of the line 186.

The satellite and sensor embodiments described in FIGS. 4 through 18 may be placed into the L4 and L5 Lagrange Points to provide nearly full hemispherical coverage of the Earth from each satellite.

FIG. 35 shows a pair of satellites 10 at the L4 and L5 Lagrange Points and the field of view of each 188 observing the Earth 114. The L4 and L5 Lagrange points are defined by equilateral triangles 190 shown in lines formed by the Moon 192 and the Earth 114. From the L4 and L5 Lagrange Points each satellite 10 observes approximately a full physical hemisphere 194 of the Earth 114. Because the position of each satellite 10 is defined by an equilateral triangle that is in turn defined by the orbit of the MOOD 192, and the plane of the or of the Moon 192 is generally out of the plane of the Earth's equator, the plane of the orbit of each satellite 10 in the L4 and L5 Lagrange Points is generally out of the plane of the Earth's equator.

FIG. 36 provides a schematic overview of a Sensor Image Controller 38 including Software Controlled Electronics 40 controlling sub elements 58 of a focal plane array 24 with multiple pixels 196 and each sub element 58 providing imagery and data 44 to the Software Controlled Readout Electronics 45 within the Sensor Image Readout 42.

FIG. 37 shows a focal plane array (FPA) 24 showing pixels 96 and sub elements 198 of varying sizes and shapes consisting of multiple pixels 196 within the same FPA 24. This allows optimized imagery to be taken when a given focal plane array 24 views an area on the surface of the Earth that spans the terminator such that the individual focal plane array 24 Observes both daylight and night regions of the Earth.

FIG. 38 shows the interrelationship between the focal plane array sub elements 198 as part of the focal plane array 24 on the focal plane 22 within the image sensor 14 as they are controlled by the reset electronics 200, which resets each sub element and clears it before capturing the next image, the integration timer 202, which controls how long each sub element captures light (the integration time), the conversion trigger electronics 204, which triggers the sub elements to stop capturing light and convert that analog value to a digital value, and the readout trigger electronics 206 which causes the sub elements go readout the analog voltage values, all of which are within the sensor image controller FPGA 60 as part of the software controlled electronics 40 of the Sensor Image Controller 38. The readout trigger element 206 also triggers the readout electronics of the FPGA 72 within the Software Controlled Readout Electronics 46 of the Sensor Image Readout 42 reading out Port #1 208 and Port #2 210 of the sub elements 196 of the focal plane array 24. Each readout of Port #1 208 and Port #2 210 is sent for image formatting in the Image Formatting sub element 212 of the FPGA 46. The image Formatting electronics 212 sends the imagery and related data 214 to the Image processing Element 52 of the Image Processor 48 before sending it on to the transmitter 16.

FIG. 39 shows the imagery and data flow through the electronic systems from the Sensor Image Readout 42 though the Transmitter 16. The individual port readouts 208 and 210 send the imagery and data to the image formatting element 212 of the sensor imager readout FPGA 72 of the software controlled readout electronics 46 of the sensor image readout 42. The image formatting element 212 sends, in parallel, the imagery and data 214 to the Image Processor 48 and the Parallel to Serial Bit Stream Serializer 236 within the transmitter 16. Within the Image Processor there is one or more image processing elements 52 with three image processing elements 52 shown. As shown here three example processing elements 52 in which they may contain contrast detection 218 within a focal plane array sub element, color detection 220 within a focal plane array sub element, and change detection 222 within a focal plane array sub element. In parallel in another image processing element 52 containing electronic elements in which these elements can contain contrast detection 224 across focal plane array sub elements within a single focal plane array, color detection 226 across local plane array sub elements within a single focal plane array, and change detection 228 across multiple focal plane array sub elements within a single focal plane array. Further, in parallel in another image processing element 52 containing electronic elements in which these elements cap contain contrast detection 230 across multiple focal plane arrays, color detection 232 across multiple focal plane arrays, and change detection 234 across multiple focal plane arrays. Each of these detection elements transfers its output information containing the imagery and data to the Parallel to Serial Bit Stream Serializer 236 of transmitter 16.

Further, in FIG. 39 the receiving element within the transmitter 16 is the Parallel to Serial Bit Stream Serializer 236 which converts the parallel inputs from the detection elements within the image processor 48 and the formatted imager from the image formatting element 212 of the sensor image readout FPGA 72 to a serial bit stream 238 in preparation for transmission. Upon conversion to a serial bit stream the bits are transferred to a Bit Stream Compressor 240 electronic element that compresses the bit stream. The output of the compressor is sent to the Bit Stream Interleaver 242 that reorders the bits within the bit stream to minimize number of the maximum bit transitions. The resulting bit stream 238 is transferred to a Bit Stream Encryptor 244 that encrypts the bit stream with an accepted protocol to an accepted level of security. The bit stream output 238 of the encryptor 244 is sent to the Forward Error Correction code element 246 that inputs additional error correction bits into the bit stream to allow the ground receiver to recover the original bit stream even with errors induced during transmission. The bit stream output 238 of the forward error correction element 246 is input into the Modulator 248 which takes the input digital bit stream 238 and creates an analog signal 250 from the digital bit stream 238 based upon an accepted modulation technique. The Modulator 248 sends the analog signal 250 to the Block Up Converter 252 whose output is at the appropriate radio frequency 254. This radio frequency 254 is then input into the Power Amplifier 256 which provides enough power into the radio frequency signal 254 to transfer the information to the ground station on the Earth. The output 254 of the power amplifier 256 is input into the Antenna 258 which focuses the power within the radio frequency signal 254 to allow for the transmission to the ground station on the Earth.

FIG. 40 shows a detailed implementation of the interaction between the Software Controlled Readout. Electronics 46 within the Sensor Image Readout 42 mid the Software controlled Electronics 40 within the Sensor Image Controller 38. The Readout Electronics Field Programmable Gate Array (FPGA) 72 includes the Port #1 Readout 208 consisting of a Pixel Readout 260 receiving the imagery data from the focal plane array (FPA). The Pixel Readout 260 sends the pixel data 262 to the Max Brightness Track & Hold electronics 264 and the Image Formatting electronics 212.

The Max Brightness Track & Hold electronics 264 stores the values of the brightest pixels within the imagery data 262 and passes it to the Brightness Level Detection electronics 266 within the Image Controller FPGA 60 within the Software Controlled Electronics 40 within the Sensor Image Controller 38. The Brightness Level Detection element 266 passes the brightness levels to the Brightness versus Saturation Level Detection element 268 which determines the brightness of the brightest pixels within the FPA as compared to the maximum, saturated level possible within the FPA determining if those pixels are not saturated, saturated, or super saturated. This determination is sent to the Saturation Level Set 270 which sets the requirements for any changes so that the next frame captured has just barely saturated pixels.

The Saturation Level Set element 270 sends that determination to the Next Frame Integration Time Determination element 272 which determines the integration time duration of the next frame in order to have the brightest pixels in the next frame saturated but not super saturated. The Next Frame Integration Time Determination element 272 sends that determination to the FPA Integration Duration Set element 274 which sends the set data to the FPA 24 via the FPA integration Duration Set. Signal 276. The FPA Integration Duration Set Signal 276 is also sent to the Image Processing Element 52 within the image Processor 48. Further, within the Image Controller Electronics 40 the Conversion Trigger Electronics 204 sends the Conversion Trigger 278 to the FPA and the Readout Trigger electronics 206 sends the Readout Trigger 280 to both the FPA and the Pixel Readout 260.

FIG. 41 shows a series of processes within the Image Processing. Element 52 within the Image Processor 48 to obtain extracted information from the generated imagery and related data. An image processing field programmable gate array (FPGA) 282 contains image processing elements as the Static Position Change Detector 284 and the Motion change Detector 286. The Static Position Change Detector 284 contains electronic elements that perform image comparisons through an Image Comparator 288 which requests data and receives data from a Last Frame Data Element 290 within a Reference Data Base FPGA 292. The Image Comparator 288 may pass its output directly to the Notification Set Generation element 294 for generation of the Notifications 296 as defined within the Notification Format Data element 298 to be sent to the transmitter. Conditioned upon the output of the image Comparator 288 the output may be sent to the Position Comparator 300 for additional analysis, which requests data and receives data front a Location Data Element 302 within a Reference Data Base FPGA 292. The Position Comparator 300 may pass its output directly to the Notification Set Generation element 294 for generation of the Notifications 296 as defined within the Notification Format Data element 298 to be sent to the transmitter. Conditioned upon the output of the Position Comparator 300 the output may be sent to the Signature Comparator 304 for additional analysis, which requests data and receives data from a Signature Data Element 306 within a Reference Data Base FPGA 292. The Signature Comparator 304 may pass its output directly to the Not Set Generation element 294 for generation of the Notifications 296 as defined within the Notification Format Data element 298 to be sent to the transmitter. Conditioned upon the output of the Signature Comparator 304 the output may be sent to the Next Frame Integration Time Comparator Element 308 for additional analysis, which requests data and receives data from a Noise & Dark Current Time Related Data element 310 within a Reference Data Base FPGA 292 then pass its output directly to the Notification Set Generation element 294 for generation of the Notifications 296 as defined within the Notification Format Data element 298 to be sent to the transmitter.

As further shown in FIG. 41, the Motion Change Detector 286 contains electronic elements that perform motion image comparisons through a Motion Image Comparator 312 which requests data and receives data from a Motion Image Data element 314 within a Reference Data Base FPGA 292. The Motion Image Comparator 312 may pass its output directly to the Motion Notification Set Generation element 316 for generation of the Notifications 296 as defined within the Motion Notification Format Data, element 318 to be sent to the transmitter. Conditioned upon the output of the Motion Image Comparator 312 the output may be sent to the Motion Signature Comparator 320 for additional analysis, which requests data and receives data from a Motion Signature Data Element 322 within a Reference Data Base FPGA 292. The Motion Signature Comparator 320 may pass its output directly to the Motion Notification Set Generation element 316 for generation of the Notifications 296 as defined within the Motion Notification Format Data element 318 to be sent to the transmitter. Conditioned upon the output of the Motion Signature Comparator 320 the output may be sent to the Motion Trend Comparator 324 for additional analysis, which requests data and receives data from a Motion. Trend Data Element 326 within a Reference Data Base FPGA 292. The Motion Trend Comparator 324 may pass its output directly to the Motion Notification Set Generation element 316 for generation of the Notifications 296 as defined within the Motion Notification Format Data element 318 to be sent to the transmitter. Conditioned upon the output of the Motion Trend Comparator 324 the output may be sent to the Motion Integration Time Comparator Element 328 for additional analysis, which requests data and receives data from a Noise & Dark Current Motion Related Data element 330 within a Reference Data Base FPGA 292 then may pass its output directly to the Motion Notification. Set Generation element 316 for generation of the Notifications 296 as defined within the Motion Notification Format Data element 318 to be sent to the transmitter.

Further, as shown FIG. 4 an imaging Satellite 10 with an image Sensor 14 is configured with, as shown in FIG. 11, a Sensor Image Controller 38 and a Sensor Image Readout to semi-autonomously control a sensor, and produce fixed resolutions as the system will allow image frame by image frame updating of the sensor to provide optimized imagery and data and still allow one frame per second frame rates.

An imaging satellite with a sensor control and data processing system configured to semi-autonomously control a sensor, and produce variable resolutions as the system will allow image frame by image frame updating of the sensor to provide optimized imagery and data and still allow one frame per second frame rates while allowing the combination of pixels or sets of pixels into different resolutions before transmission to the ground. Such variance of resolutions can provide the ability to lower the compression rate in data rate limited transmissions.

An imaging satellite with a sensor control and data processing system configured to semi-autonomously control a sensor, and produce fixed frame rates which allows the sensor to optimally image an extended area of the Earth as opposed to prior art sensors with permanently fixed or narrowly pre-defined frame rates or scanning rates. An example is to image a daylight area at one fixed rate and a night area at a different fixed rate allowing optimal imagery for each.

An imaging satellite with a sensor control and data processing system configured to semi-autonomously control a sensor, and produce variable frame rates which allows the sensor to optimally image an area of the Earth as lighting and environmental conditions change as opposed to prior art sensors with permanently fixed frame rates or scanning rates or fixed rate sensors which cannot rapidly adapt to changing environments. An example is to image a daylight area and optimally change the frame rate as the daylight area goes from early morning with moderately low light to high noon with bright lighting to evening with moderately low light.

A sensor control and data processing system that monitors the saturation and pixel received energy levels of a sensor's focal plane array (FPA) and modifies the FRA's relevant operational parameters, to maximize the signal to noise ratio of the imagery generated as opposed to just moderating the integration time of the FPA. One example of this is that for some FPAs the FPA electronic bias can be changed to optimize the range of light that signifies true darkness, i.e., no light in for a given pixel to maximum brightness, i.e., so much light on a given pixel that it is super saturated and records a fraction of that amount of light. Dynamically controlling that range in an FPA can produce optimal imagery.

A sensor control system that monitors a predefined subset: of the pixels of each FPA may capture predefined signatures or can be used to capture predefined motions.

A sensor control system that monitors all of the pixels of each FPA may be used to control the frame rates or bias of an FPA for the next frame.

A sensor control and data processing system that produces imagery at full resolution of the field of view of the additional image sensors as the sensor described herein may be used in coordination with another sensor onboard each satellite with the other sensor observing a subset of the area observed by the sensor described herein at a different frame rate or resolution.

A data processing system combining, imagery of full and lesser resolution images with the imagery from a narrow field image to provide data fused images allows the imagery and the data from the two sensors to be combined to produce unique information that is not available from either sensor alone.

The present invention uses a novel combination of elements to produce full hemisphere images in only thirty seconds or less to the end user.

The present invention uses a "fractionated sensor" to take the hemispherical images all at once. According to the present invention, the minimum time to take, record, and readout a full observable hemispherical image is about $\frac{1}{30}$ of a second. The present invention accomplishes this task by employing a novel combination of multiple, co-collimated telescopes, focal planes, and sparsely populated focal plane arrays as described above in the Detailed Description Section.

The present invention does not "build up" or accumulate a full hemisphere image by using a scanning sensor. The image produced by the present invention is assembled simultaneously with multiple, imaging two-dimensional focal plane arrays all at the same time. The present invention uses directly illuminated focal planes with one focal plane per telescope and multiple, sparsely populated local plane arrays for each focal plane. The focal plane arrays are sparsely populated on each individual focal plane, but they are overlapping when the focal plane arrays from the multiple focal planes are combined to form a single image from all the co-collimated telescopes, fiscal planes, and focal plane arrays.

According to one embodiment of the present invention, the entire process, which begins when an event occurs, to the delivery to a user requires less than 30 seconds.

One embodiment of the present invention may be described as a series of events, as recited in Table One:

Table One
Event happens
Light travels from the event to the satellite sensor telescopes
Light is focused on the focal plane of each telescope
Light is captured by the focal plane arrays in the focal plane of each telescope and read out as voltages
Voltages are processed on the satellite for transmission
Imagery and data are transmitted to the ground
The ground station receives the data stream and "unpacks" the data
The ground station sends the data to the ground processing site
The ground processing site takes the raw imagery and data and turns in into composed, user observable images
In parallel to the creation of composed, user observable images, the ground processing site extracts selected data from the images
The composed images are trans erred to storage (for future use) and the distribution system
The distribution system (Internet, other communications satellites, etc.) delivers the live images and related, extracted data to the user III. Alternative Embodiments of the Invention The present invention may be implemented in a wide variety of embodiments. Alternative embodiments include, but are not limited to:

An imaging satellite with an image sensor including a focal plane array consisting of a charge coupled device (CCD) array as a CCD array allows sensitivity not afforded by other arrays and in many cases has greater radiation tolerance than other arrays, which can be important in GSO because GSO satellites and sensors are in a higher radiation environment than LEO satellites.

An imaging satellite with an image sensor minding a focal plane array consisting of a complementary metal-oxide-semiconductor (CMOS) array as a CMOS array has a wider family of off the shelf supporting electronics giving greater flexibility and potentially greater capability than other arrays.

An imaging satellite with an image sensor including a focal plane array consisting, of a scientific CMOS (SCMOS) array as SCMOS has the potential to allow greater responsiveness, and thus the ability to do better low light imaging, than other arrays.

An imaging satellite with an image sensor including a focal plane array consisting of a micro-bolometer ($\mu$-bolometer) array as a $\mu$-bolometer allows imaging in mid-wave through long wave (typically 4 $\mu$m through 20 $\mu$m) without the use of cryo-coolers.

An imaging sensor with a focal plane array using a stacked sensor such that it is capable of recording color in each individual pixel, e.g., FOVEON Array, which snows each pixel to provide multiple colors of information, which in turn allows for denser spectral information within each focal plane array.

An imaging sensor with a focal plane array using a 2×2, 2×3, 2×4, 3×3, 3×4, or 4×4 array of pixels with different filters to allow for the creation of full color imagery as such variants allow the spectral variations to include the classic Bayer array and go beyond the classic Bayer array to give additional, spectrally relevant information.

An imaging sensor with a primary image sensor comprised an optical train illuminating a focal plane array allowing the full spectrum of the received light to irradiate a full set of focal plane arrays.

An imaging sensor with primary image sensor comprised of each telescope encompassing a single optical train directly illuminating a set of optical beam splitters such that each split is for a different frequency/wavelength and each split frequency illuminates a focal plane array, which in turn allows a full focal plane array for each frequency of light.

An imaging sensor comprised of a single optical train per telescope directly illuminating a diffraction grating such that each different frequency illuminates a focal plane arrays, which allows for a more compact version than beam splitters but with the limitation of narrow bands tuned to the grating.

An imaging sensor observing and recording imagery and data of a cooperative target in real-time which can allow the sensor in GSO to persistently stare at the cooperative target as the sensor is accurately characterized.

An imaging sensor in GSO persistently observing and recording imagery and data of a target on the Earth to characterize that target.

An imaging sensor in GSO persistently observing and recording imagery and data of a target in the Earth's atmosphere to characterize that target.

An imaging sensor in GSO persistently observing and recording imagery and data of a target on the Earth to characterize the sensor.

An imaging sensor in GSO persistently observing and recording imagery and data of a target in the Earth's atmosphere to characterize the sensor.

An imaging sensor wherein a cooperative target is data linked to the satellite's primary ground station, which allows the cooperative target to change its characteristics as the persistent sensor is characterized.

An imaging sensor wherein the cooperative target is data linked to the satellite with the sensor, which will allow for machine to machine coordination of what is being observed and what the observation records.

An imaging sensor observing and recording imagery and data of an object in the Earth's orbit, which will allow determination of characteristics of that object.

An imaging, sensor observing and recording imagery and data of an object in space out of the Earth's orbit which will allow the observation and tracking, of objects other than in the Earth's orbit. An example of observations and recordings of such objects is that of tracking Near Earth Objects (NEOs), which are asteroids or comets that have sun centric orbits but have such orbits that may intersect the orbit of the Earth or nearly intersect the orbit of the Earth.

A satellite has an additional image sensor as adding an additional sensor cart allow two different resolutions that can be used in conjunction to give additional imagery and data information. An example of such a satellite with an additional image sensor is a satellite that has a sensor that observes and records the full observable hemisphere and an additional sensor that provides a much narrower field of view but at a significantly higher resolution.

An imaging satellite with a pointing system configured to change a position of a sensor with a different field of view with regard to the surface of the Earth so that the image sensor perceives different portions of the Earths surface when producing data or a series of images.

An imaging satellite with a pointing system that includes a gimbaled set wherein an optical telescope of a narrow field or view image sensor is pointed by adjusting the angle of the telescope relative to the body of the satellite.

An imaging satellite with a pointing system that includes a control mechanism configured to control an amount of spin imparted by a momentum or reaction wheel on the satellite so as to impart a relative rotation of the satellite with respect to the Earth and cause an optical path of the image sensor to change with respect to a predetermined spot on the Earth.

An imaging satellite with a sensor control and data processing system that is programmed at any time through communications links from the ground control systems to produce images of fixed resolutions and frame rates allows the sensor to be commanded to produce imagery and related data at the native resolution of the FPAs and frame rates that can be compared to baseline data sets.

An imaging satellite with a sensor control and data processing system that is programmed at any time through communications links from the ground control systems to produce images of variable resolutions and frame rates as variable resolutions and frame rates allow the implementation of combining the received light over multiple pixels and thus provide improved low light capabilities. An example of this use of variable resolution would be in night conditions with partial or no moonlight.

A sensor control and data processing system with ground control systems monitoring the saturation and pixel received energy levels of a FPAs and modifying the FPAs' relevant operational parameters allowing the ground systems to override the semi-autonomous system onboard the satellite and associated with the sensor. Such a ground override can force the system to produce non optimized imagery for specialized purposes like characterizing degradations over the lifetime of the sensor.

A sensor control and data processing system commanded from the ground control systems to produce imagery at various resolutions to minimize the amount of controlling electronics on the satellite associated with the sensor. Such a configuration can minimize satellite costs and launch mass minimizing launch costs.

A processing system as commanded from the ground control systems produces imagery at fall resolution of a select area of the observable hemisphere and reduced resolution imagery of the rest of the observable hemisphere can optimize the information transmitted to the ground. For example full resolution of some areas of the Earth and lower resolution of other areas can allow for lower compression ratios and as high compression ratios are not loss less, the amount of information lost can then be minimized.

A data processing system wherein the imagery of full and lesser resolution images is processed at different frame rates to optimize the imagery for transmission to the ground allowing another means other than just variable resolution to optimize the information sent to the ground.

A data processing system wherein the lesser resolution imagery and full resolution imagery is electively stored for future recall allows areas of little or no change to be stored at lower resolution to minimize storage and data transport costs.

A data processing system wherein the imagery of full and lesser resolution images may be combined with the imagery from a separate sensor to provide data fused images that can provide information not derivable from either sensor alone.

An imaging satellite with a sensor control and data processing system that includes a data compression mechanism configured to compress the data before transmitting the data to a ground location. The data stream from the sensor described herein is huge. Compressing the imagery and data allows conventional RF or laser communications to transmit the compressed imagery and data to the ground station.

A data processing system of performing loss less compression resulting in no loss of information. Some uses of the imagery and data requires the utmost in available such as measurement intelligence techniques. Lossless compression supports such uses.

A data processing system of performing variable bit rate compression which can allow variable compression per circumstances as they change over time. With a finite data bandwidth for transmissions to the ground station as the frame rates change within the sensor the variable bit rate compression allows the electronics to change compression rates and still meet the finite data transmission bandwidth while compressing the imagery and data as little as practical.

A data processing, system of performing lossy compression that preferentially is loss in the lower order (least significant) bits of each pixel in an image as lower order bits impart less inaccuracy into the compressed imagery and data to be transmitted to the ground.

A data processing system of performing an industry standard motion imagery lossy compression algorithm as using industry standard compression can lower costs as well as take advantage of progression within the field of the mathematics of compression algorithms.

An imaging satellite with a transmitter is configured to transmit the data directly to a ground station will allow imagery and related data to be transmitted continuously with absolute minimum latency to imagery and data processing systems.

An imaging satellite with a transmitter is configured to transmit the data directly to a user remote location will allow transmission to a remote location where the information is most useful. An example is transmission into a military facility within an active engagement zone allowing immediate access to the imagery and related data without going through the main ground station, processing, and distribution system.

An imaging satellite with a transmitter is configured to transmit the data directly to another imaging satellite to relay the imagery and data to a remote location allows transmission to ground stations not within line of sight of the satellite with the sensor on it. Such a combination of primary satellite with the sensor and transmissions through a secondary satellite can provide the imagery through downlinks to the ground directly to any place on the Earth.

A imaging satellite with a transmitter is configured to transmit the data directly to a network node configured to relay said imagery and data to a remote location by way of the Internet allows transmission to the ground station placed at an environmentally optimal site while allowing data processing and distribution to be located elsewhere.

An imaging satellite wherein the imaging satellite is one satellite of a constellation of at least three similar satellites in GSO which allows the full system of three satellites to cover the entire Earth except for the polar regions of the Earth.

An imagine satellite constellation in which the constellation supports imaging the same point on the Earth from more than one satellite of the constellation such as with a constellation of three or more equally spaces GSO satellites in which the sensors observing the full observable hemisphere from GSO have overlapping fields of view.

An imaging, satellite system with a ground processing system configured to create images and motion imagery of the imagery and data in real-time allows the imagery and data to provide useful information to the end users as the events being imaged happen.

A ground processing system performs data cumulation processing on the imagery, the process of combining the imagery and data to give higher dynamic range, to produce imagery of a quality better than the raw imagery.

A ground processing system that performs super resolution processing techniques, which can produce imagery of resolutions better than the raw resolution of the sensor.

A ground processing system derives trend or patterns of interest from the imagery and data that can then compare the trend or patter to that of a trend or pattern stored in a database. For example this can allow notification to interested parties of changes in patterns.

A ground processing system that combines imagery from more than one satellite of a constellation allowing, the imagery from multiple satellites observing the same area on the Earth to provide different views of the same area resulting in information being able to be derived that cannot be derived from any individual satellite.

A ground data processing system combining imagery from more than one satellite producing higher resolution imagery than is transmitted down from a satellite as pixels of the imagery of each satellite do not precisely coincide the offset of pixels can be utilized to produce mathematical subsets of each pixel and thus effective higher resolution imagery.

A ground data processing system combining imagery from more then one satellite to produce stereoscopic imagery which can provide a form of 3D processed imagery of the combined field of view.

A imaging satellite system with a ground processing system configured to extract signatures of interest from of the imagery which can afford a wide array of extractions that are more expansive and changeable than doing such signatures extraction on the satellite.

A ground processing system combines imagery from external sources to extract events of interest which allows access to other sources for fusion of the imagery and data to provide useful information not available from any single source.

An imaging satellite system comprising a high resolution display in a ground facility that is a surface of a sphere to give a real-time representation of the Earth as events unfold.

A high resolution display system that is a set of a plurality of projectors located at or near the center of the sphere to project onto the interior of the sphere which will allow the observers to move about the sphere without blocking any projectors that would otherwise be outside the sphere projecting onto its exterior surface.

A high resolution display system that includes a touch interface on the surface of the sphere to allow human interaction and direction of the way the imagery and data is displayed which will allow users to select menus, display extracted data or expand resolution of selected areas on the sphere.

An imaging sensor as described in the preferred embodiment that is body mounted to the satellite bus and pointed by means of repointing the satellite bus allowing stable repointing of the sensor.

An imaging sensor as described in the preferred embodiment that is mounted to the satellite and pointed by means of a two axis tilt plane that is mounted between the sensor and the satellite bus allowing faster repointing than a satellite body mounted sensor.

An imaging sensor as described in the preferred embodiment that is mounted to the satellite and pointed by means of a two axis tilt plane that is mounted between the sensor and the satellite bus which repoints the body of the sensor itself.

An imaging sensor observing and recording imagery and data of an uncooperative target on the Earth, in the Earth's atmosphere, or in the space wherein the sensor provides independent imagery and data of that target.

An imaging sensor wherein the optics includes a non imaging, total internal reflection mirror for folding the optical train to make the telescope more compact. For example, volumes on satellites are often very constrained and the optical train of a large optics with wide fields of view can be very long, longer than the volume allowed for the satellite. Using a mirror to fold the optical train allows it to be more compact.

An imaging sensor with a rotating filter wheel with one or more color sections within the wheel between the telescope and the focal plane array to allow for the creation of a broad range of full color imagery while allowing the full focal plane array to record the same color.

The Readout Electronics of the imaging satellite that reads out the imagery and data in parallel from each local plane array by means of one or more readout ports on each focal plane array allows the full image across multiple focal plane arrays to provide a single, consistent picture.

A sensor control and data processing system that varies the frame rates of sub elements of a FPA to allow for optimal, concurrent high light imaging and low light imaging of objects and events within the field of view of the FPA under both high light and low light conditions A sensor control and data processing system within the imaging satellite that synchronizes frame rates across multiple FPAs allows a consistent image as regular intervals to be constructed across the entire field of view of the sensor.

A sensor control and data processing system within the imaging satellite that synchronizes multiple frame rates that are integer multiples of each other across multiple TPAs allowing analyses and object tracking to be done across multiple frames at synchronized intervals.

An image and data processing system within the satellite that characterizes levels of contrast within an FPA allowing signatures of items within the field of view of that FPA to be recorded and characterized.

An image and data processing system within the satellite that characterizes levels of contrast across multiple FPAs allowing signatures of items within the field of view of FPAs to be recorded and characterized.

An image and data processing system within the satellite that creates an alert that may be transmitted to the ground when contrast level differences are of pre defined levels allowing the characterization of objects within the sensor field of view to be attained on the satellite then transmitted to uses on the ground.

An image and data processing system within the satellite that creates alert that may be transmitted to the ground when contrast level differences are of pre defined levels and those levels move from one FPA sub element to another allowing the characterization of the motion of objects within the a FPA of view to be attained on the satellite then transmitted to uses on the ground.

An image and data processing system within the satellite that creates an alert that may be transmitted to the ground when contrast level differences are of pre defined levels and those levels move from one FPA to another FPA allowing the characterization of the motion of objects across multiple FPA's fields of view to be attained on the satellite then transmitted to uses on the ground.

An image and data processing system within the satellite that creates an a that may be transmitted to the ground when areas of contrast level differences are of a pre defined shape allowing signatures of items based upon shape definition to be recorded and characterized.

An image and data processing system within the satellite that characterizes levels of colors within an FPA allowing signatures of items based upon color definitions to be recorded and characterized.

An image and data processing system within the satellite that characterizes levels of colors across multiple FPAs allowing signatures of items based upon color definitions to be recorded and characterized for objects of interest that is observed and recorded across multiple FPAs.

An image and data processing system within the satellite that creates an alert that may be transmitted to the ground when color level differences are of pre defined levels allowing the characterization of objects within the sensor field of view to be attained on the satellite then transmitted to uses on the ground as alerts.

An image and data processing system within the satellite that creates an alert that may be transmitted to the ground when areas of color level differences are of a pre defined shape allowing the characterization of objects due to color differentiation within the sensor field of view to be attained on the satellite then transmitted to uses on the ground as alerts.

An image and data processing system within the satellite that creates an alert that may be transmitted to the ground when color level differences are of pre defined levels and those levels move from one FPA sub element to another allowing the characterization of objects within the sensor field of view to be attained and motion characterized due to color characteristics on the satellite then transmitted to users on the ground as alerts.

An image and data processing system within the satellite that creates an alert that may be transmitted to the ground when color level differences are of pre defined levels and those levels move from one FPA to another FPA allowing alerts to be transmitted to users on the ground based upon tracking of objects based upon coloration.

An imaging satellite with multiple transmitters wherein the transmitters do transmit different data rates and different encoding schemes to different ground stations allowing multiple, diverse users with different requirements to obtain tailored information.

An alternate embodiment of the present invention may be described in the following table.

Table Two

Event happens

Light travels from the event to the satellite sensor co-collimated telescopes

Light is focused on the focal plane of each telescope

Light is captured by the series focal plane arrays in the local plane of each telescope and read out as voltages Voltages are processed resulting in the control electronics recording multiple super saturated pixels within one or more focal plane arrays Voltages are processed as digital bits on the satellite for transmission Imagery and data are transmitted to the ground Second, time spaced event happens Focal plane array control electronics shortens the light integration time of the local plane arrays with super saturated pixels for the second image frame capture Light from the second event travels from the event to the satellite sensor co-collimated telescopes Light from the second event is focused on the focal plane of each telescope Light from the second event is captured by the series of focal plane arrays in the focal plane of each telescope and read out as voltages The ground station receives the data stream related to the first event and "unpacks" the data Voltages from the capture of the second image are processed on the satellite for transmission The second image imagery and data are transmitted to the ground The ground station sends the imagery and data of the first image to the ground processing site The ground processing site takes the raw imagery and data from the first event and turns in into composed, user observable images The ground station sends the imagery and data of the second event to the ground processing site In parallel to the creation of composed, user observable images, the ground processing site extracts selected data from the first image In parallel to the creation of composed, user observable images, the ground processing site extracts selected data from the second image The composed images are transferred to storage (for future use) and the distribution system The distribution system (Internet, other communications satellites, etc.) delivers the live images and related, extracted data to the user Electronics controlling the processing of the imagery and associated data from the sensor may perform extractions of information derived from the imagery and data. The electronics may extract such information as:

Position based change detection which is allowed due to the stationary sensor position of the sensor in the GSO or the slowly moving sensor of the Molniya, HEO or Lagrange orbits.

Motion based change detection which is specifically supported by the ability to do persistent imaging of each of these orbits.

Activities based change detection which is afforded by the combination of both motion based change detections and position based change detection over time supported by the persistent sensors.

Behavior based change detection which is a specific step combining and comparing activities based change detection with external data accumulated by means of persistent imaging afforded by a staring sensor in GSO, Molniya, HEO or Lagrange orbit.

Location based signatures extraction is a step of obtaining a specific set of colors or patterns that matches a pre defined set of criteria of interest, which is made possible by persistent imaging afforded by a staring sensor in GSO, Molniya HEO or Lagrange orbit, and Combined signatures extraction and change detection is the combination of the two when a specific signature is obtained or when a specific change is detected, which is made possible by persistent imaging afforded by a staring sensor in GSO, Molniya, HEO or Lagrange orbit.

All of these detections are directly supported by the ability to do long duration persistent imaging afforded by GSO, Molniya, HEO, and Lagrange orbits.

V. Glossary

2D Cylindrical Projection

A two dimensional (2D) Cylindrical Projection of the Earth is an equirectangular projection and is a very common map projection in which the surface elements of the Earth's surface are depicted as if drawn onto a cylinder that has as its main axis the same as the axis of rotation of the Earth. This results in a two dimensional rectangular map in which the meridians are at right angles with the polar regions stretched with regard to the equatorial regions.

Apogee

The point in a satellite's orbit when the satellite is farthest from the surface of the Earth.

ASIC, Application Specific Integrated Circuit

An integrated circuit (IC) designed, customized, and implemented for a particular use, rather than a generic designed IC intended for general-purpose use.

Bit Stream Compressor

A system by which a serial stream of bits can be reduced in the number of bits.

Bit Stream Interleaver

A system by which a serial stream of bits are re-ordered from the original order.

Bit Transitions

The change in bits, i.e., the changes in voltage or current levels to signify individual bits within a string of bits.

Block Up Converter

A system by which an input signal's frequency is changed to a higher frequency while maintaining the frequency range of the original signal.

Brightness Track and Hold Electronics

A system that accepts a brightness level and stores that in an electronic element.

CCD, Charge Coupled Device Array

An image sensor implementing the movement of charge resulting from light falling onto the sensor's surface to another area of the device for readout.

CMOS Array, Complementary Metal-Oxide-Semiconductor Array

An image sensor implementing, created using the same technologies as used to create typical integrated circuits (IC) chips.

Co-collimated Telescopes

A set of two or more telescopes wherein all telescopes in the set are continuously pointed at, and focused on, the exact same region or object.

Collimated

Elements that are perfectly parallel.

Continuous Imaging

Continuous Imaging is ability to create images of a given area, region, or Object over very long, periods of days or weeks or months with no more than 30 second gaps between successive images during that entire very long period.

Control Frame Rate

The ability to modify and regulate the Frame Rate of a sensor.

Control Integration Time

The ability to modify and regulate the period of radiation capture by a sensor.

Controlled Readout Electronics

The system by which the retrieval of information from a sensor is modified and regulated.

Controlling Sub Elements

A process for modifying and regulating the processes within a par of a sensor.

Conversion Trigger Electronics

An system to produce the electronic notice for a sensor to change captured energy to electrical values that can be readout.

Cooperative Target

Any object over which the operators of the satellite and sensor can have direct or indirect control.

Data Cumulation

A method of combining the data from multiple images to enhance the signal to noise ratio in the resulting image.

DSB-S2x, Digital Video Broadcasting Satellite, Second Generation Extended

An industry standard Radio Frequency (RE) waveform modulation that implements a spectrally efficient, very high data and information rate communications.

Earth Observation

Earth Observation is the viewing and recording of imagery and related data of the Earth and the general space about the Earth.

Electronically Controllable High Refractive Index Material

A material that changes its index of refraction, and by this the path of light going through it, based upon the electrical voltage levels placed across the material.

Encryptor

A system in which bits are reordered in a pre defined pattern in order for the output bits to be unintelligible to any entity reviewing the output bits that does not know the pre defined pattern.

Error Correction Bits

Additional bits added to a serial stream that allows the original stream to be recovered in case of errors in the transmission of the bit stream.

Field of View

The field of view (FOV) of a satellite or sensor is the area able to be observed by the satellite or sensor without the satellite being reoriented or repointed.

FPGA, Field Programmable Gate Array

An integrated circuit designed to be configured by a customer or a designer after manufacturing—hence "field-programmable". The FPGA configuration is generally specified using a hardware description language (HDL). FPGAs can have their "programming" changed even after they are in an operational system such as a satellite already on orbit.

Focal Plane

The surface onto which an optical system, e.g., a telescope, focuses an image. A Focal Plane may be an imaginary surface in three dimensional space or the surface may be composed of one or more FPAs.

Focal Plane Array (FPA)

An array of elements, typically but not exclusively, within a single integrated circuit chip, designed to receive tight and convert that light into electrical charges that can then be read out.

Fractionated Sensor

A fractionated sensor is one in which the focal plane arrays (FPAs) are disbursed across multiple optical elements and multiple focal planes while observing and recording a single field of view through every optical element. The optical elements may be optical telescopes over the wavelengths of ultraviolet through visible through infrared.

Frame Rate

The number of images (frames) recorded and read out by the image sensor per second. For example: the standard frame rate in the U.S. for "full HDTV" is approximately 30 frames per second.

Geostationary Orbit

The orbit in the same plane as the Earth's equator at which an object in this orbit revolves around the Earth at the exact same rate as the Earth rotates on its axis. This is approximately 35,786 km above the Earth's surface at the equator. A Geostationary Orbit is a special case of a geosynchronous orbit.

Geostationary Orbit Plane

The Geostationary Orbit Plane is the plane that passes through the center of the Earth and extends through the equator of the Earth and out into space.

Geostationary Observable Hemisphere

The Geostationary Observable Hemisphere is the Satellite Observable Footprint that is able to be viewed from a satellite in geostationary orbit.

Geosynchronous Orbit (GEO)

The orbit in which an object, such as a satellite, takes 24 hours to revolve around the Earth. This orbit has an object, e.g., a satellite, pass over the same point on the surface of the Earth at the same time every day.

Highly Elliptical Orbit (FIFO)

A highly elliptical orbits one in which the eccentricity of the orbit is greater than 0.5.

High Index of Refraction Material

A high index of refraction material is one in which the refractive index is equal to or greater than 1.3.

Highly Refractive Index Plate

A plate comprised of a High Index of Refraction Material

Imagery

The picture represented by the array of pixels created by a sensor.

Inclined Orbit

An Inclined Orbit is one in which the plane of the orbit is not coincident with the Earth's equatorial plane.

Individual Port Readouts

The readout of bits from one of the readout points of a sensor.

Instantaneous Field of View

The instantaneous field of view (IFOV) is the section of space a satellite or sensor observes at a single moment in time. For scanning sensors the IFOV is moved to slowly cover the full field of view (FOV) of the satellite or sensor. For staring sensors or satellites with staring sensors like the satellite and sensor system in this patent submission, the IFOV and the FOV are the same.

Integration Time

The duration in which a sensor captures radiation, typically light or infrared radiation.

Interleaved

A re-ordered set of bits as different from the original ordering of the bits.

Lagrange Point

A Lagrange Point is one of the five points defined by gravitational equilibrium points for a two body system in which one body is significantly larger than the other and the smaller body is orbiting the larger body, e.g., the Earth and the Moon. The L1, L2, and L3 points are unstable gravitational points wherein if an object moves a small distance from any of those points it will continue to move away from that point. The L4 and L5 points are moderately stable points wherein if an object moves a small distance from that point it will return to the vicinity of the L4 or L5 point.

Last Frame Data Element

A piece of data that is part of the information in the previous imagery frame. Examples could be the maximum light level, the minimum light level, the integration duration, or the temperature of the focal plane array.

Light Beams

Elements of the light that are being collected by the telescope and focused on the focal plane of that telescope.

Low Earth Orbit (LEO)

Low Earth orbit is defined as low eccentricity orbits (eccentricity is <0.1) with an apogee less than 1,200 km above the surface of the Earth.

Maximum Light Level

The highest level Of light impinging on a sensor element.

Mirror

A reflective element in an optical path.

Modulator

An electronic element that takes input signals, typically digital signals but possibly analog signals, and transforms them into a series of transitions that can be transmitted over a radio frequency link.

Molniya Orbit

A Molniya orbit is a special case of a highly inclined, highly elliptical orbit. The Molniya orbit has an orbit period of 12 hours, which allows observations from a satellite in that orbit of the polar regions for approximately eight of each 12 hour period, and passes over the same region of the Earth every 24 hours.

Motion Change Detector

An electronic system that characterizes the differences from one image and data set to another image and data set as those changes are from one set of pixels to a different set of pixels even if those sets of pixels overlap.

Motion Trend Comparator

An electronic system that characterizes the patterns that can be represented by a series of changes in images and data of objects as those objects move within the field of view.

Nadir

Nadir is defined as the direction of the center of the Earth from the viewpoint of the satellite. An object or apparatus pointed toward nadir is pointed toward the center of the Earth.

Notification Format Data Element

A set of data that specifies the manner in which events are reported.

Observable Area Footprint

The observable area footprint is that region of the surface of the Earth that is observable by a satellite or the sensor aboard that satellite.

Observable Hemisphere

The observable hemisphere is that region of the Earth, the atmosphere above it, and the space above that atmosphere that is observable by a satellite or the sensor aboard that satellite. Because of the geometric limitations of being a finite distance from the surface of the Earth, the observable hemisphere is less than the physical hemisphere of the Earth, i.e., less than 50% of the Earth. The farther the satellite is from the Earth the higher the relative fraction of the true, 50% hemisphere the observable hemisphere becomes, i.e., the observable hemisphere for a satellite at geostationary orbit is smaller than the observable hemisphere for a satellite at either of the L4 or L5 Lagrange points.

Optimized Image Capture

Data of observations is represented by images and related data. Optimized images have a minimized set of noise throughout the image and the greatest signal to noise ratio throughout the image.

Perigee

The point in an orbit in which the object in the orbit is closest to the center of the Earth.

Persistent Imaging

Persistent Imaging is defined as there being a gap between successive images of the same area of the Earth or an object in the vicinity of the Earth of no more than 30 seconds independent of the time of day or day of year with the imaging being maintained over long durations.

Persistent Imaging versus Continuous Imaging

Persistent Imaging does not require Continuous Imaging. Persistent Imaging may create images with gaps of no more than 30 seconds for extended periods but not continuously over very long periods. For example, Persistent Imaging of a satellite in is Molniya Orbit may provide imaging of an Earth polar region over 12 or more hours with no greater than 30 seconds between images during that 12 or more hour period but not over 24 hours of each and every day which would be Continuous Imaging.

Pixel

A picture element within an image.

Post Processing

Electronic handling of images and related data that happens after the image is read out of the focal plane array.

Radiation

Radiation is any combination of light, free electrons, like protons, free neutrons, x-rays, or gamma-rays that may impinge on a system.

Reference Database FPGA

A field programmable gate array (FPGA) that stores data that can be read out at a later time as well as updated by loading new firmware into the FPGA.

Real-time

Real-time is defined as the end user being able to see an event in less than thirty seconds after an event occurs, including the aggregate of durations for:

light to get from the event to the sensor,
the sensor to capture the light and create an electronic image, the sensor readout, the read out data processing,
the transmission to a ground processing site,
ground processing,
distribution to the end user, and
end user display.

Real-time v. Live

Live is defined as the end user being able to see an event in less than ten seconds after an event occurs. Real-time is defined as the end user being able to see an event in less than thirty seconds after an event occurs, including the aggregate of all durations for:

light to get from the event to the sensor,
the sensor to capture the light and create an electronic image,
the sensor readout,
the read out data processing,
the transmission to a ground processing site,
ground processing,
distribution to the end user, and
end user display.

Refractive Element

A refractive element is one in which the direction of the light going through the component changed. One example of a refractive element is a focusing lens.

Reset Electronics

Reset electronics are components that reset other electronics to a specified condition. One example of reset electronics is the set of electronics that cause focal plane arrays to go to a state with zero electrons captured allowing, a new image to be captured.

Satellite

An object that orbits another object. A common usage of the term satellite is that of a man-made object in orbit about the Earth.

Satellite Bus

The Satellite Bus is the entire structure and equipment making up the satellite except for the sensors and equipment and electronics exclusive to those sensors.

Satellite Sensor Footprint

The Satellite Footprint is the area being observed by a satellite's sensor at a given point in time. The Satellite Sensor Footprint is less than or equal to the Satellite Observable Footprint.

Satellite Observable Footprint

The Satellite Observable Footprint is the maximum area on the surface of the Earth that is viewable from a satellite at a given point in time.

Scanning Sensor

A Scanning Sensor is a sensor that accumulates imagery as the field of view of the sensor moves across the area of interest. A scanning sensor accumulates imagery as the sensor observation and recording area is moved across the area or object of interest. Then, in order to create a two dimensional image larger than the observation region of the scanning sensor the field of view of the sensor is moved in a direction perpendicular to the first dimension of motion and retraces to the beginning point of the original motion of the scan. The process is repeated until the full area or object of interest is observed and recorded.

Sensor

An electronic and optical system used to observe and record images and data of the field of interest.

Sensor Image Processing Compression

A set of electronic elements that takes advantage of redundant data within an image and related data to utilize known algorithms to represent the original data set of a given number of hits with another data set of a smaller number of bits.

Sensor Image Readout

A set of electronic elements that extract the information in the sensor for transfer to other electronics for processing.

Serial Bit Stream Serializer

A set of electronic elements that ingest multiple bit streams in a parallel manner then coverts them to one or more serial streams.

Software Controlled Processing Electronic Elements

Electronic elements that process information based upon software loaded into those electronics.

Sparsely Populated

A set of components that do not form a physically contiguous set. One set of sparsely populated elements can be a set of focal plane arrays (FPAs) that are set into a single focal plane but are set apart from each other and thus not forming a single, contiguous set.

Staring Sensor

A staring sensor is a combination of optics, e.g., refractive telescope, reflective telescope, or catadioptric telescope and recording elements, e.g. focal plane arrays that is continuously pointed toward and observing a given object or space, i.e., staring at that given object or space. A staring sensor generally observes and records essentially the entire observable region or object at generally the same time.

Stitched Together

A method in which separately recorded imagery elements are combined to create a larger image or data set.

Terminator

The terminator with regard to the Earth and the Earth's lighting is the region on the Earth and within the Earth's atmosphere that encompasses the region and volume of the transition from day lighting to night lighting.

Uncooperative or Non Cooperative Target

Any object over which the operators of the satellite and sensor cannot have direct or indirect control.

SCOPE OF THE CLAIMS

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Real-time Satellite Imaging System have been disclosed above are intended to educate the reader about preferred embodiments of the invention, and are not intended to constrain the limits of the invention or the scope of Claims.

LIST OF REFERENCE CHARACTERS

ED Earth's disc
ES Earth's surface
FP Focal plane
FPA Focal plane array
IO Imaging optics
L Light rays
SC 1 First scan
SC 2 Second scan
SC 3 Third scan
SC 4 Fourth scan
SM Scanning mirror
SC N Nth Scan
SR Scan retrace
SO Moving object being scanned
SC A First scan of the moving object
SC B Second scan of the moving object
SC C Third scan of the moving object
SC D Fourth scan of the moving object
OM Direction of motion of the moving object
10 Satellite
12 Real-lime Satellite Imaging System
14 Image Sensor
15 Solar Arrays
16 Transmitter
17 One embodiment of image sensor
18 Co-collimated telescopes
20 First refractive elements
22 Focal plant
24 Focal plane array
24AA First focal plane array in the first focal plane
24AB Second focal plane array in the first focal plane
24AC Third focal plane array in the first focal plane
24AD Fourth focal plane array in the first focal plane
24AE Fifth focal plane array in the first focal plane.
24AF Sixth focal plane array in the first focal plane.
24AG Seventh focal plane array in the first focal plane.
24AH Eighth focal plane array in the first focal plane
24AI Ninth focal plane array in the first focal plane
24BA First focal plane array in the second focal plane
24BB Second focal plane array in the second focal plane
24BC Third focal plane array in the second focal plane
24BD Fourth focal plane array in the second focal plane
24BE Fifth focal plane array in the second focal plane
24BF Sixth focal plane array in the second focal plane
24BG Seventh focal plane array in the second focal plane
24BH Eighth local plane array in the second focal plane
24BI Ninth focal plane array in the second focal plane
24CA First focal plane array in the third focal plane
24CB Second focal plane array in the third focal plane
24CC Third focal plane array in the third focal plane
24CD Fourth focal plane array in the third focal plane
24CE Fifth focal plane array in the third focal plane
24CF Sixth focal plane array in the third focal plane
24DA First focal plane array in the fourth focal plane
24DB Second focal plane array in the fourth focal plane
24DC Third focal plane array in the fourth focal plane
24DD Fourth focal plane array in the fourth focal plane
24DE Fifth focal plane array in the fourth focal plane.
24DF Sixth focal plane array in the fourth focal plane
One embodiment a of single co-collimated telescope
26a Reflective element, primary mirror
26b Reflective element, secondary mirror
28 Second refractive elements
30 Alternative embodiment of a single co-collimated telescope
31 Telescope aperture
32 Folding mirrors
34 Overlap regions of sparsely populated focal plane arrays
36 Imagery and Data Flow Functional Block Diagram
38 Sensor image controller
40 Software controlled electronics
42 Sensor image readout
44 Imagery and Data
46 Software controlled readout electronic elements
48 Image processor
50 Sensor Image Readout Data including Maximum Light Level
52 Software controlled processing electronic elements
54 Processed Images
56 Sensor Control Functional Block Diagram
58 Focal Plane Array Subelement
60 Sensor Image Controller Field Programmable Gate Array (FPGA)
62 Integration Time per ERA control element.
64 Frame Rate of FPA control element
66 Integration Time per subelement of FPA control element
68 Frame Rate of sub element of FPA control element
70 Sensor Image Readout Block Diagram
72 Readout Electronics Field Programmable Gate Array (PGA)
74 Sensor Image Readout element sensing Maximum Light Level
76 Sensor Image Readout Transmitting Maximum Light Level to Sensor Image Control
78 Image Processor Functional Block Diagram
80 Sensor image processing compression
82 Sensor image processing formatting for transmission
84 View of use of reactive plate
86 High index of Refraction Plate
88 Incident light beams
90 Multiple paths of light beams
92 Singly shifted exiting light rays 94 Voltage control element
96 First schematic diagram of plate pair
98 Second schematic diagram of plate pair
100 Singly shifted exiting light rays
102 Doubly shifted exiting light rays
104 Schematic diagram of imaging sensor
106 Functional Block Diagram of Image Sensor Control and Readout and Processing
108 Geostationary Orbit (GSO) arc
110 Field of View of the Geostationary Orbit Satellite
112 Observable Surface and Atmosphere from GSO
114 The Earth
116 Overlapping areas of observation areas of GSO satellites as seen from a north pole vantage point
118 2D Cylindrical Projection of the Earth
120 Geostationary Satellite Observable Area Footprint
122 Observable Area-Overlap of the three equally spaced GSO satellites
124 Molniya Orbit Arc
126 Field Of View of the Molniya Orbit Satellite with the satellite at apogee
128 Observable Area of the Satellite at apogee with the satellite in a Molniya Orbit
130 Southern edge of Molniya observable footprint of a Molniya orbit satellite at apogee
132 Ground Track of the Molniya Orbit
134 Molniya orbit satellite #1
136 Molniya orbit satellite #2
138 Molniya Orbit Arc of two satellites.
139 Molniya Orbit satellite #1 field of view
140 Molniya Orbit Satellite #1 observable footprint
141 Molniya Orbit satellite #2 field of view
142 Molniya Orbit Satellite #2 observable footprint
144 Ground Track of the Molniya Orbit Satellite #1
146 Ground Track of the Molniya Orbit Satellite #2
148 Coverage Area within the observable footprint of Molniya Satellite #1
150 Coverage Area within the observable footprint of Molniya Satellite #2
152 Molniya Orbit satellite #3
154 Molniya Orbit satellite #4
155 Molniya Orbit satellite #3 field of view
156 Coverage Area within the observable footprint of Molniya Satellite #3
157 Molniya Orbit satellite #3 field of view
158 Coverage Area within the observable footprint of Molniya Satellite #4
160 Overlap of Coverage Areas of observable footprints of Molniya Satellites #1 and #2
162 Overlap of Coverage Areas of observable footprints of Molniya Satellites #3 and #4
164 Observable Area of North Molniya Satellite at Apogee
166 Observable Area of South Molniya Satellite at Apogee
168 Observable Area of Western Pacific Geostationary Satellite
170 Observable Area of Western Hemisphere Geostationary Satellite
172 Observable Area of European/African Hemisphere Geostationary Satellite
174 Area of Maximum Overlap of Observations with 4 satellites observing at the same time
176 Highly Elliptical Orbit Are
178 Field of View of a Highly Elliptical Orbit Satellite
180 Observable Area of a Flighty Elliptical Orbit Satellite
182 Satellite in a 24 hour Highly Elliptical Orbit
184 Ground Track for a 24 hour Highly Elliptical Orbit satellite
186 Southern Edge of an Observable Footprint of a 24 hour Highly Elliptical Orbit satellite
188 Field of View of the Earth of a satellite at a L4 or L5 Lagrange Point
190 Equilateral Triangles approximating positions of the L4 & L5 Lagrange Points
192 Moon
194 Observable Area of a satellite at the L4/L5 Lagrange Points
196 Individual Pixels
198 Focal Plane Array Sub Element Consisting of Multiple Pixels
200 Reset Electronics Controlling FPA Sub Element
202 Light integration Timer Controlling FPA Sub Element
204 Analog to Digital Conversion Trigger Electronics Controlling FPA Sub Element Analog to Digital Conversions
206 Readout Trigger Electronics to Trigger both FPA Sub Elements and Readout Electronics
208 Readout Electronics Reading FPA Port #1
210 Readout Electronics Reading FPA Port #2
212 Image Formatting Element
214 Formatted Imagery Transferred to Image Processing Element
216 Integration Timing Data to Image Processing Electronic Element
218 Contrast Detection within each FPA Sub Element
220 Color Detection within each FPA Sub Element
222. Change Detection within each FPA Sub Element
224 Contrast Detection across FPA sub elements within each FPA
226 Color Detection across FPA sub elements within each FPA
228 Change Detection across FPA sub elements within each FPA
230 Contrast Detection across multiple FPAs
232 Color Detection across multiple FPAs
234 Change Detection across multiple FPAs
236 Parallel to Serial Bit Stream Serializer
238 Serial Bit Stream
240 Bit Stream Compressor
242 Bit Stream Interleaver
244 Bit Stream Encryptor
246 Forward Error Correction
248 Modulator
250 Modulated Analog, Intermediate Frequency Signal
252 Block Upconverter
254 Radio Frequency Signal
256 Power Amplifier
258 Antenna
260 Pixel Readout Electronic Element
267 Pixel Data
264 Max Brightness Track and Hold
266 Brightness Level Detection Element
268 Brightness versus Saturation Level Detection
270 Saturation Level Set
272 Next frame Integration Duration Set
274 FPA Integration Duration Set
276 FPA In Set Signal
278 Conversion Trigger Signal
280 Readout Trigger Signal
282 Image Processing FPGA
284 Static Position Change Detector
286 Motion Change Detector
288 Image Comparator 290 Last Frame Data Element
292 Reference Data Base FPGA
294 Notification Set Generation Element
296 Notifications
298 Notification Format Data Element
300 Position Comparator
302 Location Data Element
304 Signature Comparator
306 Signature Data Element
308 Next Frame Integration Time Comparator
310 Noise & Dark Current Time Related Data element
312 Motion Image Comparator
314 Motion Image Data element
316 Motion Notification Set Generation element
318 Motion Notification Format Data
320 Motion Signature Comparator
322 Motion Signature Data element
324 Motion Trend Comparator
326 Motion Trend Data element
328 Motion integration Time Comparator
330 Noise & Dark Current Motion Related Data element

What is claimed is:

1. An apparatus comprising:
a satellite; said satellite being in orbit around the Earth;
said satellite having an apogee generally out of the plane of the Equator;
said satellite providing generally persistent coverage of the polar regions not observable from geosynchronous orbit;
an image sensor; said image sensor being carried aboard said satellite;
said image sensor including a plurality of co-collimated telescopes; said co collimated telescopes being configured to produce a plurality of images of the same field of view;
said image sensor being configured to be pointed generally toward Earth;
said image sensor is a staring sensor;
said image sensor including a focal plane;
said focal plane including a plurality of focal plane arrays;
said focal plane arrays being configured to produce a plurality of data;
said focal plane arrays being sparsely populated upon said focal plane of each of said co-collimated telescopes;
said plurality of focal plane arrays being stitched together to form a single cohesive image;
a sensor image controller and a sensor image readout; said sensor image controller and said sensor image readout being connected to said plurality of focal plane arrays;
said sensor image controller and said sensor image readout for semi-autonomously controlling said image sensor, and for producing fixed resolutions to provide optimized imagery and data, and still allow a frame rate of better than one frame every 10 seconds;
said plurality of data including of a plurality of images of a generally entire visible hemisphere of the surface of the Earth;
said plurality of data providing persistent imaging of said generally entire visible hemisphere of the surface of the Earth;
said plurality of images each being captured as images substantially simultaneously;
said plurality of images each having resolutions that correspond with an image at nadir having at least one hundred meter resolution; and
a transmitter; said transmitter being connected to said sensor image controller and said sensor image readout.

2. An apparatus as recited in claim 1, in which said image sensor is being carried aboard a satellite in geostationary orbit.

3. An apparatus as recited in claim 1, in which each of said plurality of focal plane arrays is connected to a field programmable gate array.

4. An apparatus as recited in claim 1, in which
each of said plurality of focal plane arrays is connected to a sensor image control element; each of said sensor image control elements is configured to limit a light integration time of its associated focal plane array.

5. An apparatus as recited in claim 1, in which
each of said plurality of said sensor image control elements are configured to set the number of frames per second delivered in the plurality of data from the plurality of focal plane arrays from one-tenth of a frame per second to thirty frames per second.

6. An apparatus as recited in claim 1, further comprising:
said sensor image readout element;
said sensor image readout element being configured to readout in parallel said plurality of data from said plurality or focal plane arrays.

7. An apparatus as recited in claim 1, in which
said sensor image readout elements are configured to transmit a maximum light level of each of said plurality of focal plane arrays to said sensor image control element.

8. An apparatus as recited in claim 1, in which
said sensor image readout elements are configured to transmit a maximum light level of each of said plurality of focal plane array sub elements to said sensor image control element.

9. An apparatus as recited in claim 1, further comprising:
an image processing element;
said image processing element including a plurality of software controlled electronic processing elements; said software controlled electronic processing elements being configured to receive the raw levels of said plurality of data from said plurality of local plane arrays.

10. An apparatus as recited in claim 1, further comprising:
an electrically reactive high index of refraction material plate;
a sensor image control element; said sensor image control element including a voltage control element;
said voltage control element being configured to apply a plurality of different voltages across said electrically reactive high index of refraction material plate;
said electrically reactive high index of refraction material plate altering the direction of a plurality of light rays illuminating each of said plurality of focal plane arrays.

11. An apparatus as recited claim 1, in which said plurality of images being furnished for viewing at a remote location on Earth within not more than thirty seconds of the event being observed generally on the Earth.

12. An apparatus as recited in claim 11, in which said image sensor is a staring sensor.

13. An apparatus as recited in claim 11, in which each of said plurality of focal plane arrays is connected to a field programmable gate array.

14. An apparatus as recited in claim 11, in which each of said plurality of focal plane arrays is connected to a sensor image control element; each of said sensor image control elements is configured to limit a light integration time of its associated focal plane array from one microsecond to ten seconds.

15. An apparatus as recited in claim 11, in which each of said plurality of said sensor image control elements are configured to set the number of frames per second delivered in the plurality of data from the plurality of focal plane arrays from a frame every ten seconds to twenty frames per second.

16. An apparatus as recited in claim 11, further comprising:
a sensor image readout element;
said sensor image readout element being configured to readout in parallel said plurality of data from said plurality of focal plane arrays.

17. An apparatus as recited in claim 11, in which said sensor image readout element is configured to transmit a maximum light level of said focal plane array to said sensor image control element.

18. An apparatus as recited in claim 11, further comprising:
an image processing element;
said image processing element including a software controlled electronic processing element;
said software controlled electronic processing element being configured to receive the raw levels of said plurality of data from said plurality of focal plane arrays.

19. An apparatus as recited in claim 11, in which said plurality of images being furnished for viewing at a remote location on Earth within not more than thirty seconds of the event being observed generally on the Earth.

20. An apparatus comprising:
A satellite; said satellites orbiting the earth in a molniya orbit;
said satellite providing generally continuous coverage of the polar regions not observable from geosynchronous orbit;
an image sensor; said image sensor being carried aboard said satellite;
said image sensor including a plurality of co-collimated telescopes; said co-collimated telescopes being configured to produce a plurality of images of the same field of view;
said image sensor being carried aboard a satellite in geostationary orbit;
said image sensor being configured to be pointed generally toward earth;
said image sensor including a focal plane;
said focal plane including a plurality of focal plane arrays;
said focal plane arrays being configured to produce a plurality of data; said plurality of focal plane arrays being stitched together to form a single cohesive image;
said focal plane arrays being sparsely populated upon said focal plane of each of said co-collimated telescopes;
sensor image controller and a sensor image readout; said sensor image controller and said sensor image readout being connected to said plurality of focal plane arrays;
said sensor image controller and said sensor image readout for semi-autonomously controlling said image sensor, and for producing fixed resolutions to provide Optimized imagery and data, and still allow one frame per second frame rates;
said plurality of data including of a plurality of images of a generally entire visible hemisphere of the surface of the Earth;
said plurality or data providing persistent imaging of said generally entire visible hemisphere of the surface of the Earth;
said plurality of images each being captured as full images substantially simultaneously;
said plurality of images each having resolutions that correspond with an image at nadir having at least one hundred meter resolution;
and
a transmitter; said transmitter being connected to said focal plane arrays;
a parallel to serial bit stream serializer connected to said transmitter; said serial bit stream serializer for converting the parallel inputs from the detection elements of within said image processor to a serial bit stream in preparation for transmission.

21. An apparatus comprising:
a satellite; said satellite being in orbit in a highly inclined, highly elliptical Orbit: said satellite having an orbit period longer than twelve hours; said satellite providing a longer persistence over the polar regions;
said satellite providing generally continuous coverage of the polar regions not observable from geosynchronous orbit;
an image sensor; said image sensor being carried aboard said satellite;
said image sensor including a plurality of co-collimated telescopes; said co-collimated telescopes being configured to produce a plurality of images of the same field of view;
said image sensor being carried aboard a satellite in geostationary orbit;
said image sensor being configured to be pointed generally toward Earth;
said image sensor including a focal plane;
said focal plane including a plurality of focal plane arrays;
said focal plane arrays being, configured to produce a plurality of data; said plurality of local plane arrays being stitched together to form a single cohesive image;
said focal plane arrays being sparsely populated upon said focal plane of each of said co-collimated telescopes;
a sensor image controller and a sensor image readout; said sensor image controller and said sensor image readout being connected to said plurality of focal plane arrays;
said sensor image controller and said sensor image readout for semi-autonomously controlling said image sensor, and for producing fixed resolutions to provide optimized imagery and data, and still allow one frame per second frame rates;
said plurality of data including of a plurality of images of a generally entire visible hemisphere of the surface of the Earth;
said plurality of data providing persistent imaging of said generally entire visible hemisphere of the surface of the Earth;
said plurality of images each being captured as full images substantially simultaneously;
said plurality of images each having resolutions that correspond with an image at nadir having at least one hundred meter resolution; and
a transmitter; said transmitter being connected to said focal plane arrays;
a parallel to serial bit stream serializer connected to said transmitter; said serial bit stream serializer for converting the parallel inputs from the detection elements of within said image processor to a serial bit stream in preparation for transmission.

22. An apparatus comprising:
a satellite; said satellite being placed at a stable Earth-Moon Lagrange Point;

an image sensor; said image sensor being carried aboard said satellite;

said image sensor including a plurality of co-collimated telescopes; said co collimated telescopes being configured to produce a plurality of images of the same field of view;

said image sensor being carried aboard a satellite in geostationary orbit;

said image sensor being configured to be pointed generally toward Earth;

said image sensor including a focal plane;

said focal plane including a plurality of focal plane arrays;

said focal plane arrays being configured to produce a plurality of data; said plurality of focal plane arrays being stitched together to form a single cohesive image;

said focal plane arrays being sparsely populated upon said focal plane of each of said co-collimated telescopes;

a sensor image controller and a sensor image readout; said sensor image controller and said sensor image readout being connected to said plurality of focal plane arrays; said sensor image controller and said sensor image readout for semi-autonomously controlling said image sensor, and for producing fixed resolutions to provide optimized imagery and data, and still allow one frame per second frame rates;

said plurality of data including of a plurality of images of a generally entire visible hemisphere of the surface of the Earth;

said plurality of data providing persistent imaging of said generally entire visible hemisphere of the surface of the Earth;

said plurality of images each being captured as full images substantially simultaneously;

said plurality of images each having resolutions that correspond with an image at nadir having at least one hundred meter resolution; and a transmitter; said transmitter being connected to said focal plane arrays;

a parallel to serial bit stream serializer connected to said transmitter; said serial bit stream serializer for converting the parallel inputs from the detection elements of within said image processor to a serial bit stream in preparation for transmission.

* * * * *